United States Patent
Kim et al.

(10) Patent No.: US 11,974,237 B2
(45) Date of Patent: Apr. 30, 2024

(54) METHOD FOR TRANSMITTING UPLINK DATA THROUGH PRECONFIGURED UPLINK RESOURCE IN WIRELESS COMMUNICATION SYSTEM, AND APPARATUS THEREFOR

(71) Applicant: LG Electronics Inc., Seoul (KR)

(72) Inventors: Jaehyung Kim, Seoul (KR); Joonkui Ahn, Seoul (KR); Seokmin Shin, Seoul (KR); Changhwan Park, Seoul (KR); Seunggye Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 305 days.

(21) Appl. No.: 17/431,256

(22) PCT Filed: Feb. 17, 2020

(86) PCT No.: PCT/KR2020/002257
§ 371 (c)(1),
(2) Date: Aug. 16, 2021

(87) PCT Pub. No.: WO2020/167100
PCT Pub. Date: Aug. 20, 2020

(65) Prior Publication Data
US 2022/0132445 A1    Apr. 28, 2022

(30) Foreign Application Priority Data

Feb. 15, 2019 (KR) .................. 10-2019-0018230
Mar. 28, 2019 (KR) .................. 10-2019-0036402
(Continued)

(51) Int. Cl.
*H04W 52/14*    (2009.01)
*H04W 52/48*    (2009.01)

(52) U.S. Cl.
CPC ......... *H04W 52/48* (2013.01); *H04W 52/146* (2013.01)

(58) Field of Classification Search
CPC ... H04W 52/48; H04W 52/146; H04W 72/23; H04W 74/0833; H04W 76/27; H04W 56/0045; H04W 4/70
See application file for complete search history.

(56) References Cited

U.S. PATENT DOCUMENTS

2013/0010720 A1    1/2013 Lohr et al.
2021/0007139 A1*   1/2021 Fu .................. H04L 41/0896
2022/0104306 A1*   3/2022 Shrestha ............ H04W 76/27

FOREIGN PATENT DOCUMENTS

CN    1992564      7/2007
CN    102387509    3/2012
(Continued)

OTHER PUBLICATIONS

Ericsson, "Support for transmission in preconfigured UL resources in LTE-MTC," R1-1812120, Presented at 3GPP TSG-RAN WG1 Meeting #95, Spokane, Washington, USA Nov. 12-16, 2018, 13 pages.
(Continued)

*Primary Examiner* — Tuan H Nguyen
(74) *Attorney, Agent, or Firm* — Fish & Richardson P.C.

(57) ABSTRACT

The present disclosure is related to a method, by a user equipment (UE), for transmitting uplink data through a preconfigured uplink resource (PUR) in a wireless communication system and apparatus therefor. According to the present disclosure, the method comprises, the UE receives, from a base station, PUR configuration information for uplink data transmission based on the PUR in a radio resource control (RRC) connected state; transitions from the RRC connected state to an RRC idle state; performing a timing advance (TA) update procedure based on whether a
(Continued)

TA related to uplink transmission timing is valid; and transmits, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

7 Claims, 27 Drawing Sheets

(30) Foreign Application Priority Data

May 3, 2019 (KR) .................. 10-2019-0052614
Oct. 4, 2019 (KR) .................. 10-2019-0123433

(56) References Cited

FOREIGN PATENT DOCUMENTS

| WO | WO2016045094 | 3/2016 |
| WO | WO 2017/148403 | 9/2017 |
| WO | WO 2018/203722 | 11/2018 |

OTHER PUBLICATIONS

LG Electronics, "Discussion on preconfigured UL resources in MTC," R1-1812528, Presented at 3GPP TSG RAN WG1 Meeting #95, Spokane, USA, Nov. 12-16, 2018, 9 pages.

Nokia, Nokia Shanghai Bell, "Transmission in preconfigured UL resources," R1-1812904, Presented at 3GPP TSG RAN WG1 Meeting #95, Spokane, USA, Nov. 12-16, 2018, 5 pages.

PCT International Search Report in International Appln. No. PCT/KR2020/002257, dated Jun. 9, 2020, 5 pages.

Sierra Wireless, "LTE-M Preconfigured UL Resources Summary RAN1 #95," R1-183725, Presented at 3GPP TSG RAN WG1 Meeting #95, Spokane, USA, Nov. 12-16, 2018, 9 pages.

Ericsson, "Transmission in preconfigured uplink resources," 3GPP TSG-RAN WG2 #104, Tdoc R2-1816644, Spokane, USA, Nov. 12-16, 2018, 9 pages.

Extended European Search Report in European Application No. 20756324.8, dated Mar. 9, 2022, 8 pages.

Sierra Wireless, "LTE-M Pre-configured UL Resources Design Considerations," 3GPP TSG RAN WG1 Meeting #95, R1-1812724, Spokane, USA, Nov. 12-16, 2018, 11 pages.

Office Action in Chinese Appln. No. 202080014731.5, dated Jun. 30, 2023, 14 pages (with English translation).

* cited by examiner

[FIG. 1]
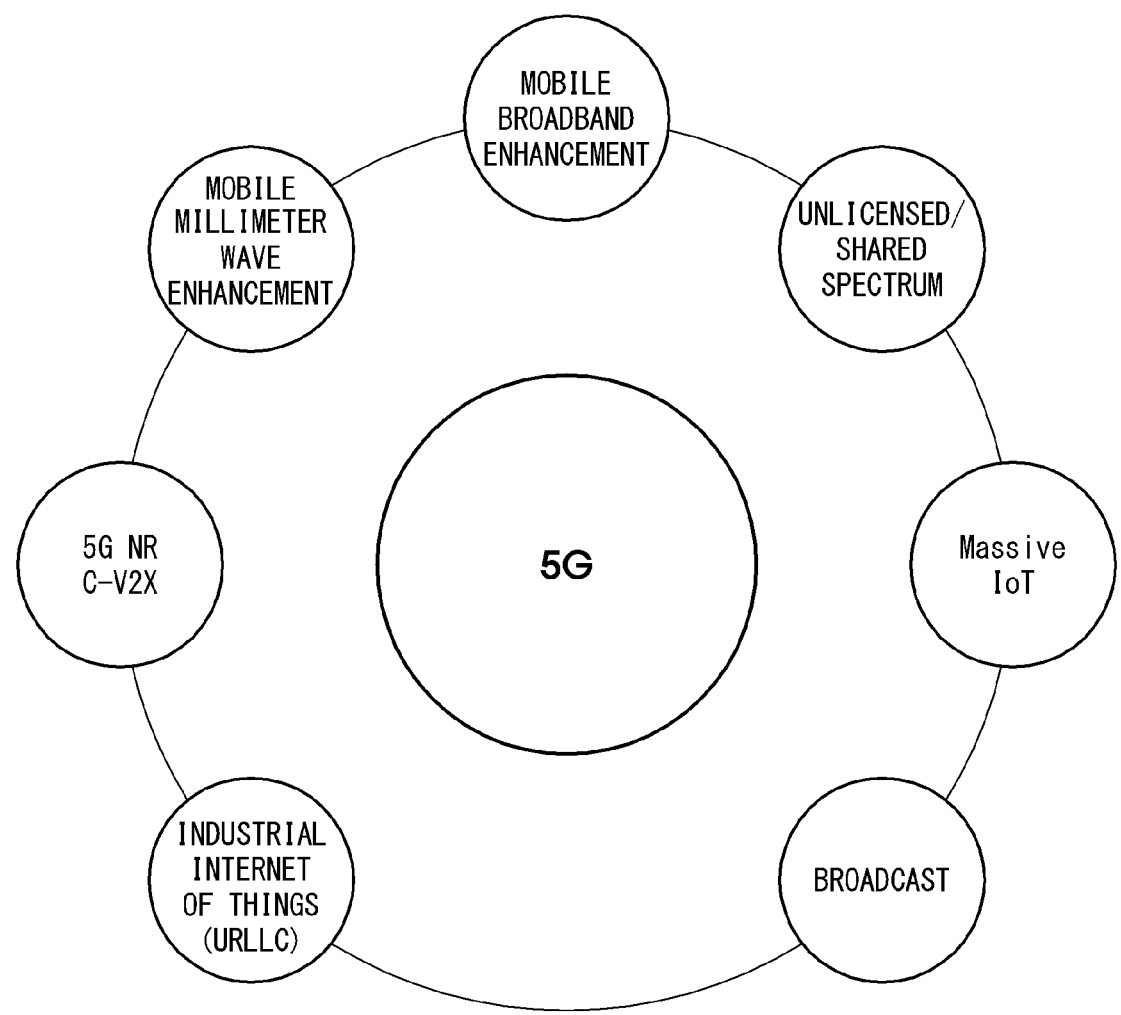

[FIG. 2]
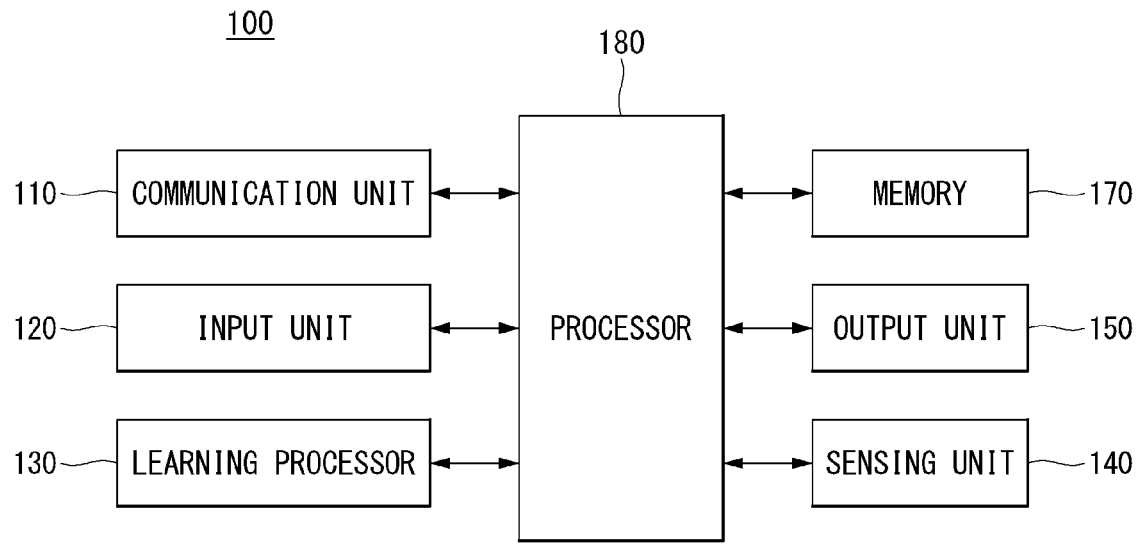
[FIG. 3]
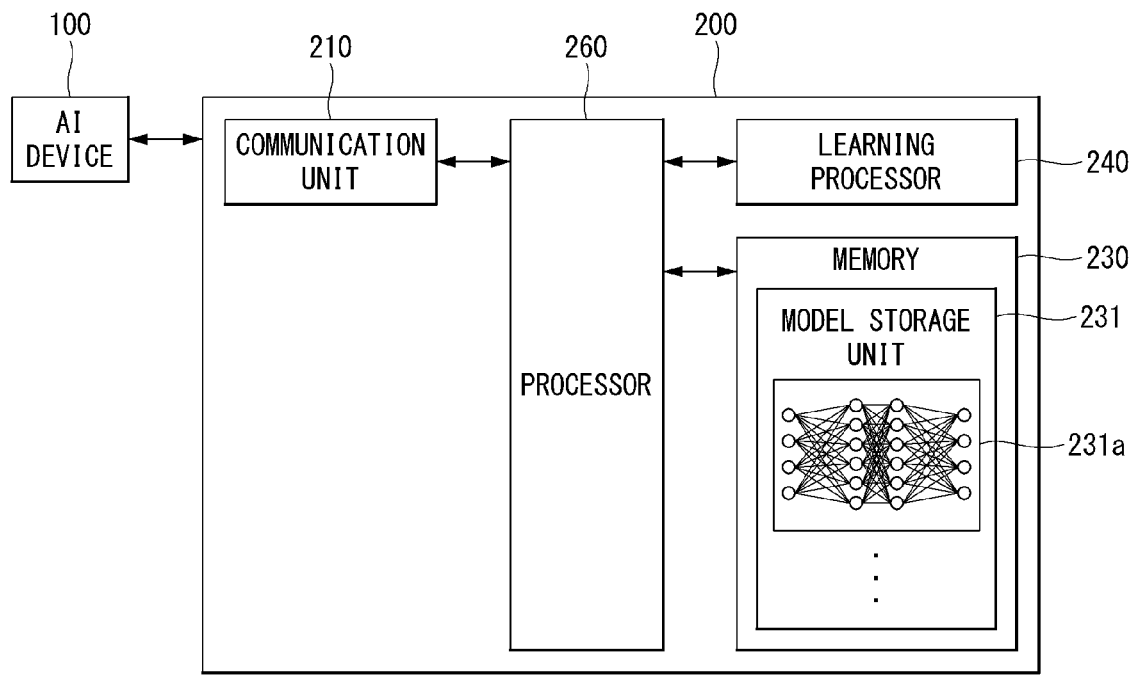

[FIG. 4]
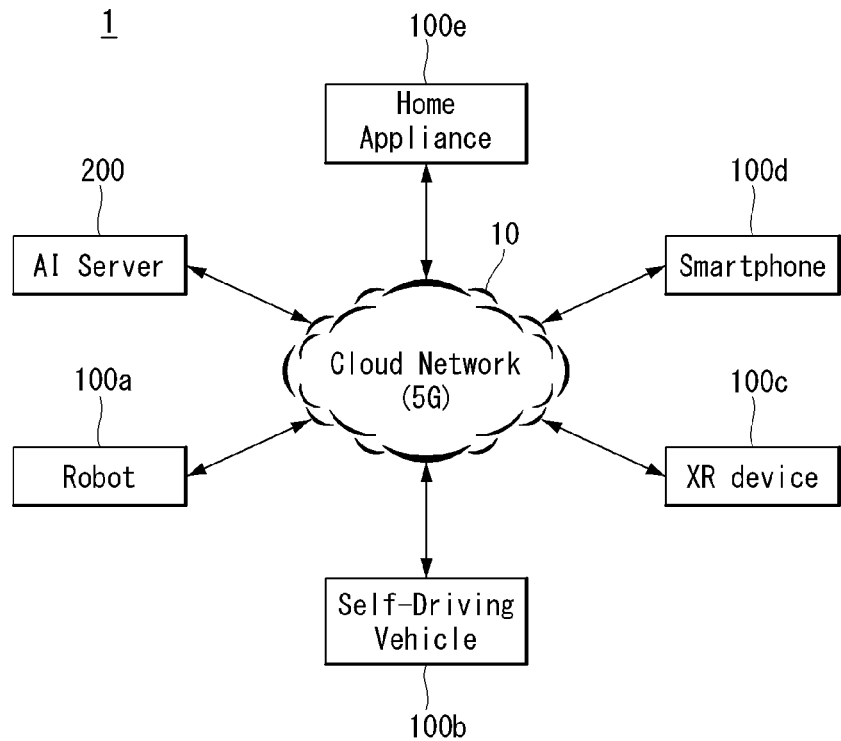
[FIG. 5]
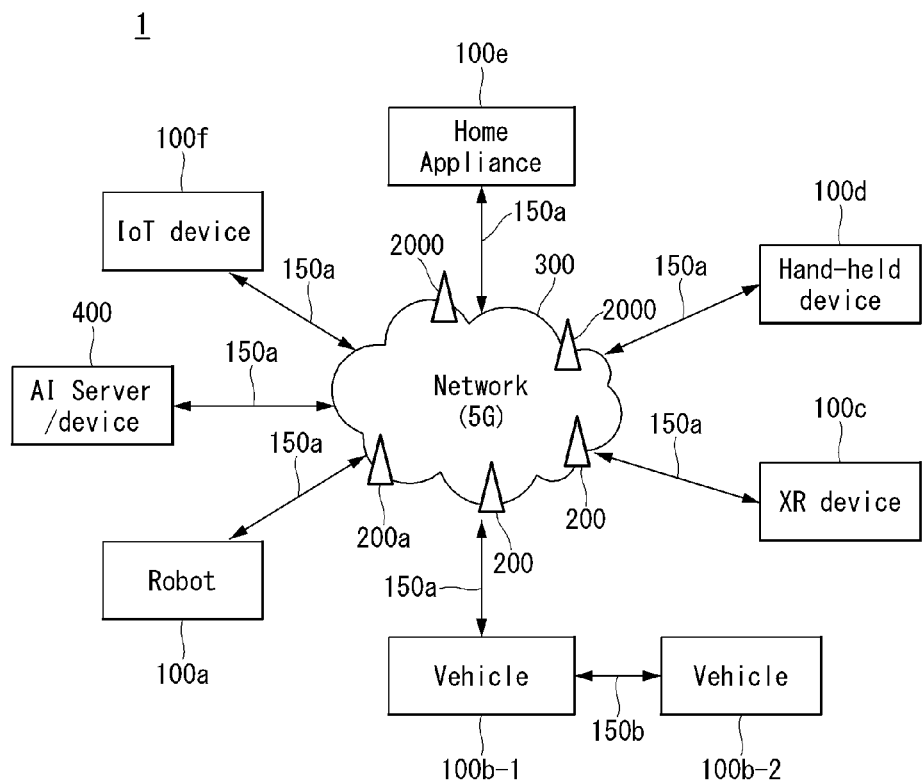

[FIG. 6]
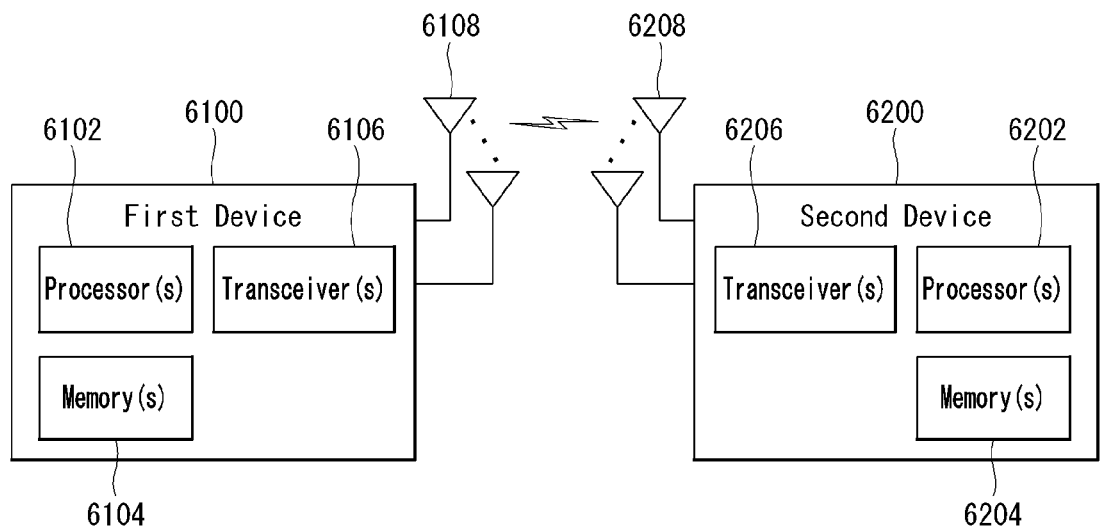
[FIG. 7]
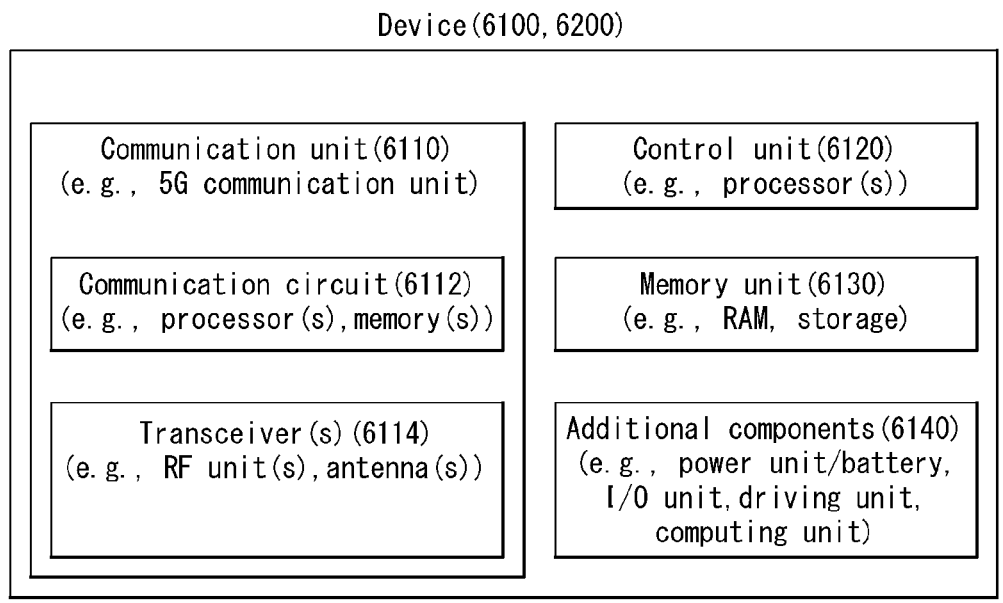

[FIG. 8]
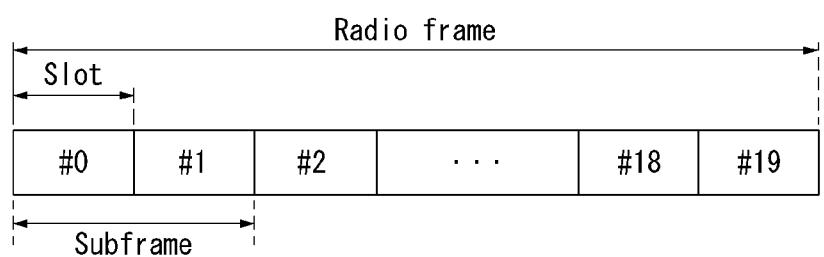

[FIG. 9]
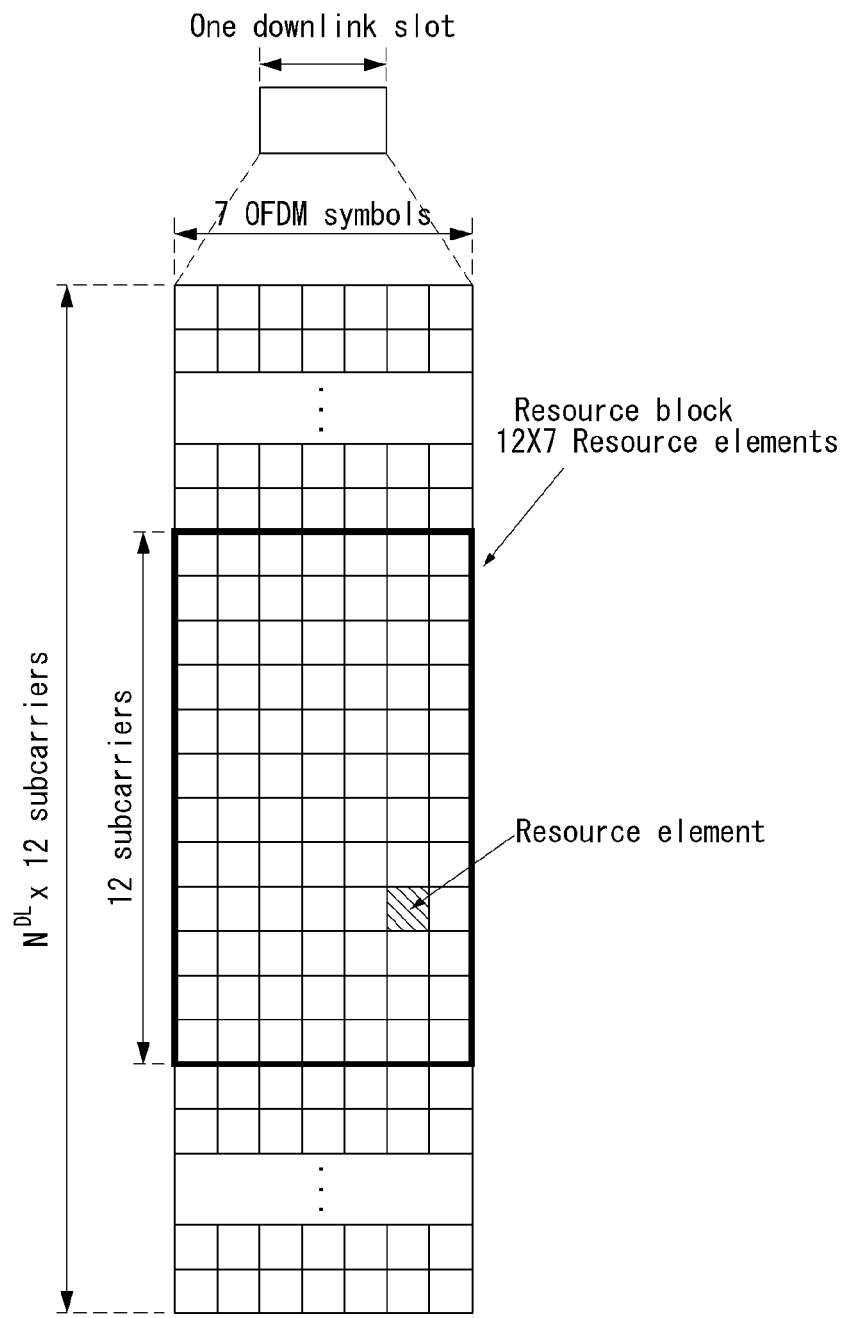

[FIG. 10]
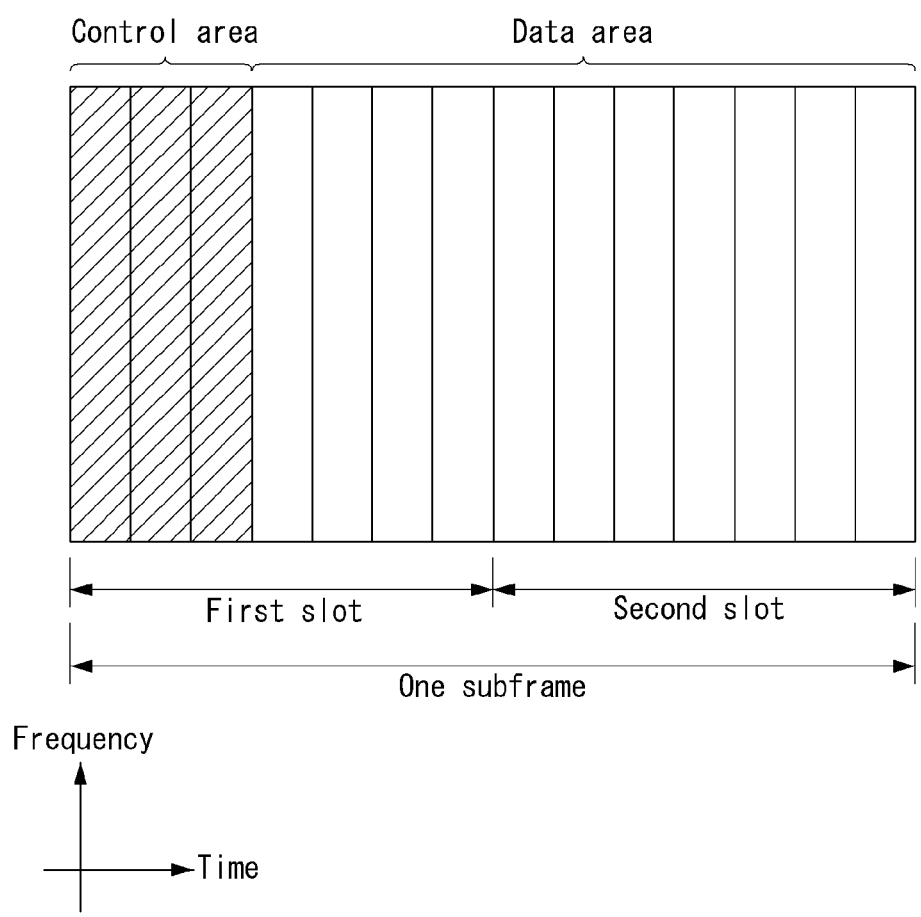

[FIG. 11]
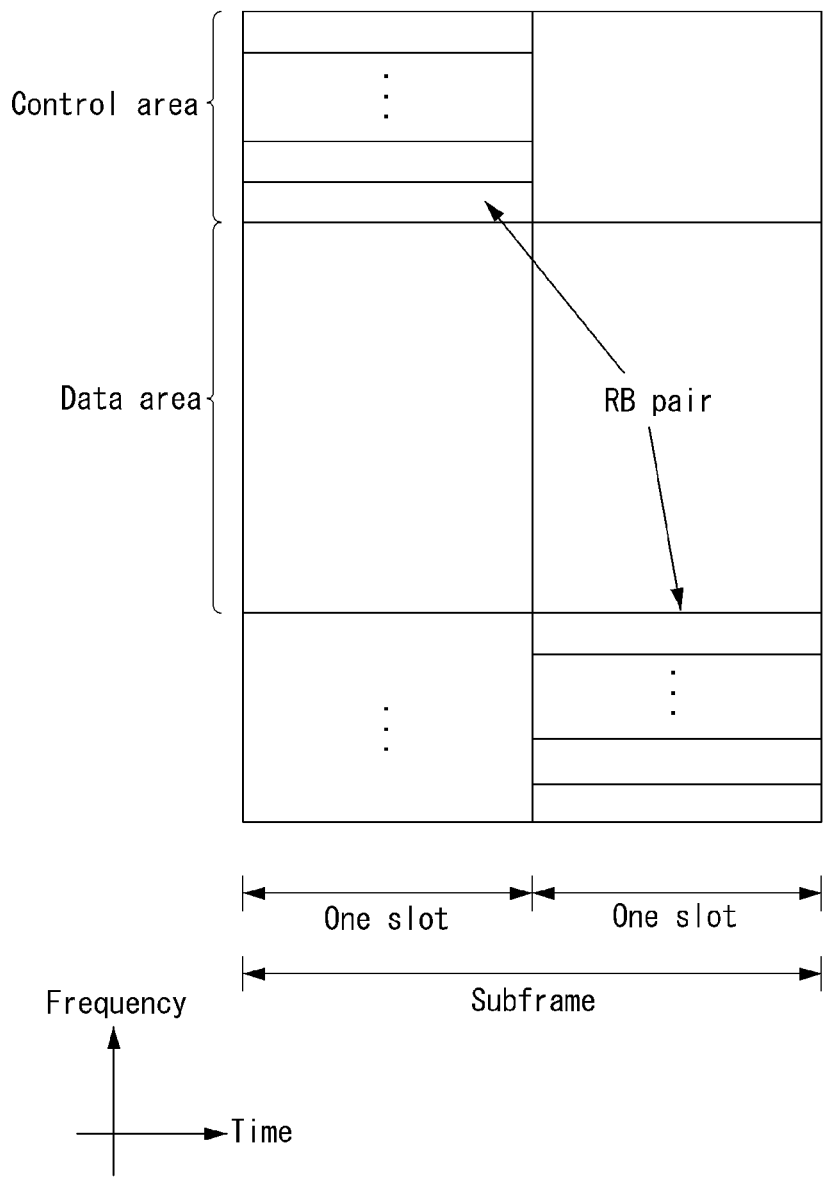
[FIG. 12]
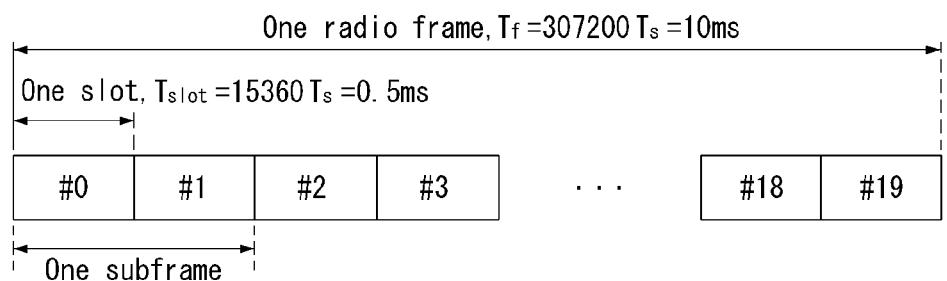

[FIG. 13]
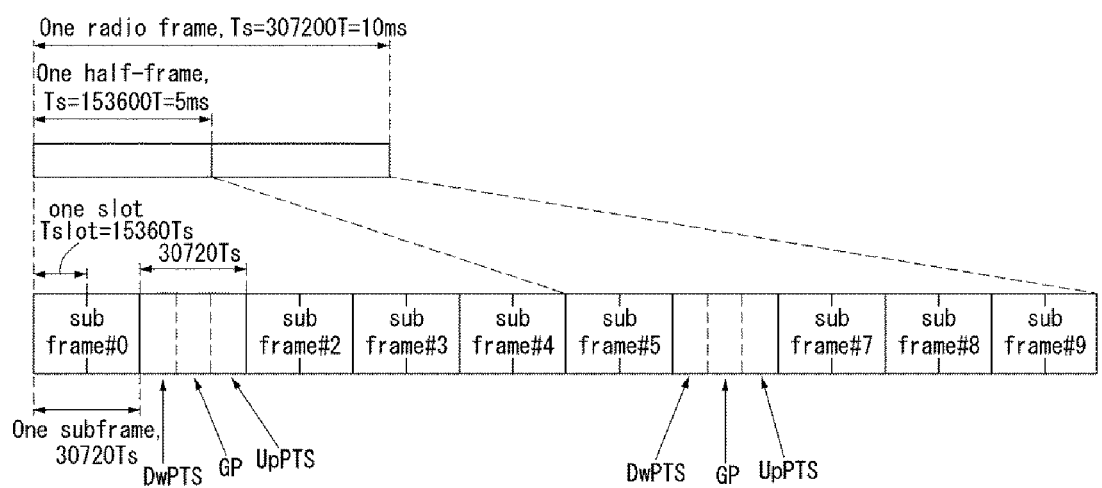

[FIG. 14]
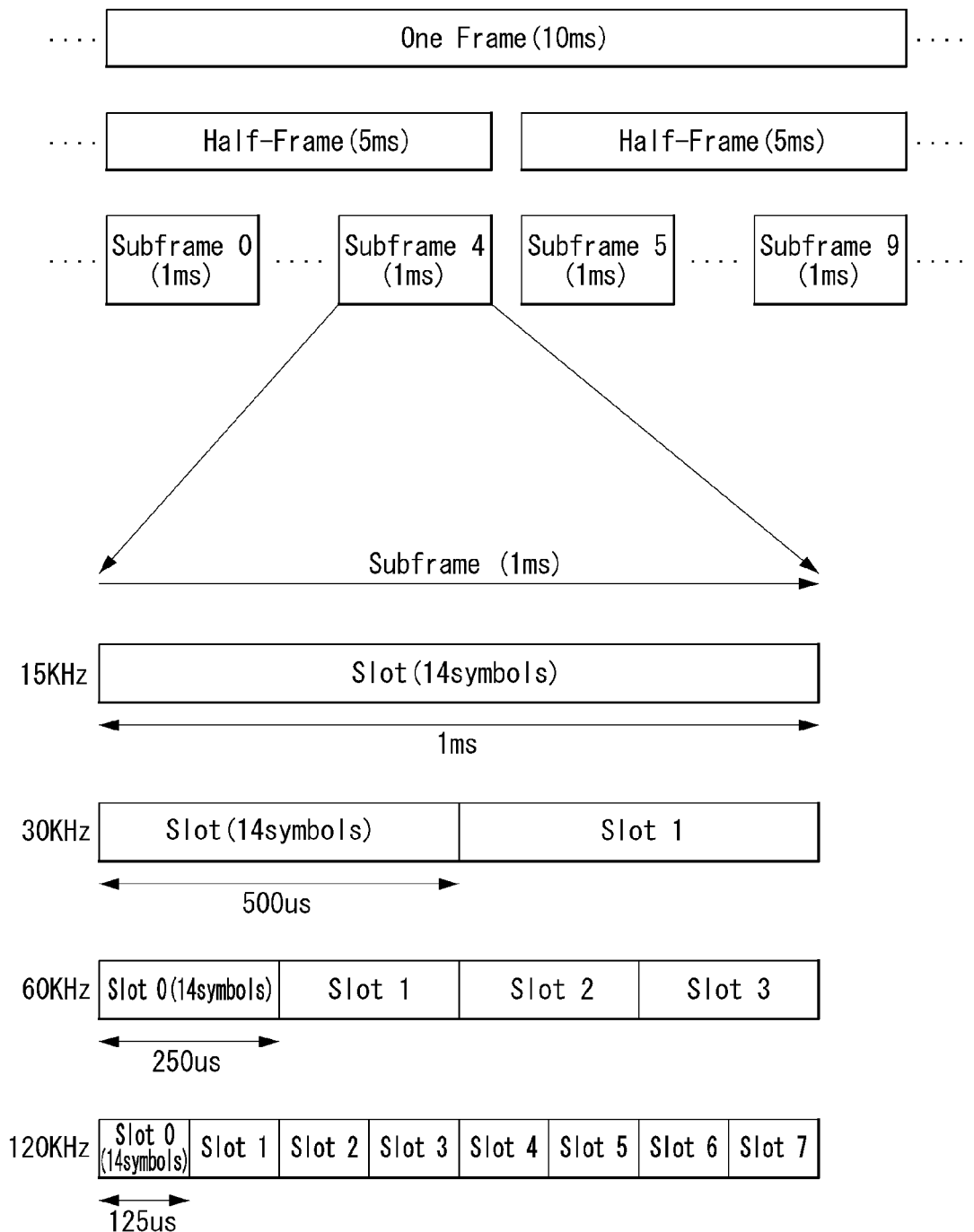

[FIG. 15]
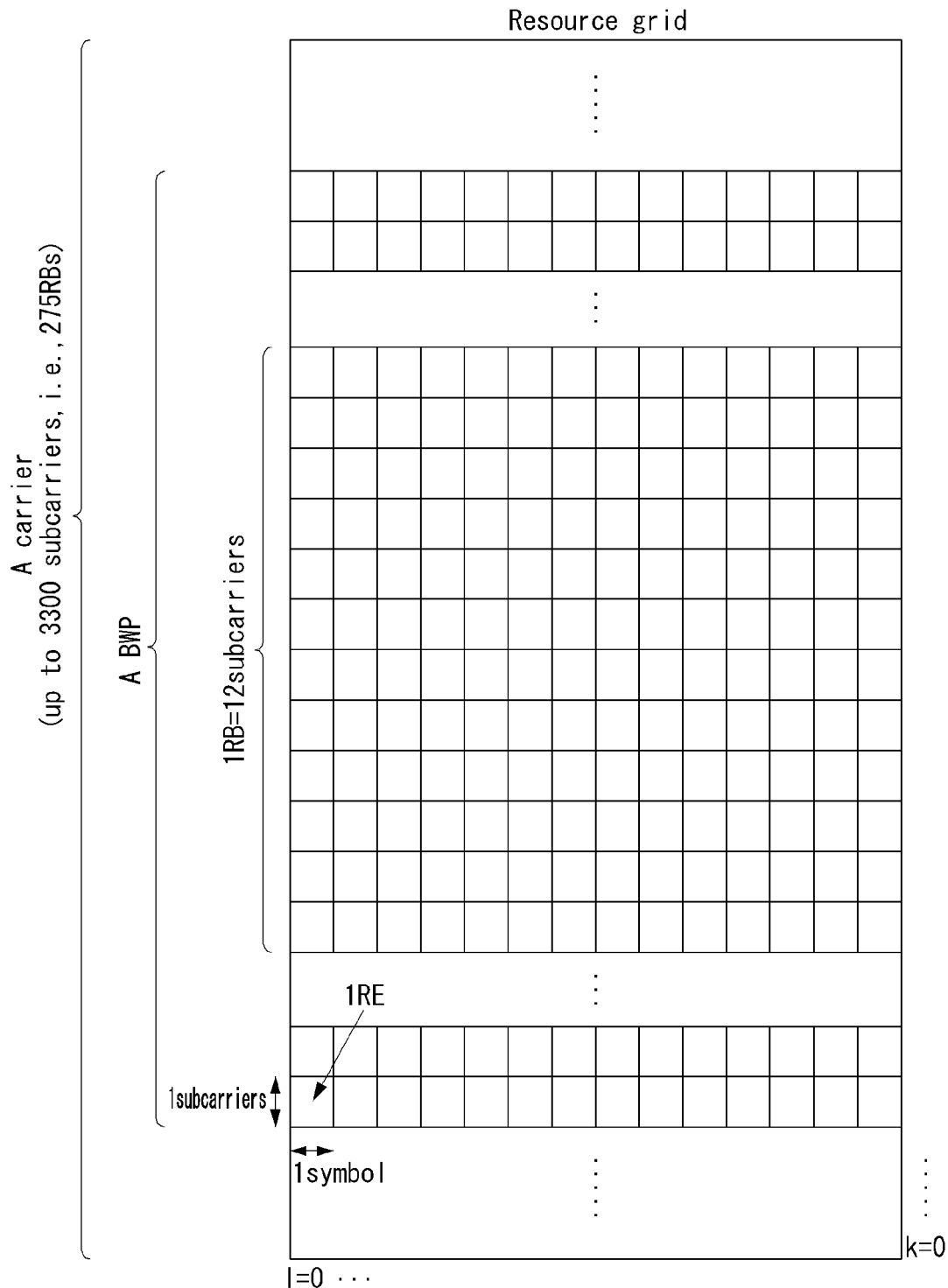

[FIG. 16]
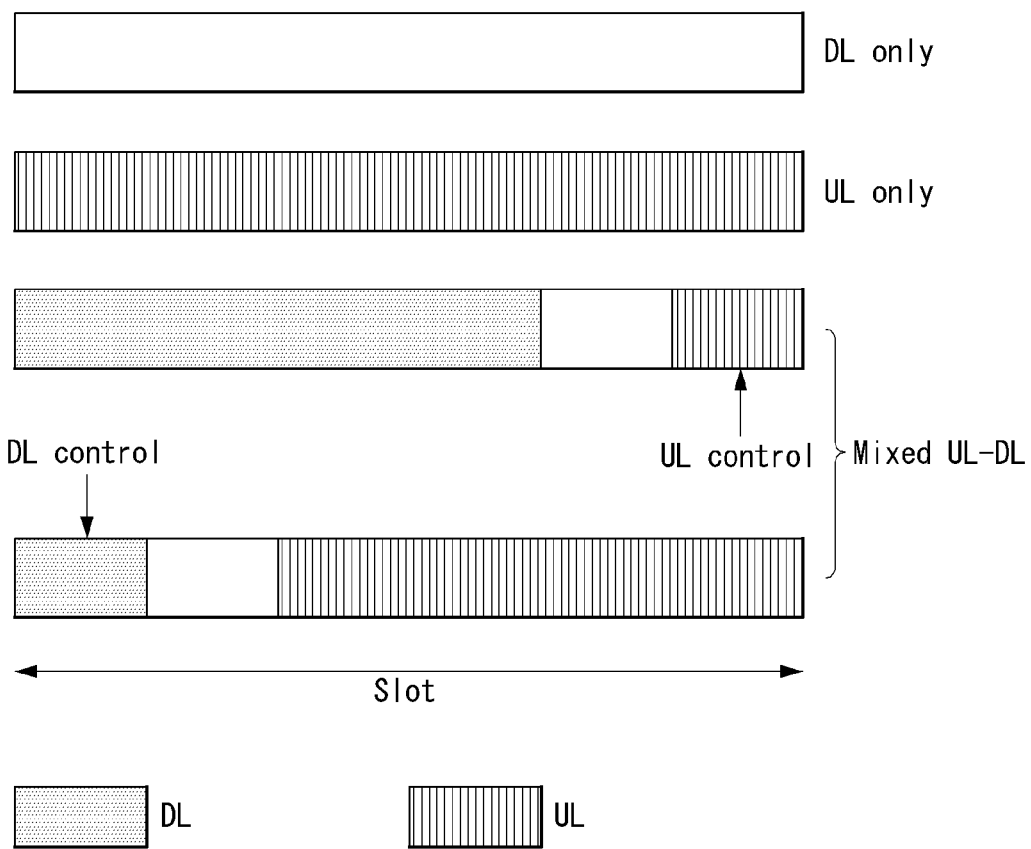

[FIG. 17]
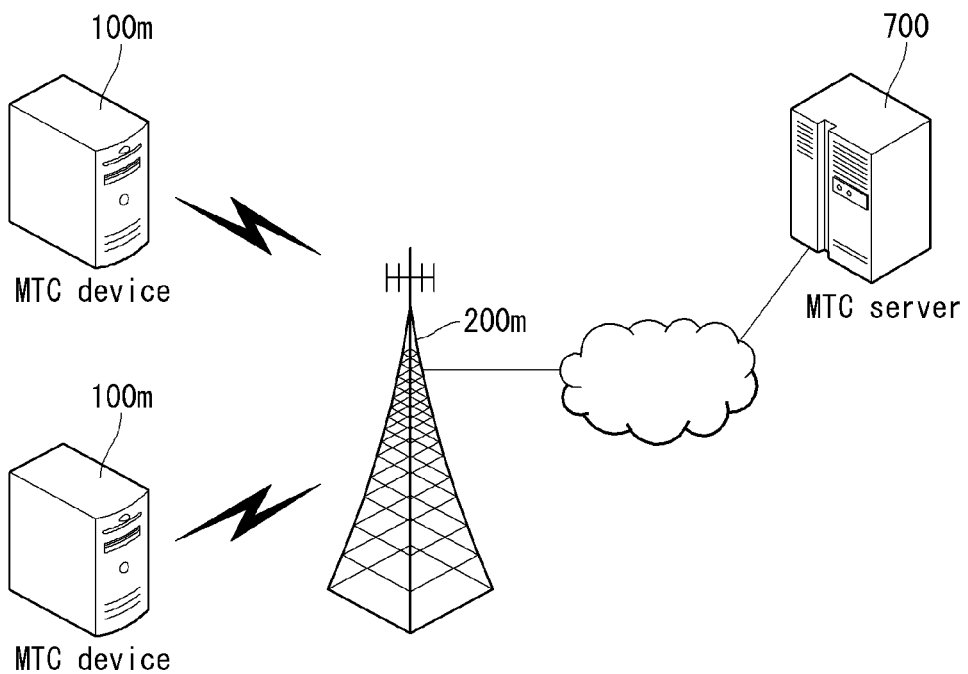
[FIG. 18]
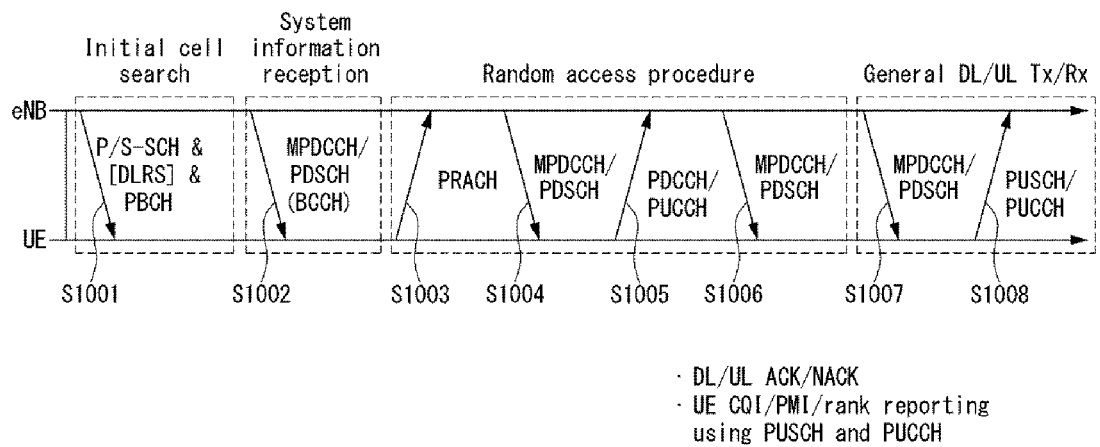

[FIG. 19]
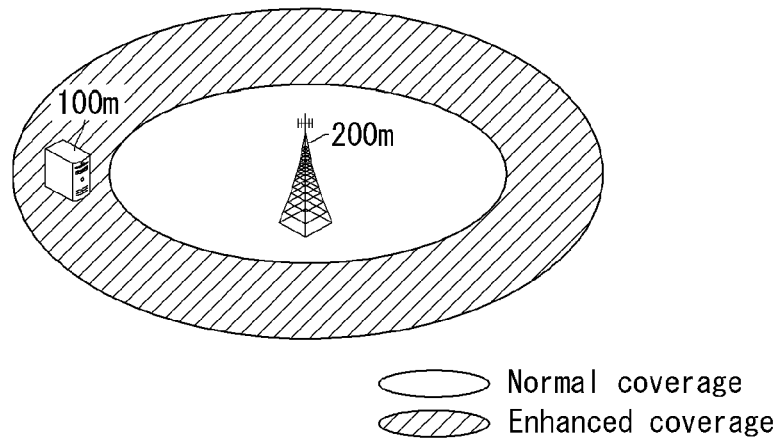
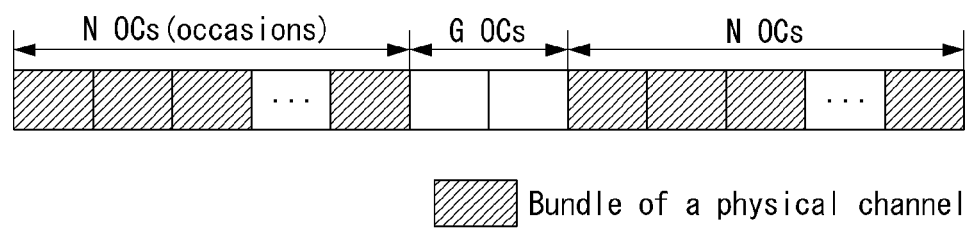
[FIG. 20]
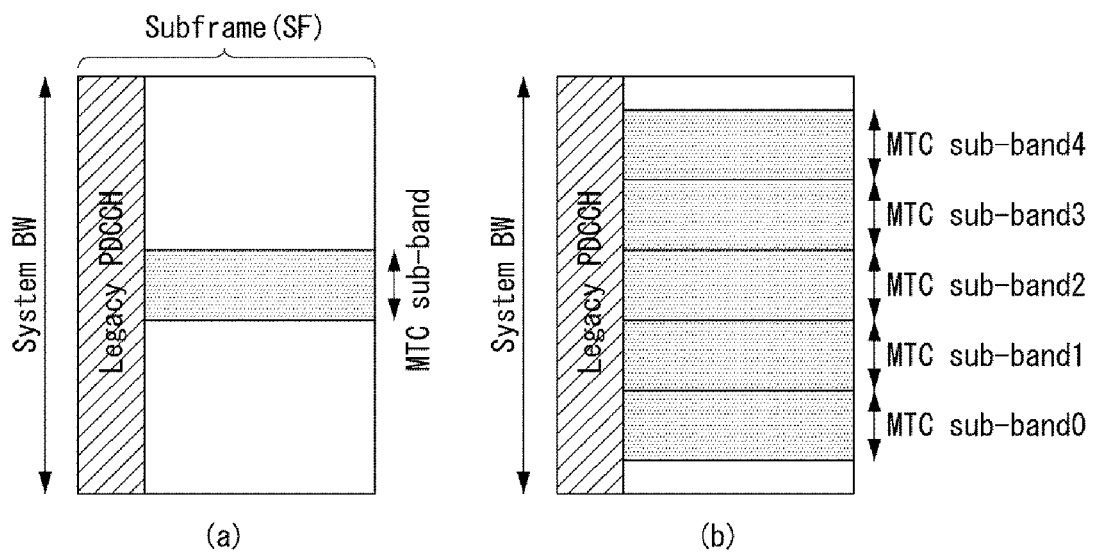

[FIG. 21]
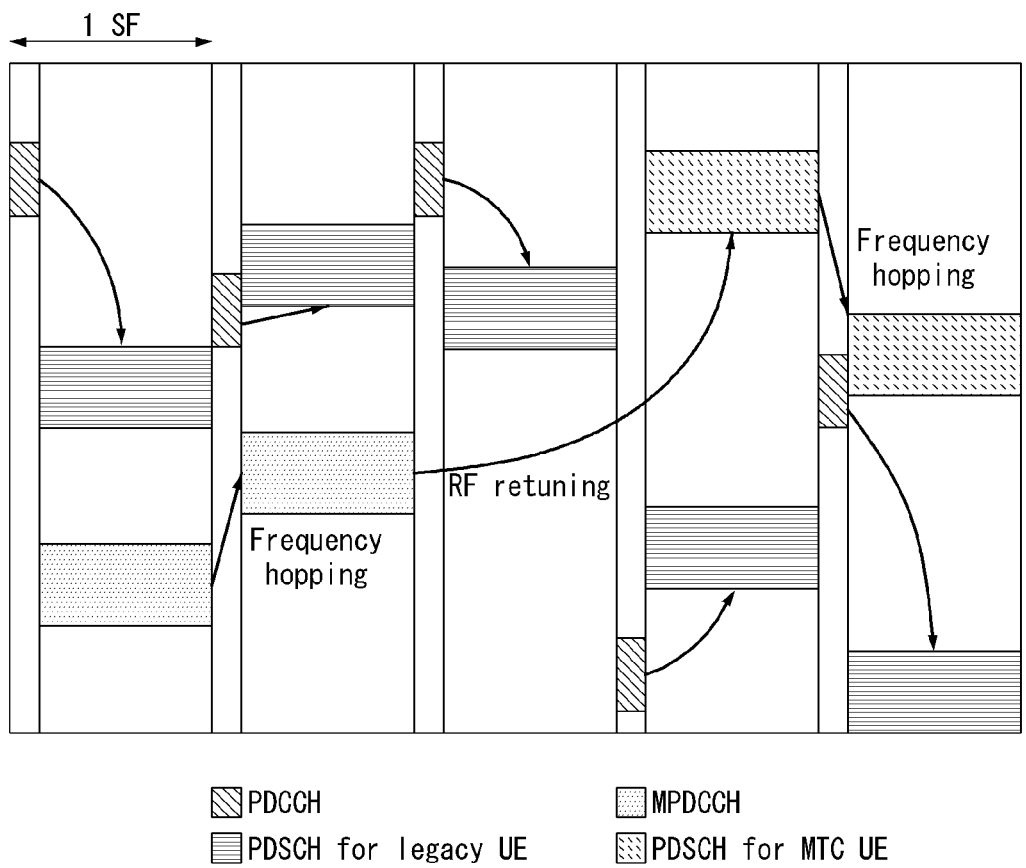
[FIG. 22]
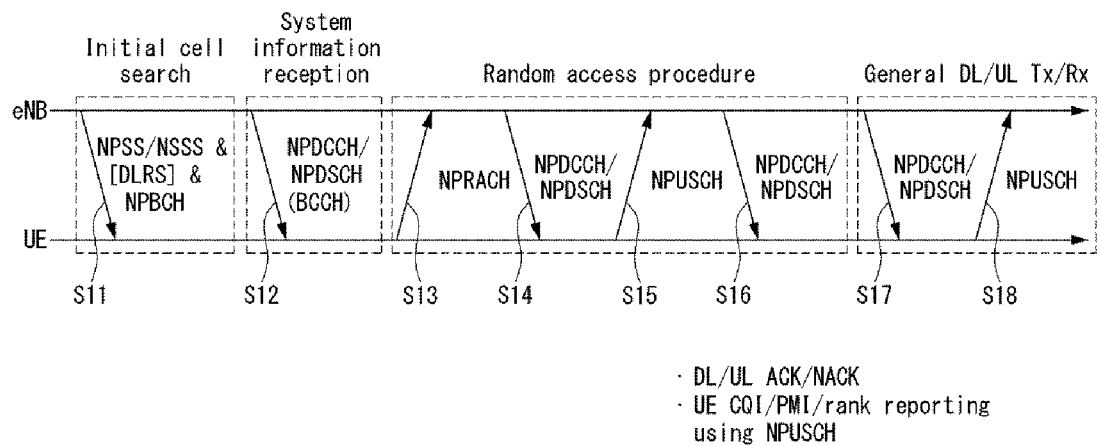

[FIG. 23]
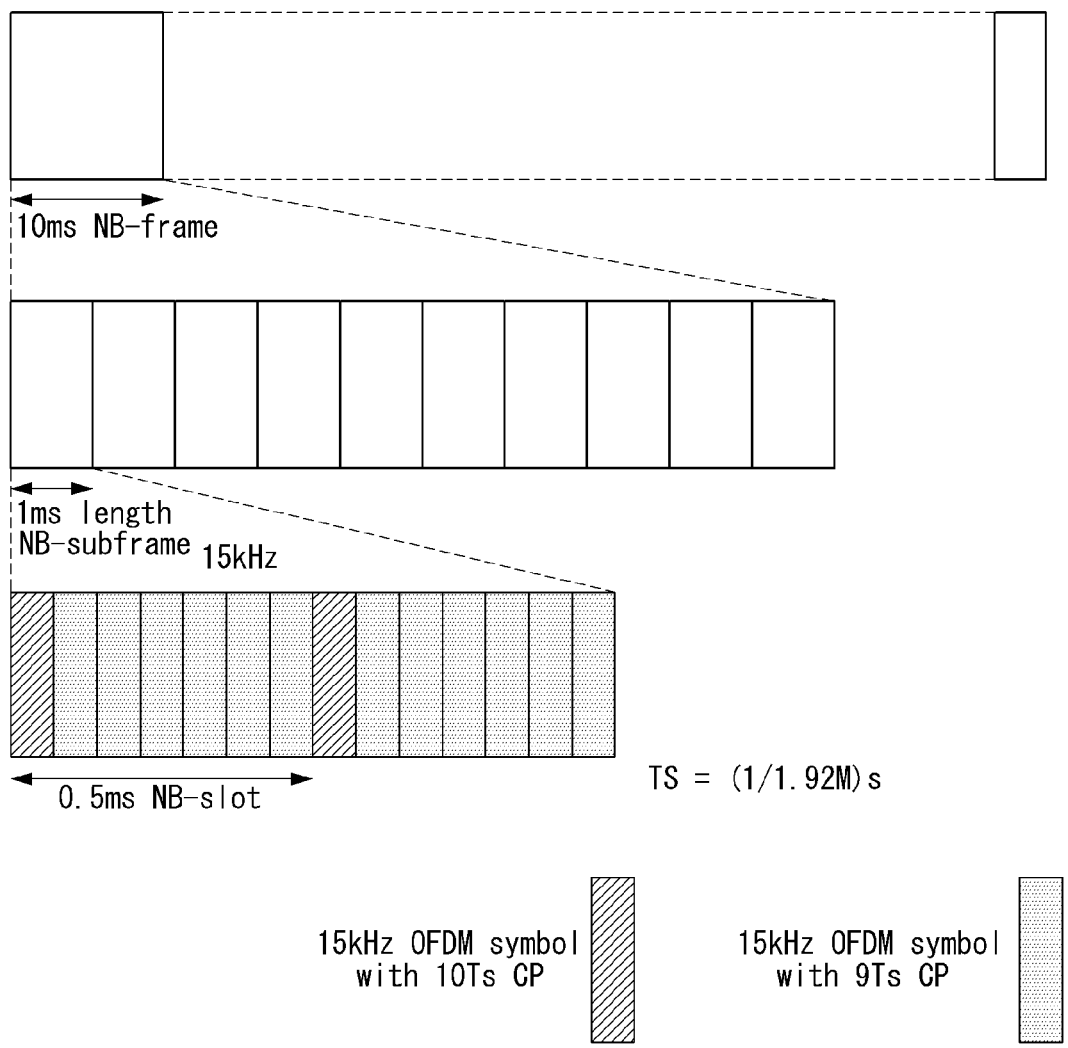

[FIG. 24]
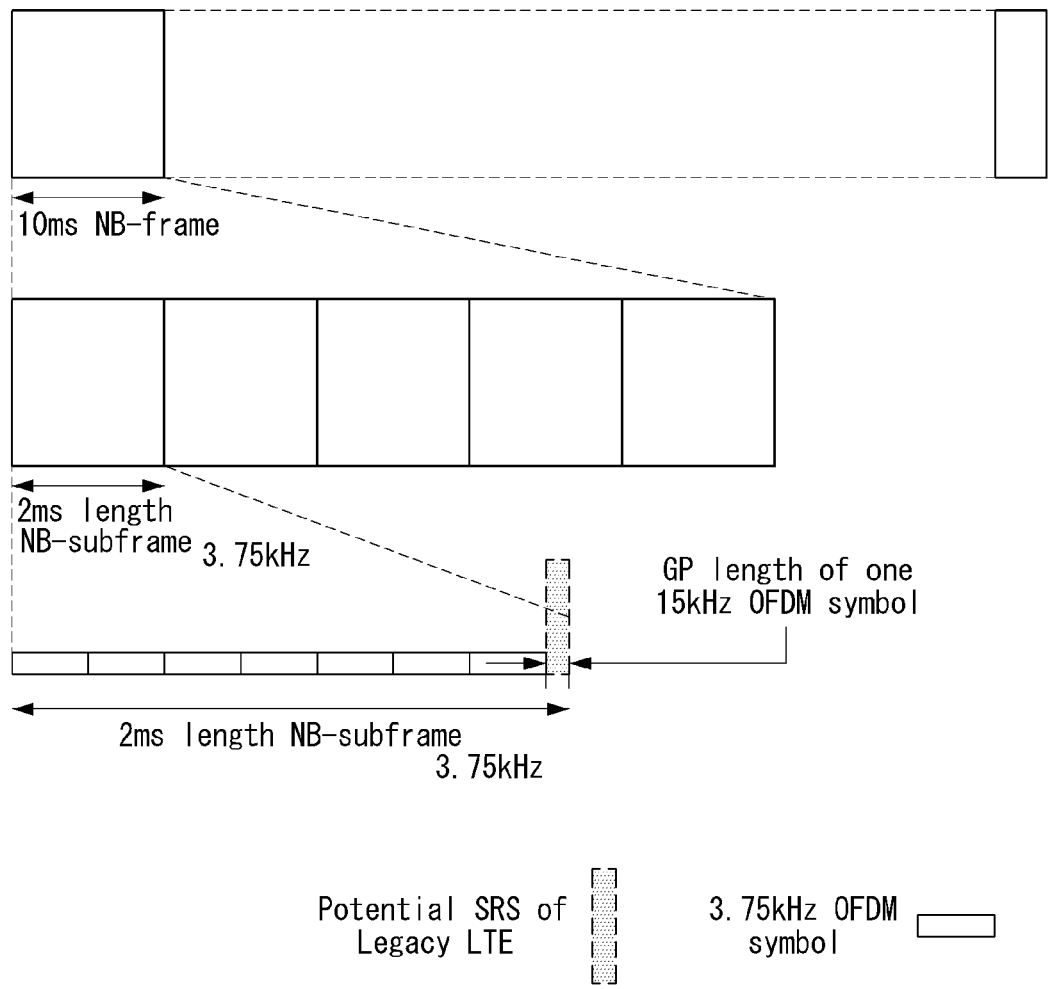

[FIG. 25]
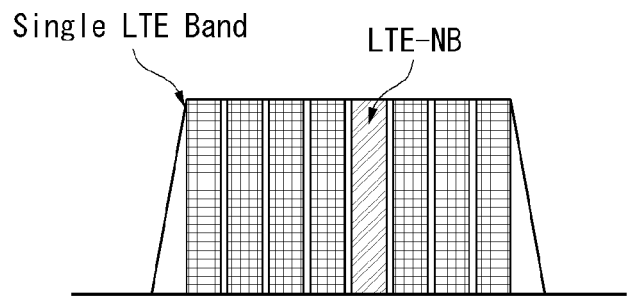
(a) In-band system
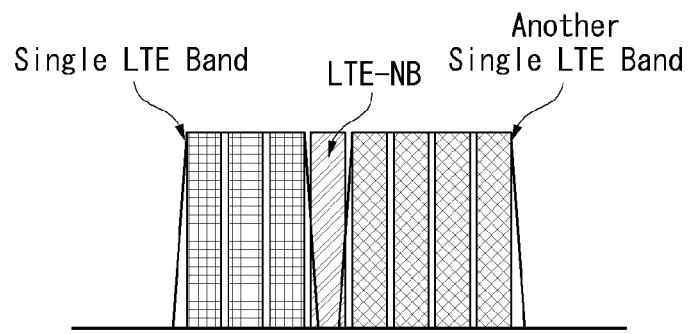
(b) Guard-band system
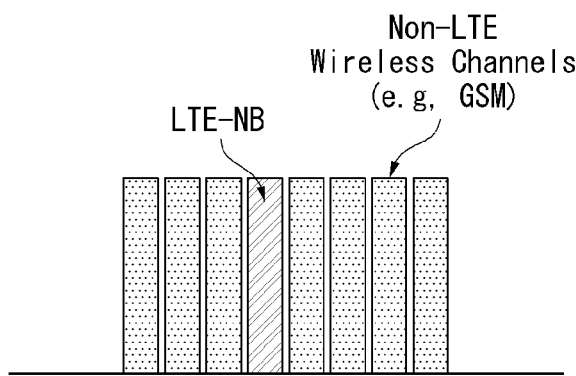
(c) Stand-alone system

[FIG. 26]
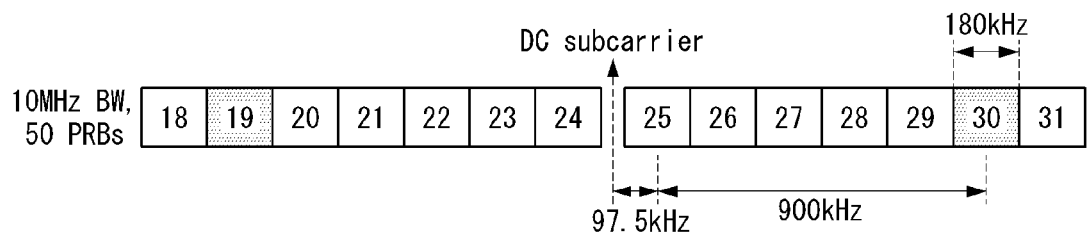
[FIG. 27]
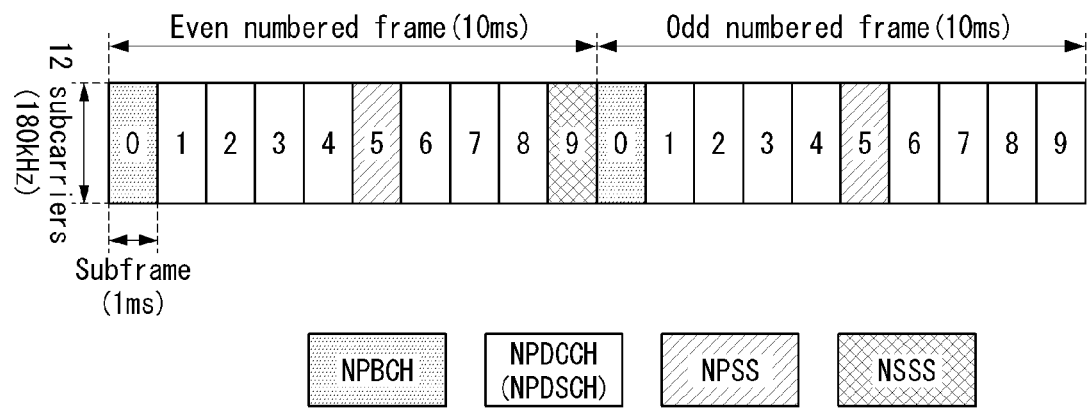
[FIG. 28]
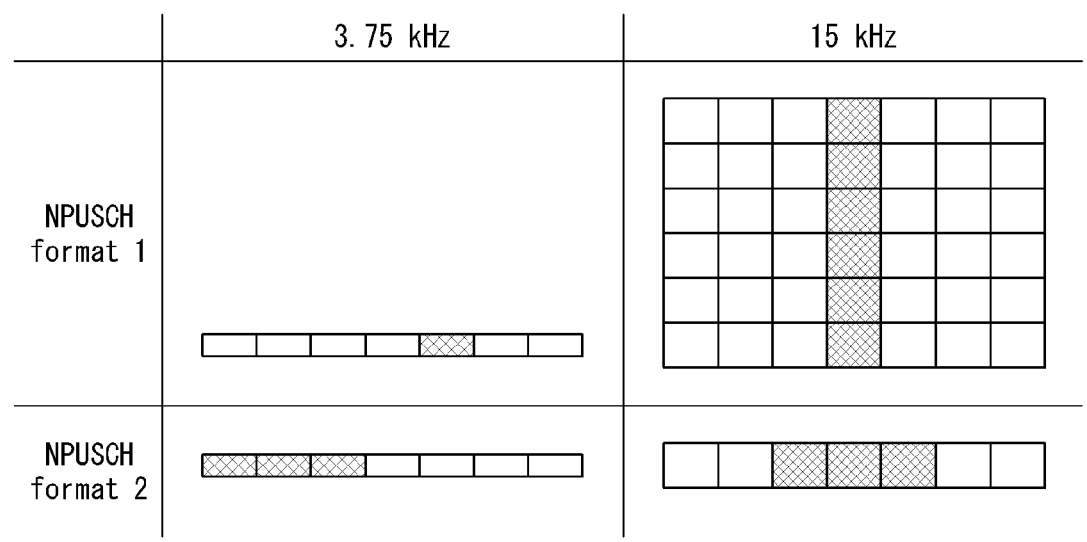

[FIG. 29]
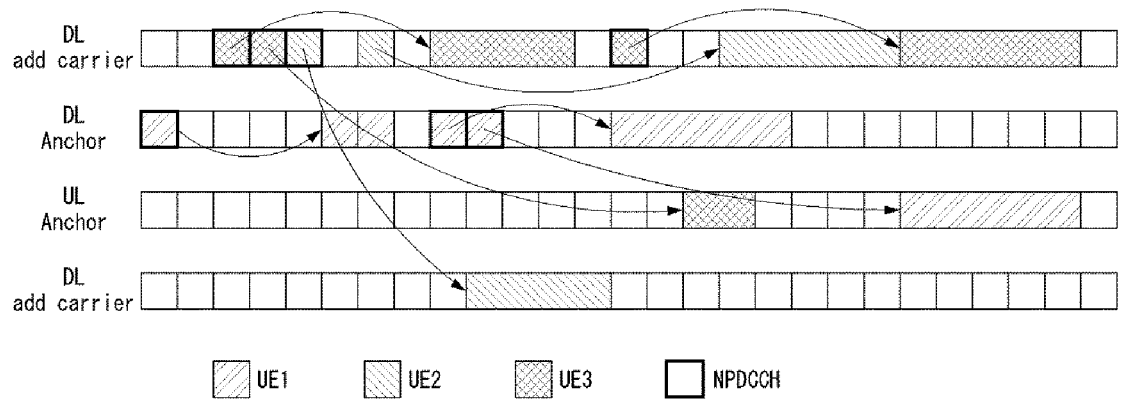
[FIG. 30]
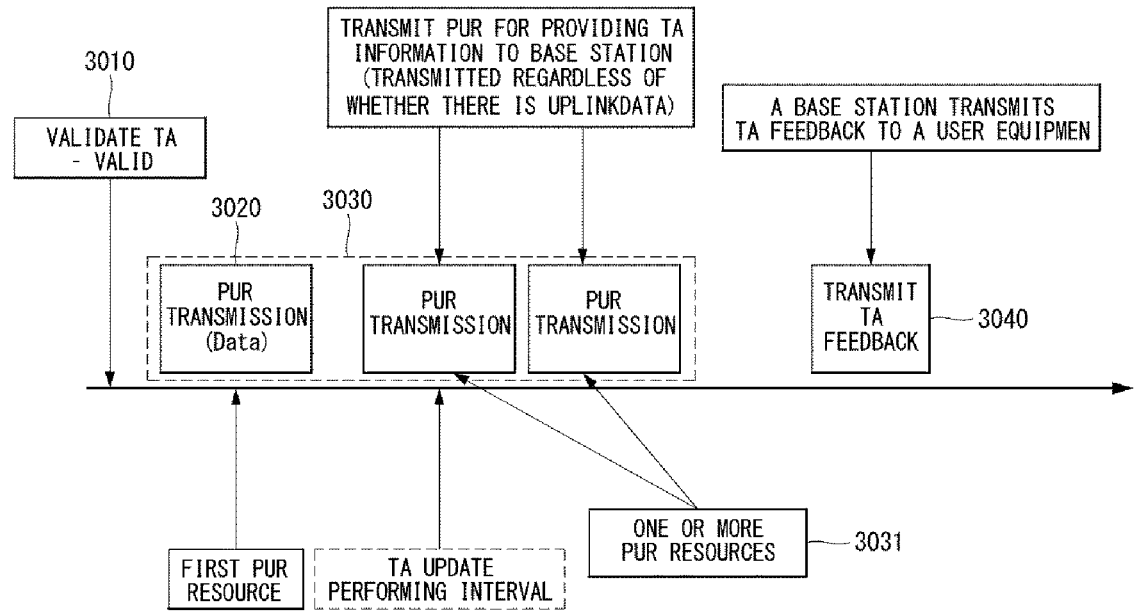

[FIG. 31]
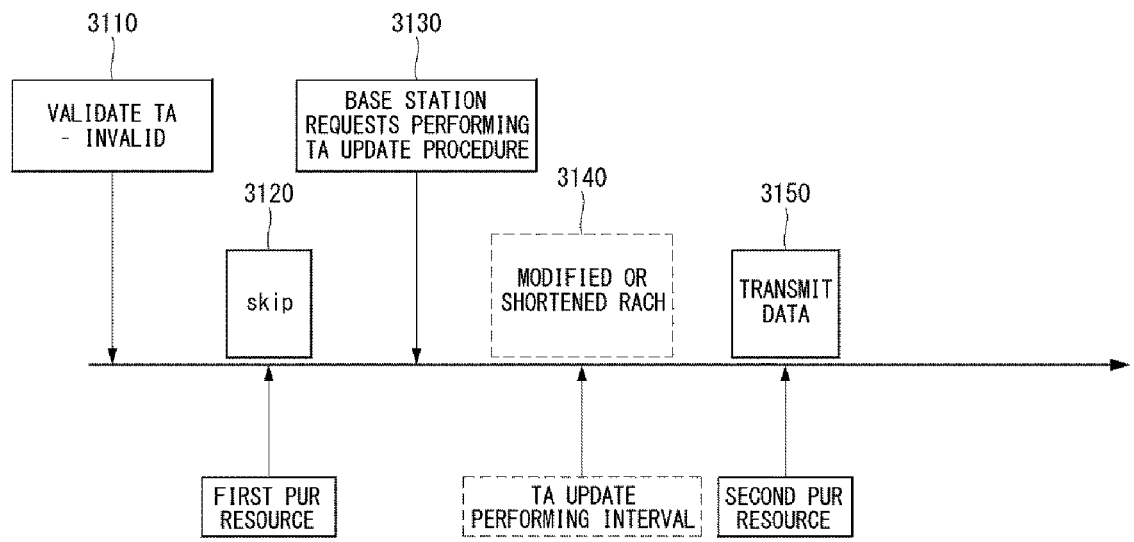
[FIG. 32]
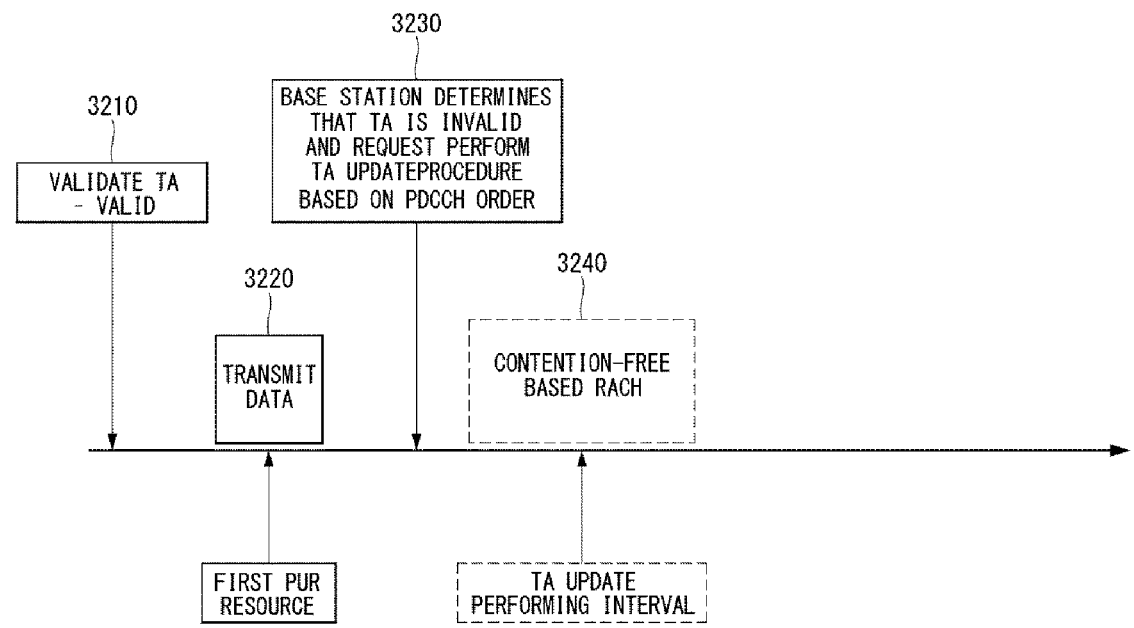

[FIG. 33]
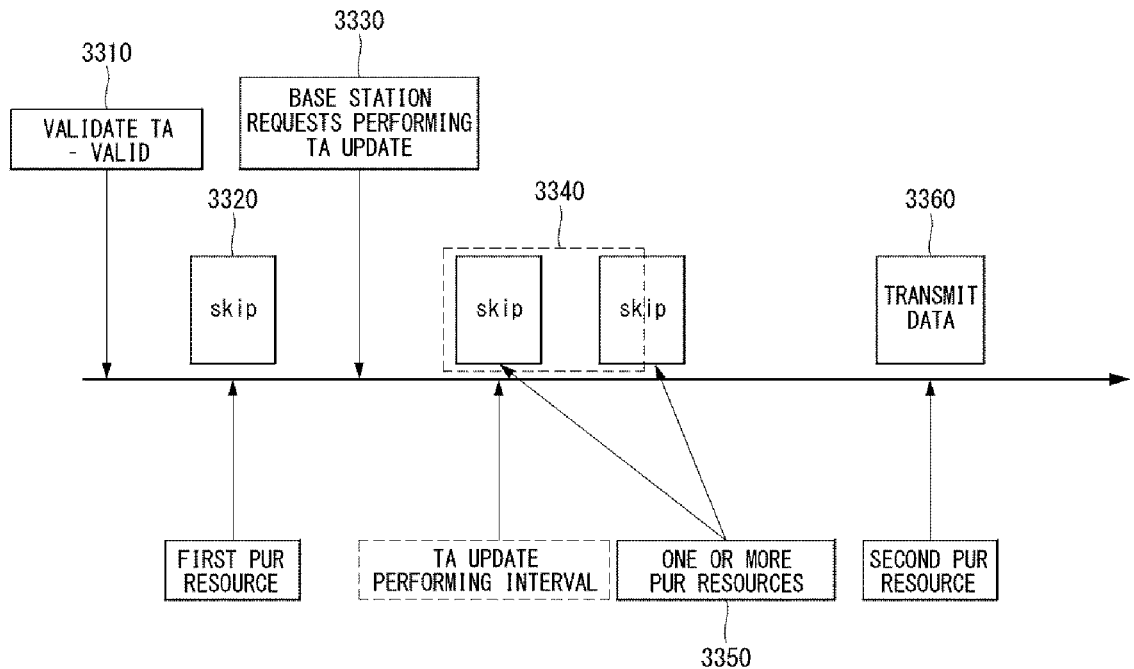
[FIG. 34]
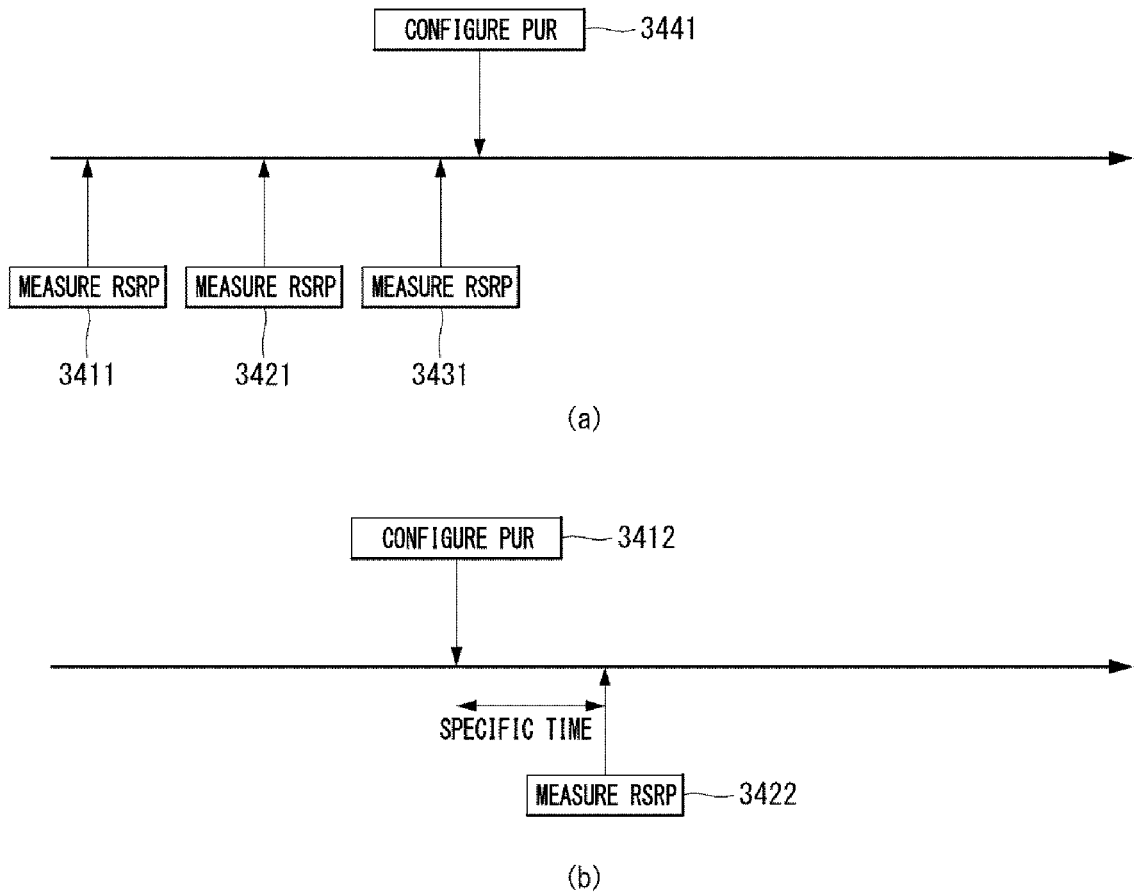

[FIG. 35]
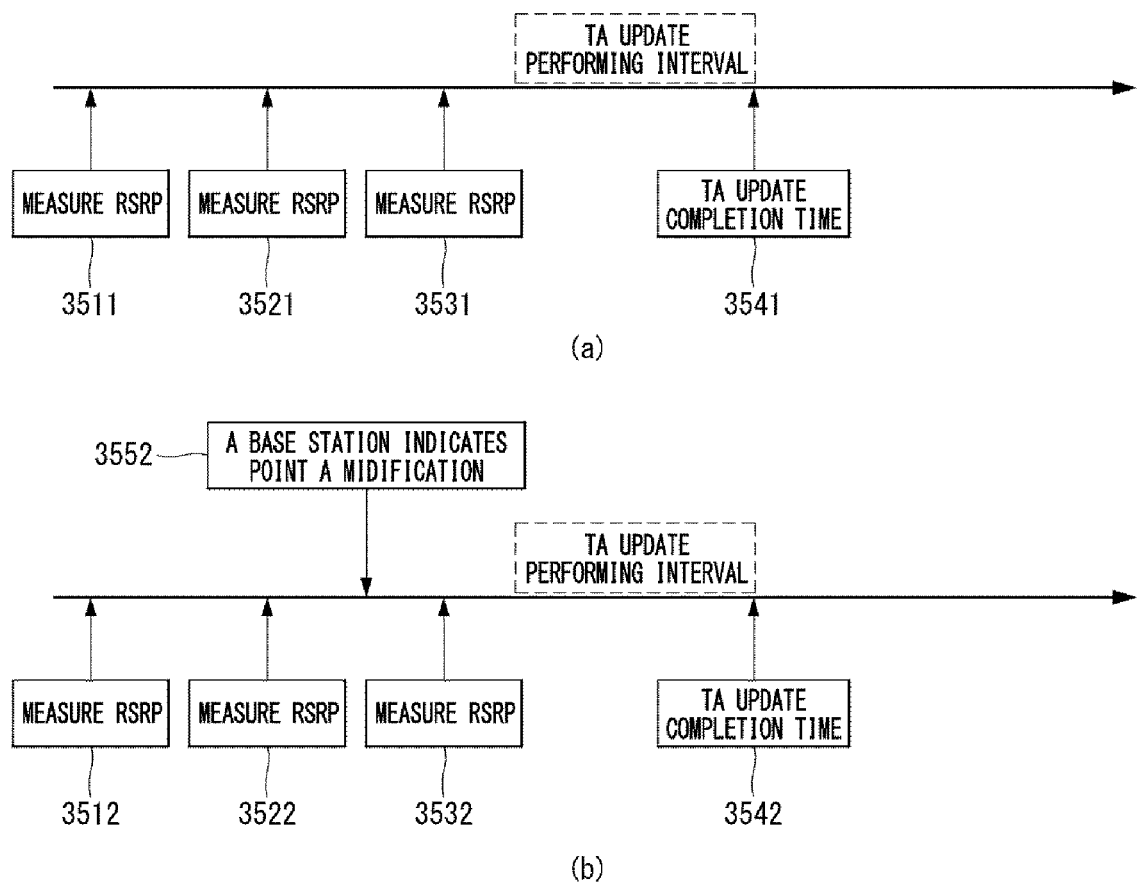

[FIG. 36]
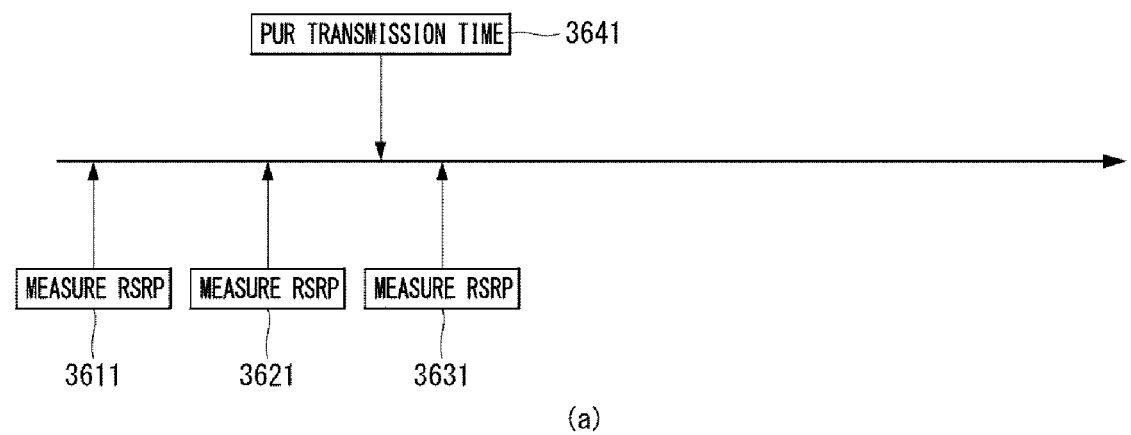
(a)
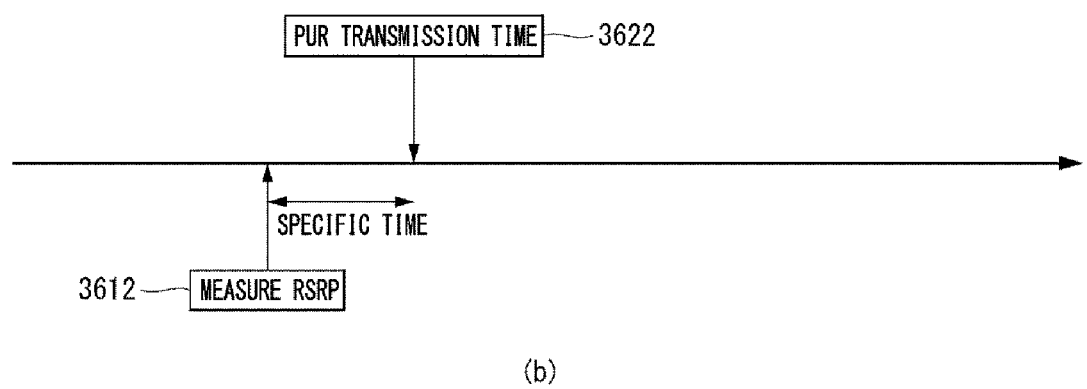
(b)

[FIG. 37]
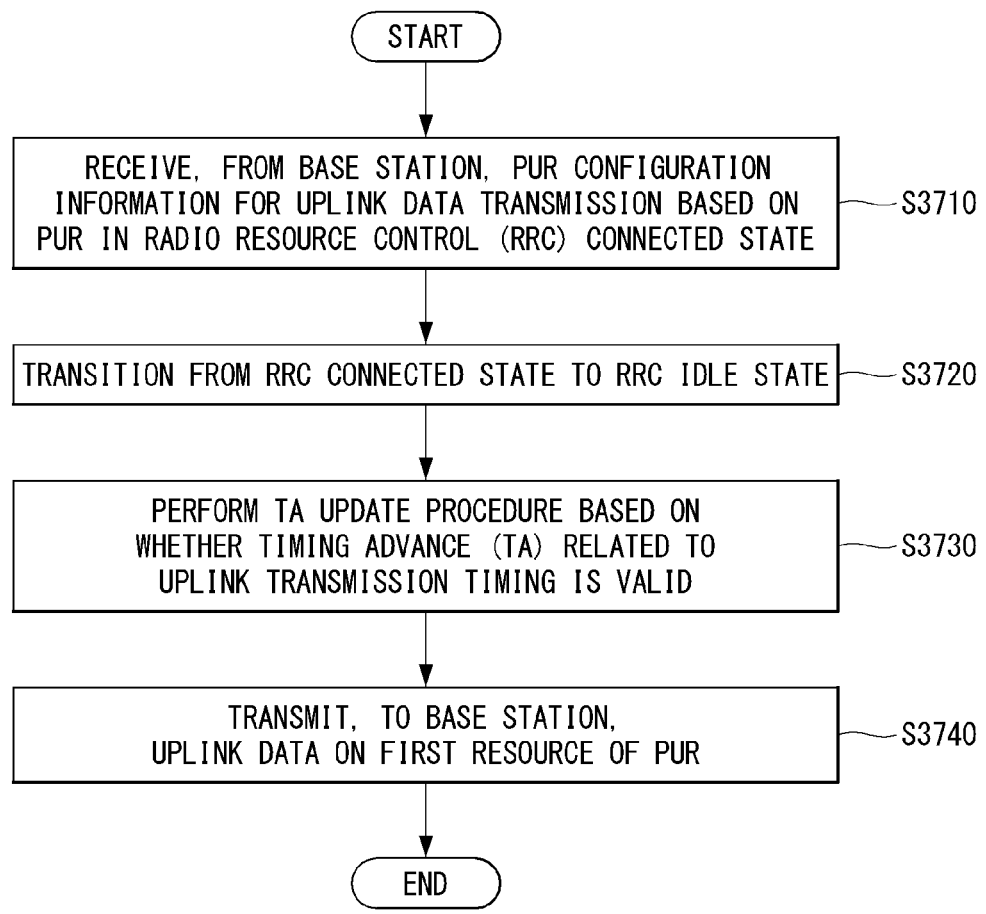

[FIG. 38]
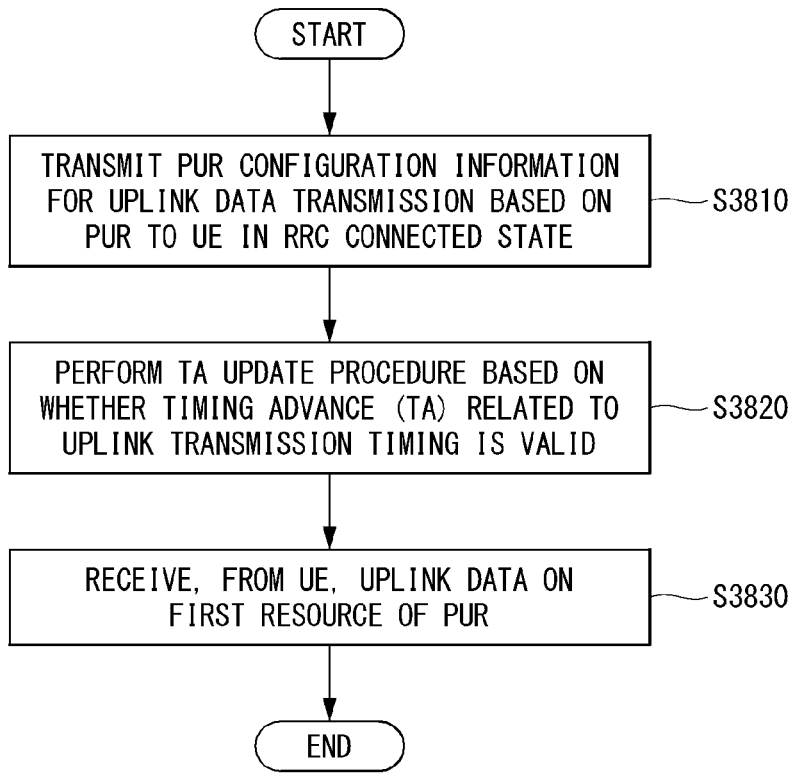
[FIG. 39]
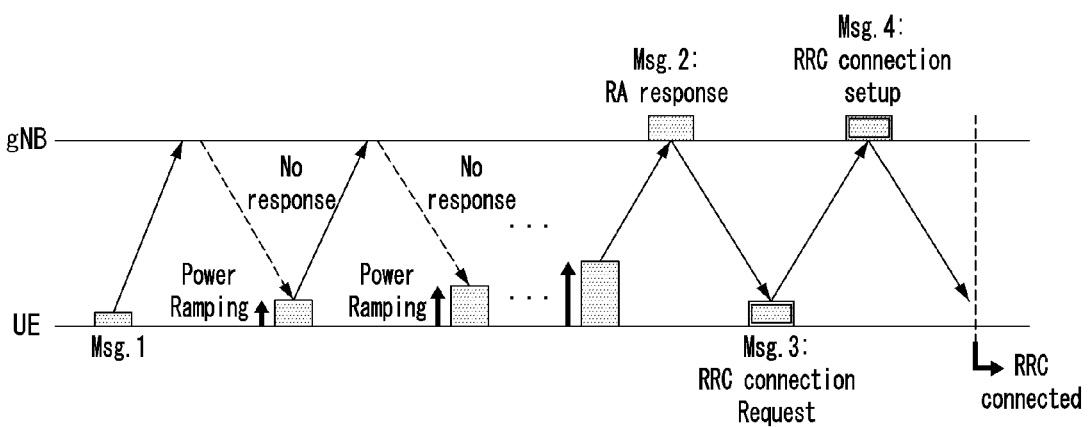

[FIG. 40]
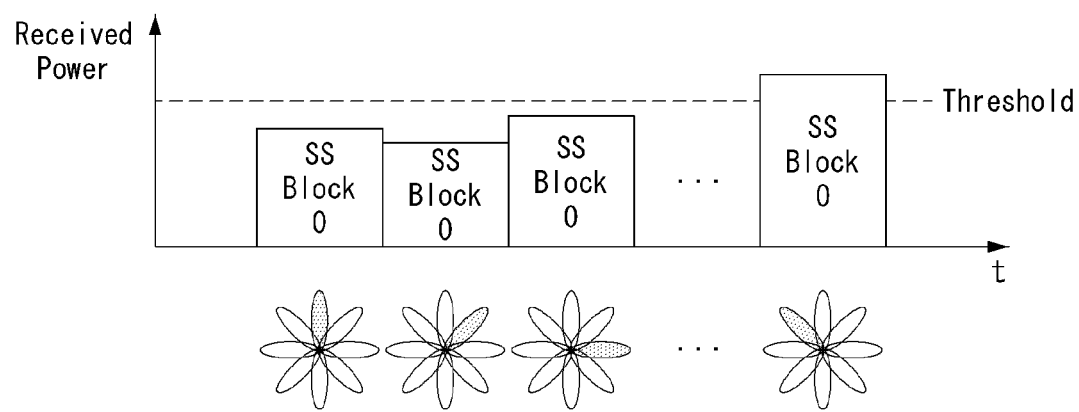
[FIG. 41]
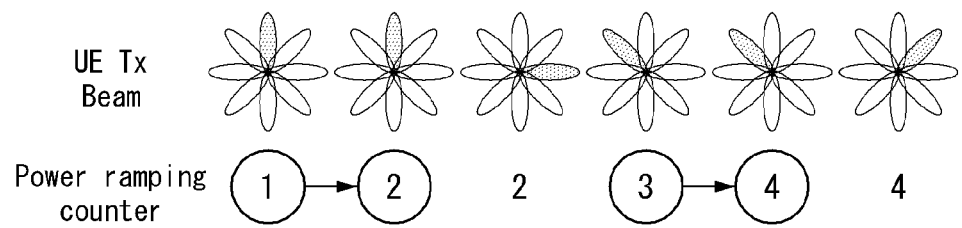

METHOD FOR TRANSMITTING UPLINK DATA THROUGH PRECONFIGURED UPLINK RESOURCE IN WIRELESS COMMUNICATION SYSTEM, AND APPARATUS THEREFOR

CROSS-REFERENCE TO RELATED APPLICATIONS

This application is a National Stage Application under 35 U.S.C. § 371 of International Application No. PCT/KR2020/002257, filed on Feb. 17, 2020, which claims the benefit of Korean Patent Application No. 10-2019-0123433, filed on Oct. 4, 2019, Korean Patent Application No. 10-2019-0052614, filed on May 3, 2019, Korean Patent Application No. 10-2019-0036402, filed on Mar. 28, 2019, Korean Patent Application No. 10-2019-0018230, filed on Feb. 15, 2019. The disclosures of the prior applications are incorporated by reference in their entirety.

TECHNICAL FIELD

The present disclosure relates to a wireless communication system, and more particularly, to a method for transmitting uplink data through a preconfigured uplink resource, and an apparatus therefor.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

The present disclosure provides a method and an apparatus for transmitting uplink data through a preconfigured uplink resource.

Further, the present disclosure provides a method and an apparatus for updating a timing advance (TA) for transmitting the uplink data through the preconfigured uplink resource.

Further, the present disclosure provides a method and an apparatus for validating an availability of the timing advance (TA) for transmitting the uplink data through the preconfigured uplink resource.

The technical objects of the present disclosure are not limited to the aforementioned technical objects, and other technical objects, which are not mentioned above, will be apparently appreciated by a person having ordinary skill in the art from the following description.

Technical Solution

The present disclosure provides a method for transmitting uplink data through a preconfigured uplink resource in a wireless communication system, and an apparatus therefor.

Specifically, in the present disclosure, a method, by a user equipment (UE), for transmitting uplink data through a preconfigured uplink resource (PUR) in a wireless communication system, the method comprises, receiving, from a base station, PUR configuration information for uplink data transmission based on the PUR in a radio resource control (RRC) connected state; transitioning from the RRC connected state to an RRC idle state; performing a timing advance (TA) update procedure based on whether a TA related to uplink transmission timing is valid; and transmitting, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Furthermore, in the present disclosure, wherein the TA update procedure is performed based on that the TA is not valid.

Furthermore, in the present disclosure, based on that the TA is not valid, further comprising: dropping the transmission for the uplink data on a second resource of the PUR which is allocated before the first resource.

Furthermore, in the present disclosure, performing the TA update procedure further comprises, receiving, from the base station, a request message requesting to perform the TA update procedure; transmitting, to the base station, a random access preamble; receiving, from the base station, a TA command including the updated TA; transmitting, to the base station, an uplink message including indication information representing that only the TA update procedure is performed; and receiving, from the base station, a contention resolution message.

Furthermore, in the present disclosure, wherein the TA update procedure is terminated before a state of the UE is transitioned to the RRC connected state, based on the indication information.

Furthermore, in the present disclosure, wherein the indication information is a first radio network temporary identifier (PUR-RNTI) which is preconfigured to the UE, further comprises, determining whether the first PUR-RNTI has been delivered to the base station based on the contention resolution message.

Furthermore, in the present disclosure, wherein, based on that the second PUR-RNTI is included in the contention resolution message, whether the first PUR-RNTI has been delivered to the base station is determined based on whether the first PUR-RNTI and the second PUR-RNTI match, and wherein, based on that the second PUR-RNTI is not included in the contention resolution message, whether the first PUR-RNTI has been delivered to the base station is determined based on at least one of (i) whether a third PUR-RNTI used for scrambling a physical downlink control channel (PDCCH) for scheduling a physical downlink shared channel (PDSCH) through which the contention resolution message is transmitted and the first PUR-RNTI match or (ii) whether a fourth PUR-RNTI used for scrambling a codeword of the PDSCH and the first PUR-RNTI match.

Furthermore, in the present disclosure, wherein the uplink message further includes a unique identifier of the UE, and wherein the indication information (i) consists of a flag of 1 bit and (ii) represents either 'only TA update procedure is performed' or 'RRC connection establishment is not performed'.

Furthermore, in the present disclosure, wherein the first resource is an earliest resource starting after a specific number of subframes or a specific number of slots from an end of the TA update procedure.

Furthermore, in the present disclosure, wherein the uplink data is transmitted on the first resource without additional validity determination for the TA.

Furthermore, in the present disclosure, The method of claim 2, based on that (i) the TA is valid and (ii) the TA needs to be updated further comprises, receiving, from the base station, downlink control information (DCI) for requesting an additional update for the TA on a downlink control channel (PDCCH).

Furthermore, in the present disclosure, wherein the additional update for the TA comprises, receiving, from the base station, a random access response message including a TA command that is information related to the updated TA; and transmitting, to the base station, an uplink message on a physical uplink shared channel (PUSCH) based on a codeword scrambled by using the first PUR-RNTI which is preconfigured to the UE.

Furthermore, in the present disclosure, based on that the TA is valid, further comprises, transmitting, to the base station, at least one uplink message for providing the base station with information for updating the TA on at least one resource of the PUR; and receiving, from the base station, information on the TA updated based on the at least uplink message, wherein the at least one uplink message is transmitted to the base station regardless of the presence or absence of the uplink data.

Furthermore, in the present disclosure, a user equipment (UE) for transmitting uplink data through a preconfigured uplink resource (PUR) in a wireless communication system, the UE comprises, a transmitter for transmitting a radio signal; a receiver for receiving a radio signal; and a processor operatively coupled to the transmitter and the receiver, wherein the processor is configured to control: the receiver to receive, from a base station, PUR configuration information for uplink data transmission based on the PUR in a radio resource control (RRC) connected state; transition from the RRC connected state to an RRC idle state; perform a timing advance (TA) update procedure based on whether a TA related to uplink transmission timing is valid; and the transmitter to transmit, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Furthermore, in the present disclosure, a method, by a base station, for receiving uplink data through a preconfigured uplink resource (PUR) in a wireless communication system, the method comprises, transmitting, to a user equipment (UE) in a radio resource control (RRC) connected state, PUR configuration information for uplink data transmission based on the PUR; performing a timing advance (TA) update procedure based on whether a TA related to uplink transmission timing is valid; and receiving, from the UE, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Furthermore, in the present disclosure, a base station, for receiving uplink data through a preconfigured uplink resource (PUR) in a wireless communication system, the base station comprises, a transmitter for transmitting a radio signal; a receiver for receiving a radio signal; and a processor operatively coupled to the transmitter and the receiver, wherein the processor is configured to control: the transmitter to transmit, to a user equipment (UE) in a radio resource control (RRC) connected state, PUR configuration information for uplink data transmission based on the PUR; performing a timing advance (TA) update procedure based on whether a TA related to uplink transmission timing is valid; and the receiver to receive, from the UE, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Furthermore, in the present disclosure, An apparatus comprising one or more memories and one or more processors operatively coupled to the one or more memories, the apparatus comprises, wherein the one or more processors controls the apparatus to: receive, from a base station, PUR configuration information for uplink data transmission based on the PUR in a radio resource control (RRC) connected state; transition from the RRC connected state to an RRC idle state; perform a timing advance (TA) update procedure based on whether a TA related to uplink transmission timing is valid; and transmit, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Furthermore, in the present disclosure, A non-transitory computer readable medium (CRM) storing one or more instructions, the CRM comprises, wherein one or more instructions executable by the one or more processors control a user equipment (UE) to: receive, from a base station, PUR configuration information for uplink data transmission based on the PUR in a radio resource control (RRC) connected state; transition from the RRC connected state to an RRC idle state; perform a timing advance (TA) update procedure based on whether a TA related to uplink transmission timing is valid; and transmit, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Advantageous Effects

According to the present disclosure, there is an effect that a UE can transmit uplink data through a preconfigured uplink resource.

Further, according to the present disclosure, there is an effect that a timing advance (TA) for transmitting the uplink data through the preconfigured uplink resource can be updated.

Further, according to the present disclosure, there is an effect that an availability of the timing advance (TA) for transmitting the uplink data through the preconfigured uplink resource can be validated.

Advantages which can be obtained in the present disclosure are not limited to the aforementioned advantages and other unmentioned advantages will be clearly understood by those skilled in the art from the following description.

DESCRIPTION OF DRAWINGS

The accompanying drawings, which are included as part of the detailed description to help understand the present disclosure, provide embodiments of the present disclosure, and describe technical features of the present disclosure together with the detailed description.

FIG. 1 illustrates an example of 5G scenario to which the present disclosure may be applied.

FIG. 2 illustrates an AI device according to an embodiment of the present disclosure.

FIG. 3 illustrates an AI server according to an embodiment of the present disclosure.

FIG. 4 illustrates an AI system according to an embodiment of the present disclosure.

FIG. 5 illustrates a communication system applicable to the present disclosure.

FIG. 6 illustrates a wireless device applicable to the present disclosure.

FIG. 7 illustrates another example of the wireless device applicable to the present disclosure.

FIG. 8 is a diagram illustrating an example of an LTE radio frame structure.

FIG. 9 is a diagram illustrating an example of a resource grid for a downlink slot.

FIG. 10 illustrates an example of a structure of a downlink subframe.

FIG. 11 illustrates an example of a structure of an uplink subframe.

FIG. 12 illustrates an example of frame structure type 1.

FIG. 13 is a diagram illustrating another example of frame structure type 2.

FIG. 14 illustrates a structure of a radio frame used in NR.

FIG. 15 illustrates a slot structure of an NR frame.

FIG. 16 illustrates a structure of a self-contained slot.

FIG. 17 illustrates MTC communication.

FIG. 18 illustrates physical channels used in MTC and general signal transmission using the same.

FIG. 19 illustrates cell coverage enhancement in MTC.

FIG. 20 illustrates a signal band for MTC.

FIG. 21 illustrates scheduling in legacy LTE and MTC.

FIG. 22 illustrates physical channels used in NB-IoT and general signal transmission using the same.

FIG. 23 illustrates a frame structure when a subframe spacing is 15 kHz and FIG. 24 illustrates a frame structure when a subframe spacing is 3.75 kHz.

FIG. 25 illustrates three operation modes of NB-IoT.

FIG. 26 illustrates a layout of an in-band anchor carrier at an LTE bandwidth of 10 MHz.

FIG. 27 illustrates transmission of an NB-IoT downlink physical channel/signal in an FDD LTE system.

FIG. 28 illustrates an NPUSCH format.

FIG. 29 is a diagram illustrating an example in which an anchor/non-anchor carrier is configured in different schemes for different UEs.

FIG. 30 is a diagram illustrating an example of a method for transmitting, by a UE, uplink data through a preconfigured uplink resource proposed in the present disclosure.

FIG. 31 is a diagram illustrating an example of a method for transmitting, by a UE, uplink data through a preconfigured uplink resource proposed in the present disclosure.

FIG. 32 is a diagram illustrating an example of a method for transmitting, by a UE, uplink data through a preconfigured uplink resource proposed in the present disclosure.

FIG. 33 is a diagram illustrating an example of a method for transmitting, by a UE, uplink data through a preconfigured uplink resource proposed in the present disclosure.

FIG. 34 is a diagram illustrating an example of a method for transmitting, by a UE, uplink data through a preconfigured uplink resource proposed in the present disclosure.

FIG. 35 is a diagram illustrating an example of a method for transmitting, by a UE, uplink data through a preconfigured uplink resource proposed in the present disclosure.

FIG. 36 is a diagram illustrating an example of a method for transmitting, by a UE, uplink data through a preconfigured uplink resource proposed in the present disclosure.

FIG. 37 is a diagram illustrating an example of an operation implemented in a UE for performing a method for transmitting uplink data through a preconfigured uplink resource in a wireless communication system proposed in the present disclosure.

FIG. 38 is a diagram illustrating an example of an operation implemented in a base station for performing a method for transmitting uplink data through a preconfigured uplink resource in a wireless communication system proposed in the present disclosure.

FIG. 39 illustrates an example of a random access procedure.

FIG. 40 illustrates a concept of a threshold for an SS block for RACH resource association.

FIG. 41 illustrates an example of a power ramping counter of a PRACH.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be illustrated in a block diagram form centering on core capabilities of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, UAV (Unmanned Aerial Vehicle, AR (Augmented Reality) device, VR (Virtual Reality) device and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, a vehicle, a robot, an AI module, UAV (Unmanned Aerial Vehicle, AR (Augmented Reality) device, VR (Virtual Reality) device and the like.

The following technology may be used in various wireless access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the present disclosure may be practiced. The following detailed description includes specific details in order to provide a thorough understanding of the present disclosure. However, those skilled in the art appreciate that the present disclosure may be practiced without these specific details.

In some instances, well-known structures and devices may be omitted or shown in a block diagram form centering on the core functions of the structures and devices in order to avoid obscuring the concepts of the present disclosure.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, "A and/or B" may be interpreted as the same meaning as "including at least one of A or B".

5G Scenario

FIG. 1 illustrates an example of 5G scenario to which the present disclosure may be applied.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences.

Entertainment, for example, cloud game and video streaming are other key elements which increase a need for the mobile broadband ability. Entertainment is essential in the smartphone and tablet anywhere including high mobility environments, such as a train, a vehicle and an airplane.

Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 2 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 2, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 3 illustrates an AI server 200 according to an embodiment of the disclosure.

Referring to FIG. 3, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 4 illustrates an AI system 1 according to an embodiment of the disclosure.

Referring to FIG. 4, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 4 may be considered to be detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Example of Communication System to which Present Disclosure is Applied

FIG. 5 illustrates a communication system 1 applied to the present disclosure.

Referring to FIG. 5, a communication system 1 applied to the present disclosure includes a wireless device, a base station, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a, vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even the wireless device and a specific wireless device 200a may operate a base station/network node for another wireless device.

The wireless devices 100a to 100f may be connected to a network 300 through a base station 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the BS 200/network 300, but may directly communicate with each other without going through the base station/network (e.g., sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the base station 200 and between the base station 200 and the base station 200. Here, the wireless communication/connection may be made through various wireless access technologies (e.g., 5G NR) such as uplink/downlink communication 150a, sidelink communication 150b (or D2D communication), and inter-base station communication 150c (e.g., relay, Integrated Access Backhaul (IAB)). The wireless device and the base station/the wireless device and the BS and the base station may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

FIG. 6 illustrates a wireless device applicable to the present disclosure.

Referring to FIG. 6, a first wireless device 6100 and a second wireless device 6200 may transmit/receive radio signals through various wireless access technologies (e.g., LTE and NR). Here, {the first wireless device 6100 and the second wireless device 6200} may correspond to {a wireless device 100x and a base station 200} and/or {a wireless device 100x and a wireless device 100x} of FIG. 5.

The first wireless device 6100 may include one or more processors 6102 and one or more memories 6104 and additionally further include one or more transceivers 6106 and/or one or more antennas 6108. The processor 6102 may control the memory 6104 and/or the transceiver 6106 and may be configured to implement descriptions, functions, procedures, proposals, methods, and/or operation flows disclosed in the present disclosure. For example, the processor 6102 may process information in the memory 6104 and generate a first information/signal and then transmit a radio signal including the first information/signal through the transceiver 6106. Furthermore, the processor 6102 may receive a radio signal including a second information/signal through the transceiver 6106 and then store in the memory 6104 information obtained from signal processing of the second information/signal. The memory 6104 may connected to the processor 6102 and store various information related to an operation of the processor 6102. For example, the memory 6104 may store a software code including instructions for performing some or all of processes controlled by the processor 6102 or performing the descriptions, functions, procedures, proposals, methods, and/or operation flowcharts disclosed in the present disclosure. Here, the processor 6102 and the memory 6104 may be a part of a communication modem/circuit/chip designated to implement the wireless communication technology (e.g., LTE and NR). The transceiver 6106 may be connected to the processor 6102 and may transmit and/or receive the radio signals through one or more antennas 6108. The transceiver 6106 may include a transmitter and/or a receiver. The transceiver 6106 may be used mixedly with a radio frequency (RF) unit. In the present disclosure, the wireless device may mean the communication modem/circuit/chip.

The second wireless device 6200 may include one or more processors 6202 and one or more memories 6204 and additionally further include one or more transceivers 6206 and/or one or more antennas 6208. The processor 6202 may control the memory 6204 and/or the transceiver 6206 and may be configured to implement descriptions, functions, procedures, proposals, methods, and/or operation flows disclosed in the present disclosure. For example, the processor 6202 may process information in the memory 6204 and generate a third information/signal and then transmit a radio signal including the third information/signal through the transceiver 6206. Furthermore, the processor 6202 may receive a radio signal including a fourth information/signal through the transceiver 6206 and then store in the memory 6204 information obtained from signal processing of the fourth information/signal. The memory 6204 may connected to the processor 6202 and store various information related to an operation of the processor 6202. For example, the memory 6204 may store a software code including instructions for performing some or all of processes controlled by the processor 6202 or performing the descriptions, functions, procedures, proposals, methods, and/or operation flowcharts disclosed in the present disclosure. Here, the processor 6202 and the memory 6204 may be a part of a communication modem/circuit/chip designated to implement the wireless communication technology (e.g., LTE and NR). The transceiver 6206 may be connected to the processor 6202 and may transmit and/or receive the radio signals through one or more antennas 6208. The transceiver 6206 may include a transmitter and/or a receiver and the transceiver 6206 may be used mixedly with the RF unit. In the present disclosure, the wireless device may mean the communication modem/circuit/chip.

Hereinafter, hardware elements of the wireless devices 6100 and 6200 will be described in more detail. Although not limited thereto, one or more protocol layers may be implemented by one or more processors 6102 and 6202. For example, one or more processors 6102 and 6202 may implement one or more layers (e.g., functional layers such as PHY, MAC, RLC, PDCP, RRC, and SDAP). One or more processors 6102 and 6202 may generate one or more protocol data units (PDUs) and/or one or more service data units (SDUs) according to the descriptions, functions, procedures, proposals, methods, and/or operation flowcharts disclosed in the present disclosure. One or more processors 6102 and 6202 may generate a message, control information, data, or information according to the descriptions, functions, procedures, proposals, methods, and/or operation flowcharts disclosed in the present disclosure. One or more processors 6102 and 6202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 6106 and 6206. One or more processors 6102 and 6202 may receive the signal (e.g., baseband signal) from one or more transceivers 6106 and 6206 and acquire the PDU, the SDU, the message, the control information, the data, or the information according to the descriptions, functions, procedures, proposals, methods, and/or operation flowcharts disclosed in the present disclosure.

One or more processors 6102 and 6202 may be referred to as a controller, a microcontroller, a microprocessor, or a microcomputer. One or more processors 6102 and 6202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 6102 and 6202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 6102 and 6202 or stored in one or more memories 6104 and 6204 and driven by one or more processors 6102 and 6202. The descriptions, functions, procedures, proposals, and/or operation flowcharts disclosed in the present disclosure may be implemented by using firmware or software in the form of a code, the instruction and/or a set form of the instruction.

One or more memories 6104 and 6204 may be connected to one or more processors 6102 and 6202 and may store various types of data, signals, messages, information, programs, codes, instructions, and/or commands. One or more memories 6104 and 6204 may be configured by a ROM, a RAM, an EPROM, a flash memory, a hard drive, a register, a cache memory, a computer reading storage medium, and/or a combination thereof. One or more memories 6104 and 6204 may be positioned inside and/or outside one or more processors 6102 and 6202. Furthermore, one or more memories 6104 and 6204 may be connected to one or more processors 6102 and 6202 through various technologies such as wired or wireless connection.

One or more transceivers 6106 and 6206 may transmit to one or more other devices user data, control information, a wireless signal/channel, etc., mentioned in the methods and/or operation flowcharts of the present disclosure. One or more transceivers 6106 and 6206 may receive from one or more other devices user data, control information, a wireless signal/channel, etc., mentioned in the descriptions, functions, procedures, proposals, methods, and/or operation flowcharts disclosed in the present disclosure. For example, one or more transceivers 6106 and 6206 may be connected to one or more processors 6102 and 6202 and transmit and receive the radio signals. For example, one or more processors 6102 and 6202 may control one or more transceivers 6106 and 6206 to transmit the user data, the control information, or the radio signal to one or more other devices. Furthermore, one or more processors 6102 and 6202 may control one or more transceivers 6106 and 6206 to receive the user data, the control information, or the radio signal from one or more other devices. Furthermore, one or more transceivers 6106 and 6206 may be connected to one or more antennas 6108 and 6208 and one or more transceivers 6106 and 6206 may be configured to transmit and receive the user data, control information, wireless signal/channel, etc., mentioned in the descriptions, functions, procedures, proposals, methods, and/or operation flowcharts disclosed in the present disclosure through one or more antennas 6108 and 6280. In the present disclosure one or more antennas may be a plurality of physical antennas or a plurality of logical antennas (e.g., antenna ports). One or more transceivers 6106 and 6206 may convert the received radio signal/channel from an RF band signal to a baseband signal in order to process the received user data, control information, radio signal/channel, etc., by using one or more processors 6102 and 6202. One or more transceivers 6106 and 6206 may convert the user data, control information, radio signal/channel, etc., processed by using one or more processors 6102 and 6202, from the baseband signal into the RF band signal. To this end, one or more transceivers 6106 and 6206 may include an (analog) oscillator and/or filter.

Utilization Example of Wireless Device to which Present Disclosure is Applied

FIG. 7 illustrates another example of a wireless device applied to the present disclosure. The wireless device may be implemented as various types according to a use example/service (see FIG. 5).

Referring to FIG. 7, wireless devices 6100 and 6200 may correspond to the wireless devices 6100 and 6200 of FIG. 6 and may be constituted by various elements, components, units, and/or modules. For example, the wireless devices 6100 and 6200 may include a communication unit 6110, a control unit 6120, and a memory unit 6130, and an additional element 6140. The communication unit may include a communication circuit 6112 and a transceiver(s) 6114. For example, the communication circuit 112 may include one or more processors 6102 and 6202 and/or one or more memories 6104 and 6204 of FIG. 6. For example, the transceiver(s) 6114 may include one or more transceivers 6106 and 6206 and/or one or more antennas 6108 and 6208 of FIG. 6. The control unit 6120 is electrically connected to the communication unit 6110, the memory unit 6130, and the additional element 6140 and controls an overall operation of the wireless device. For example, the control unit 6120 may an electrical/mechanical operation of the wireless device based on a program/code/instruction/information stored in the memory unit 6130. Furthermore, the control unit 6120 may transmit the information stored in the memory unit 6130 to the outside (e.g., other communication devices) through the communication unit 6110 via a wireless/wired interface or store, in the memory unit 6130, information received from the outside (e.g., other communication devices) through the wireless/wired interface through the communication unit 6110.

The additional element 6140 may be variously configured according to the type of wireless device. For example, the additional element 6140 may include at least one of a power unit/battery, an input/output (I/O) unit, a driving unit, and a computing unit. Although not limited thereto, the wireless device may be implemented as a form such as the robot 100a of FIG. 5, the vehicles 100b-1 and 100b-2 of FIG. 5, the XR device 100c of FIG. 5, the portable device 100d of FIG. 5, the home appliance 100e of FIG. 5, the IoT device 100f of FIG. 5, a digital broadcasting terminal, a hologram device, a public safety device, an MTC device, a medical device, a fintech device (or financial device), a security device, a climate/environment device, an AI server/device 400 of FIG. 5, the base station 200 of FIG. 5, a network node, etc. The wireless device may be movable or may be used at a fixed place according to a use example/service.

In FIG. 7, all of various elements, components, units, and/or modules in the wireless devices 6100 and 6200 may be interconnected through the wired interface or at least may be wirelessly connected through the communication unit 6110. For example, the control unit 6120 and the communication unit 6110 in the wireless devices 6100 and 6200 may be wiredly connected and the control unit 6120 and the first unit (e.g., 6130 or 6140) may be wirelessly connected through the communication unit 6110. Further, each element, component, unit, and/or module in the wireless devices 6100 and 6200 may further include one or more elements. For example, the control unit 6120 may be constituted by one or more processor sets. For example, the control unit 6120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

<LTE System in General>

FIG. 8 is a diagram showing an example of an LTE radio frame structure.

In FIG. 8, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 9 is a diagram showing an example of a resource grid for a downlink slot.

In FIG. 9, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 10 shows an example of a downlink subframe structure.

In FIG. 10, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 11 shows an example of an uplink subframe structure.

In FIG. 11, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000\times 2048)$ seconds.

Downlink and uplink transmissions are organized into radio frames with $T_f=307200\times T_s=10$ ms duration. Two radio frame structures are supported:

Type 1: applicable to FDD
Type 2: applicable to TDD
Frame Structure Type 1

FIG. 12 illustrates an example of frame structure type 1.

Frame structure type 1 is applicable to both full duplex and half duplex FDD. Each radio frame is $T_f=307200\cdot T_s=10$ ms long and consists of 20 slots of length $T_{slot}=15360\cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Frame Structure Type 2

Frame structure type 2 is applicable to TDD. Each radio frame of length $T_f=307200\times T_s=10$ ms consists of two half-frames of length $15360\cdot T_s=0.5$ ms each. Each half-frame consists of five subframes of length $30720\cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720\ T_s=1$ ms. Each subframe i is defined as two slots, 2i and 2i+1 of length $T_{slot}=15360\ T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission. FIG. 13 is a diagram showing another example of a frame structure type 2.

Table 1 shows an example of the configuration of a special subframe.

TABLE 1

| | | Normal cyclic prefix in downlink | | | | |
|---|---|---|---|---|---|---|
| | | | UpPTS | | Extended cyclic prefix in downlink | |
| | | Normal | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Table 2 shows an example of an uplink-downlink configuration

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 14 illustrates a structure of a radio frame used in NR.

In NR, uplink and downlink transmission is configured by the frame. The radio frame has a length of 10 ms and is defined as two 5 ms half-frames (HFs). The half-frame is defined as 5 1 ms subframes (SFs). The subframe is split into one or more slits and the number of slots in the subframe depends on the subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

Table 3 shows that when the normal CP is used, the number of symbols for each slot, the number of slots for each frame, and the number of slots for each subframe vary according to the SCS.

TABLE 3

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: The number of symbols in slot
* $N^{frame, u}_{slot}$: The number of slots in frame
* $N^{subframe, u}_{slot}$: The number of slots in subframe Table 4 shows that when the extended CP is used, the number of symbols for each slot, the number of slots for each frame, and the number of slots for each subframe vary according to the SCS.

TABLE 4

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM(A) numerology (e.g., SCS, CP length, etc.) may be differently set between a plurality of cells merged into one UE. As a result, an (absolute time) section of the time resource (e.g., SF, slot or TTI) (for convenience, collectively referred to as Time Unit (TU)) constituted by the same number of symbols may be configured differently between the merged cells.

FIG. 15 illustrates a slot structure of an NR frame.

The slot includes a plurality of symbols in the time domain. For example, in the case of the normal CP, one slot includes 14 symbols, but in the case of the extended CP, one slot includes 12 symbols. A carrier includes a plurality of subcarriers in the frequency domain. The resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

FIG. 16 illustrates a structure of a self-contained slot.

In the NR system, a frame is characterized by a self-complete structure in which all of a DL control channel, DL or UL data, and UL control channel may be included in one slot. For example, first N symbols in the slot may be used to transmit a DL control channel (hereinafter, referred to as a DL control area), and last M symbols in the slot may be used to transmit a UL control channel (hereinafter, a UL control area). N and M are each an integer of 0 or more. A resource region (hereinafter, referred to as the data area) between the DL control area and the UL control area may be used for DL data transmission or UL data transmission. As an example, the following configuration may be considered. Each period is listed in chronological order.

1. DL only configuration
2. UL only configuration
3. Mixed UL-DL configuration
   DL area+Guard Period (GP)+UL control area
   DL control area+Guard Period (GP)+UL control area
   DL area: (i) DL data area, (ii) DL control area+DL data area
   UL area: (i) DL data area, (ii) DL data area+DL control area The PDCCH may be transmitted in the DL control area, and the PDSCH may be transmitted in the DL data area. The PUCCH may be transmitted in the UL control area, and the PUSCH may be transmitted in the UL data area. In the PDCCH, downlink control information (DCI), e.g., DL data scheduling information, UL data scheduling information, etc., may be transmitted. In PUCCH, uplink control information (UCI), e.g., Positive Acknowledgement/Negative Acknowledgement (ACK/NACK) information, Channel State Information (CSI) information, Scheduling Request (SR), etc., for DL data may be transmitted. The GP provides a time gap in the process of switching the BS and the UE from the transmission mode to the reception mode or the process of switching from the reception mode to the transmission mode. Some symbols at a switching timing from DL to UL may be configured as GP.

Machine Type Communication (MTC)

MTC as a type of data communication including one or more machines and may be applied to Machine-to-Machine (M2M) or Internet-of-Things (IoT). Here, the machine is an entity that does not require direct human manipulation or intervention. For example, the machine includes a smart meter with a mobile communication module, a vending machine, a portable terminal having an MTC function, etc.

In 3GPP, the MTC may be applied from release 10 and may be implemented to satisfy criteria of low cost and low complexity, enhanced coverage, and low power consumption. For example, a feature for a low-cost MTC device is added to 3GPP Release 12 and to this end, UE category 0 is defined. UE category is an index indicating how many data the UE may process in a communication modem. The UE of UE category 0 uses a half-duplex operation having a reduced peak data rate and relieved radio frequency (RF) requirements, and a single receiving antenna to reduce baseband/RF complexity. In 3GPP Release 12, enhanced MTC (eMTC) is introduced and the MTC terminal is configured to operate only at 1.08 MHz (i.e., 6 RBs) which is a minimum frequency bandwidth supported in legacy LTE to further reduce a price and power consumption of the MTC UE.

In the following description, the MTC may be mixedly used with terms such as eMTC, LTE-M1/M2, Bandwidth reduced low complexity/coverage enhanced (BL/CE), non-BL UE (in enhanced coverage), NR MTC, enhanced BUCE, etc., or other equivalent terms. Further, the MT CUE/device encompasses a UE/device (e.g., the smart meter, the vending machine, or the portable terminal with the MTC function) having the MTC function.

FIG. 17 illustrates MTC communication.

Referring to FIG. 17, the MTC device 100m as a wireless device providing the MTC may be fixed or mobile. For example, the MTC device 100m includes the smart meter with the mobile communication module, the vending machine, the portable terminal having the MTC function, etc. The base station 200m may be connected to the MTC device 100 by using radio access technology and connected to the MTC server 700 through a wired network. The MTC server 700 is connected to the MTC devices 100m and provides an MTC service to the MTC devices 100m. The service provided through the MTC has discrimination from a service in communication in which human intervenes in the related art and various categories of services including tracking, metering, payment, a medical field service, remote control, and the like may be provided. For example, services including electric meter reading, water level measurement, utilization of a monitoring camera, reporting of an inventory of the vending machine, and the like may be provided through the MTC. The MTC has a characteristic in that a transmission data amount is small and uplink/downlink data transmission/reception occurs occasionally. Accordingly, it is efficient to lower a unit price of the MTC device and reduce battery consumption according to a low data rate. The MTC device generally has low mobility, and as a result, the MTC has a characteristic in that a channel environment is hardly changed.

FIG. 18 illustrates physical channels used in MTC and general signal transmission using the same. In a wireless communication system, the MTC UE receives information from the BS through Downlink (DL) and the UE transmits information to the BS through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the BS (S1001). To this end, the UE receives a Primary Synchronization Signal (PSS) and a Secondary Synchronization Signal (SSS) from the BS to synchronize with the base station and obtain information such as a cell identifier (ID), etc. The PSS/SSS used for the initial cell search operation of the UE may be a PSS/SSS of the legacy LTE. Thereafter, the MTC UE may receive a Physical Broadcast Channel (PBCH) from the base station and obtain in-cell broadcast information (S1002). Meanwhile, the UE receives a Downlink Reference Signal (DL RS) in an initial cell search step to check a downlink channel state.

Upon completion of the initial cell search, the UE receives MTC PDCCH (MPDCCH) and PDSCH corresponding thereto to obtain more specific system information (S1102).

Thereafter, the UE may perform a random access procedure in order to complete an access to the base station (S1003 to S1006). Specifically, the UE may transmit a preamble through a Physical Random Access Channel (PRACH) (S1003) and receive a Random Access Response (RAR) for the preamble through the PDCCH and the PDSCH corresponding thereto (S1004). Thereafter, the UE may transmit a Physical Uplink Shared Channel (PUSCH) by using scheduling information in the RAR (S1005) and perform a Contention Resolution Procedure such as the PDCCH and the PDSCH corresponding thereto (S1006).

The UE that performs the aforementioned procedure may then perform reception of an MPDCCH signal and/or a PDSCH signal (S1107) and transmission of a physical uplink shared channel (PUSCH) signal and/or a physical uplink control channel (PUCCH) signal (S1108) as a general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc.

FIG. 19 illustrates cell coverage enhancement in MTC.

Various cell coverage extension techniques are being discussed in order to extend coverage extension or coverage enhancement (CE) of the base station for the MTC device 100m. For example, for the extension of the cell coverage, the base station/UE may transmit one physical channel/signal over multiple occasions (a bundle of physical channels). Within a bundle section, the physical channel/signal may be repeatedly transmitted according to a pre-defined rule. A receiving apparatus may increase a decoding success rate of the physical channel/signal by decoding a part or the entirety of the physical channel/signal bundle. Here, the occasion may mean a resource (e.g., time/frequency) in which the physical channel/signal may be transmitted/received. The occasion for the physical channel/signal may include a subframe, a slot, or a symbol set in a time domain. Here, the symbol set may be constituted by one or more consecutive OFDM-based symbols. The OFDM-based symbols may include an OFDM(A) symbol and a DFT-s-OFDM(A) (=SC-FDM(A)) symbol. The occasion for the physical channel/signal may include a frequency band and an RB set in a frequency domain. For example, PBCH, PRACH, MPDCCH, PDSCH, PUCCH, and PUSCH may be repeatedly transmitted.

FIG. 20 illustrates a signal band for MTC.

Referring to FIG. 20, as a method for lowering the unit price of the MTC UE, the MTC may operate only in a specific band (or channel band) (hereinafter, referred to as an MTC subband or narrowband (NB)) regardless of a system bandwidth of a cell. For example, an uplink/downlink operation of the MTC UE may be performed only in a frequency band of 1.08 MHz. 1.08 MHz corresponds to 6 consecutive physical resource blocks (PRBs) in the LTE system is defined to follow the same cell search and random access procedures as the LTE UE. FIG. 20(a) illustrates a case where an MTC subband is configured at a center (e.g., 6 PRBs) of the cell and FIG. 20(b) illustrates a case where a plurality of MTC subbands is configured in the cell. The plurality of MTC subbands may be consecutively/inconsecutively configured in the frequency domain. The physical channels/signals for the MTC may be transmitted/received in one MTC subband. In the NR system, the MTC subband may be defined by considering a frequency range and a subcarrier spacing (SCS). As an example, in the NR system, a size of the MTC subband may be defined as X consecutive PRBs (i.e., a bandwidth of 0.18*X*(2^u) MHz) (see Table 3 for u). Here, X may be defined as 20 according to the size of a Synchronization Signal/Physical Broadcast Channel (SS/PBCH). In the NR system, the MTC may operate in at least one bandwidth part (BWP). In this case, the plurality of MTC subbands may be configured in the BWP.

FIG. 21 illustrates scheduling in legacy LTE and MTC.

Referring to FIG. 21, in the legacy LTE, the PDSCH is scheduled by using the PDCCH. Specifically, the PDCCH may be transmitted in first N OFDM symbols in the subframe (N=1 to 3) and the PDSCH scheduled by the PDCCH is transmitted in the same subframe. Meanwhile, in the MTC, the PDSCH is scheduled by using the MPDCCH. As a result, the MTC UE may monitor an MPDCCH candidate in a search space in the subframe. Here, monitoring includes blind-decoding the MPDCCH candidates. The MPDCCH transmits the DCI and the DCI includes uplink or downlink scheduling information. The MPDCCH is FDM-multiplexed with the PDSCH in the subframe. The MPDCCH is repeatedly transmitted in a maximum of 256 subframes and the DCI transmitted by the MPDCCH includes information on the number of MPDCCH repetitions. In the case of downlink scheduling, when repeated transmission of the MPDCCH ends in subframe #N, the PDSCH scheduled by the MPDCCH starts to be transmitted in subframe #N+2. The PDSCH may be repeatedly transmitted in a maximum of 2048 subframes. The MPDCCH and the PDSCH may be transmitted in different MTC subbands. As a result, the MTC UE may perform radio frequency (RF) retuning for receiving the PDSCH after receiving the MPDCCH. In the case of uplink scheduling, when repeated transmission of the MPDCCH ends in subframe #N, the PUSCH scheduled by the MPDCCH starts to be transmitted in subframe #N+4. When the repeated transmission is applied to the physical channel, frequency hopping is supported between different MTC subbands by the RF retuning. For example, when the PDSCH is repeatedly transmitted in 32 subframes, the PDSCH may be transmitted in a first MTC subband in first 16 subframes and the PDSCH may be transmitted in a second MTC subband in 16 remaining subframes. The MTC operates in a half duplex mode. HARQ retransmission of the MTC is an adaptive asynchronous scheme.

Narrowband Internet of Things (NB-IoT)

NB-IoT represents a narrow-band Internet of Things technology that supports a low-power wide area network through a legacy wireless communication system (e.g., LTE, NR). In addition, the NB-IoT may refer to a system for supporting low complexity and low power consumption through a narrowband. The NB-IoT system uses OFDM parameters such as subcarrier spacing (SCS) in the same manner as the legacy system, so that there is no need to separately allocate an additional band for the NB-IoT system. For example, one PRB of the legacy system band may be allocated for the NB-IoT. Since the NB-IoT UE recognizes a single PRB as each carrier, the PRB and the carrier may be interpreted as the same meaning in the description of the NB-IoT.

Hereinafter, the description of the NB-IoT mainly focuses on a case where the description of the NB-IoT is applied to the legacy LTE system, but the description below may be extensively applied even to a next generation system (e.g., NR system, etc.). Further, in the present disclosure, contents related to the NB-IoT may be extensively applied to MTC which aims for similar technical purposes (e.g., low-power, low-cost, coverage enhancement, etc.). Further, the NB-IoT may be replaced with other equivalent terms such as NB-LTE, NB-IoT enhancement, enhanced NB-IoT, further enhanced NB-IoT, NB-NR, and the like.

FIG. 22 illustrates physical channels used in NB-IoT and general signal transmission using the same. In the wireless communication system, the UE receives information from the base station through Downlink (DL) and the UE transmits information to the base station through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the base station (S11). To this end, the UE receives a Narrowband Primary Synchronization Signal (NPSS) and a Narrowband Secondary Synchronization Signal (NSSS) from the base station to synchronize with the BS and obtain information such as a cell identifier (ID), etc. Thereafter, the UE receives a Narrowband Physical Broadcast Channel (NPBCH) from the base station to obtain in-cell broadcast information (S12). Meanwhile, the UE receives a Downlink Reference Signal (DL RS) in an initial cell search step to check a downlink channel state.

Upon completion of the initial cell search, the UE receives Narrowband PDCCH (NPDCCH) and Narrowband PDSCH (NPDSCH) corresponding thereto to obtain more specific system information in step S12 (S12).

Thereafter, the UE may perform a random access procedure in order to complete an access to the BS (S13 to S16). Specifically, the UE may transmit a preamble through a Narrowband Physical Random Access Channel (NPRACH) (S13) and receive the Random Access Response (RAR) for the preamble through the NPDCCH and the NPDSCH corresponding thereto (S14). Thereafter, the UE may transmit a Narrowband Physical Uplink Shared Channel (NPUSCH) by using scheduling information in the RAR (S15) and perform a Contention Resolution Procedure such as the NPDCCH and the NPDSCH corresponding thereto (S16).

The UE that performs the aforementioned procedure may then perform reception of the NPDCCH signal and/or NPDSCH signal (S17) and NPUSCH transmission (S18) as the general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc. In the NB-IoT, the UCI is transmitted through the NPUSCH. According to the request/instruction of the network (e.g., base station), the UE may transmit the UCI through the NPUSCH periodically, aperiodically, or semi-persistently.

An NB-IoT frame structure may be configured differently according to the subcarrier spacing (SCS). FIG. 23 illustrates a frame structure when a subframe spacing is 15 kHz and FIG. 24 illustrates a frame structure when a subframe spacing is 3.75 kHz. The frame structure of FIG. 23 may be used in downlink/uplink and the frame structure of FIG. 24 may be used only in uplink.

Referring to FIG. 23 the NB-IoT frame structure for the subcarrier spacing of 15 kHz may be configured to be the same as the frame structure of the legacy system (i.e., LTE system). That is, a 10-ms NB-IoT frame may include ten 1-ms NB-IoT subframes and a 1-ms NB-IoT subframe may include two 0.5-ms NB-IoT slots. Each 0.5-ms NB-IoT slot may include seven symbols. The 15-kHz subcarrier spacing may be applied to both downlink and uplink. The symbol includes an OFDMA symbol in downlink and an SC-FDMA symbol in uplink. In the frame structure of FIG. 23, the system band is 1.08 MHz and is defined by 12 subcarriers. The 15-kHz subcarrier spacing is applied to both downlink and uplink and orthogonality with the LTE system is guaranteed, and as a result, coexistence with the LTE system may be facilitated.

Meanwhile, referring to FIG. 24, when the subcarrier spacing is 3.75 kHz, the 10-ms NB-IoT frame may include five 2-ms NB-IoT subframes, and the 2-ms NB-IoT subframe may include seven symbols and one guard period (GP) symbol. The 2-ms NB-IoT subframe may be expressed as an NB-IoT slot or an NB-IoT resource unit (RU). Here, the symbol may include the SC-FDMA symbol. In the frame structure of FIG. 25, the system band is 1.08 MHz and is defined by 48 subcarriers. The subcarrier spacing of 3.75 kHz may be applied only to the uplink and the orthogonality with the LTE system may be impaired, resulting in performance degradation due to interference.

The figure may illustrate an NB-IoT frame structure based on an LTE system frame structure and the illustrated NB-IoT frame structure may be extensively applied even to the next-generation system (e.g., NR system). For example, in the frame structure of FIG. 23, the subframe interval may be replaced with the subframe interval of Table 3.

FIG. 25 illustrates three operation modes of NB-IoT. Specifically, FIG. 25(a) illustrates an in-band system, FIG. 25(b) illustrates a guard-band system, and FIG. 25(c) illustrates a stand-alone system. Here, the in-band system may be expressed as an in-band mode, the guard-band system may be expressed as guard-band mode, and the stand-alone system may be expressed as a stand-alone mode. For convenience, the NB-IoT operation mode is described based on the LTE band, but the LTE band may be replaced with a band of another system (e.g., NR system band).

The in-band mode means an operation mode to perform the NB-IoT in the (legacy) LTE band. In the in-band mode, some resource blocks of an LTE system carrier may be allocated for the NB-IoT. For example, in the in-band mode, specific 1 RB (i.e., PRB) in the LTE band may be allocated for the NB-IoT. The in-band mode may be operated in a structure in which the NB-IoT coexists in the LTE band. The guard-band mode means an operation mode to perform the NB-IoT in a reserved space for the guard-band of the (legacy) LTE band. Accordingly, in the guard-band mode, the guard-band o the LTE carrier not used as the resource block in the LTE system may be allocated for the NB-IoT. The (legacy) LTE band may have a guard-band of at least 100 kHz at the end of each LTE band. The stand-alone mode means an operation mode to perform the NB-IoT in a frequency band independently from the (legacy) LTE band. For example, in the stand-alone mode, a frequency band (e.g., a GSM carrier to be reallocated in the future) used in a GSM EDGE Radio Access Network (GERAN) may be allocated for the NB-IoT.

The NB-IoT UE searches an anchor carrier in units of 100 kHz and in the in-band and the guard-band, a center frequency of the anchor carrier should be located within ±7.5 kHz from a 100 kHz channel raster. Further, six center PRBs among LTE PRBs are not allocated to the NB-IoT. Accordingly, the anchor carrier may be located only in a specific PRB.

FIG. 26 illustrates a layout of an in-band anchor carrier at an LTE bandwidth of 10 MHz.

Referring to FIG. 26, a direct current (DC) subcarrier is located in the channel raster. Since a center frequency spacing between adjacent PRBs is 180 kHz, the center frequency is located at ±2.5 kH from the channel raster in the case of PRB indexes 4, 9, 14, 19, 30, 35, 40, and 45. Similarly, the center frequency of the PRB suitable as the anchor carrier at an LTE bandwidth of 20 MHz is located at ±2.5 kHz from the channel raster and the center frequency of the PRB suitable as the anchor carrier at LTE bandwidths of 3 MHz, 5 MHz, and 15 MHz is located at ±7.5 kHz from the channel raster.

In the case of the guard-band mode, the center frequency is located at ±2.5 kHz from the channel raster in the case of a PRB immediately adjacent to an edge PRB of LTE at the bandwidths of 10 MHz and 20 MHz. In the case of the bandwidths 3 MHz, 5 MHz, and 15 MHz, a guard frequency band corresponding to three subcarriers from the edge PRB is used to locate the center frequency of the anchor carrier at ±7.5 kHz from the channel raster.

The anchor carrier of the stand-alone mode may be aligned in the 100 kHz channel raster and all GSM carriers including a DC carrier may be used as the NB-IoT anchor carrier.

The NB-IoT may support multi-carriers and combinations of in-band and in-band, in-band and guard-band, guard band and guard-band, and stand-alone and stand-alone may be used.

In NB-IoT downlink, physical channels such as a Narrowband Physical Broadcast Channel (NPBCH), a Narrowband Physical Downlink Shared Channel (NPDSCH), and a Narrowband Physical Downlink Control Channel (NPDCCH) are provided and physical signals such as a Narrowband Primary Synchronization Signal (NPSS), a Narrowband Primary Synchronization Signal (NSSS), and a Narrowband Reference Signal (NRS) are provided.

The NPBCH transfers, to the UE, a Master Information Block-Narrowband (MIB-NB) which is minimum system information which the NB-IoT requires for accessing the system. The NPBCH signal may be repeatedly transmitted eight times in total for coverage enhancement. A Transport Block Size (TBS) of the MIB-NB is 34 bits and is newly updated every 64 ms TTI period. The MIB-NB includes information such as an operation mode, a System Frame Number (SFN), a Hyper-SFN, the number of Cell-specific Reference Signal (CRS) ports, a channel raster offset, etc.

NPSS is configured by a Zadoff-Chu (ZC) sequence with a sequence length of 11 and a root index of 5. The NPSS may be generated according to the following equation.

$$d_l(n) = S(l) \cdot e^{-j\frac{\pi u n(n+1)}{11}}, n = 0, 1, \ldots, 10 \quad \text{[Equation 1]}$$

Here, S(l) for OFDM symbol index l may be defined as in Table 5.

TABLE 5

| Cyclic prefix length | S(3) . . . S(13) | | | | | | | | | | |
|---|---|---|---|---|---|---|---|---|---|---|---|
| Normal | 1 | 1 | 1 | 1 | −1 | −1 | 1 | 1 | 1 | −1 | 1 |

NSSS is constituted by a combination of a ZC sequence with a sequence length of 131 and a binary scrambling sequence such as a Hadamard sequence. The NSSS indicates PCID to NB-IoT UEs in the cell through the combination of the sequences.

The NSSS may be generated according to the following equation.

$$d(n) = b_q(m)e^{-j2\pi\theta_f n}e^{-j\frac{\pi u n'(n'+1)}{131}} \quad \text{[Equation 2]}$$

Here, variables applied to Equation 2 may be defined as follows.

$$n = 0, 1, \ldots, 131 \quad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

Here, the binary sequence $b_q(m)$ is defined as in Table 6, and $b_0(m)$ to $b_3(m)$ correspond to columns 1, 32, 64, and 128 of the 128-th Hadamard matrix, respectively. The cyclic shift $\theta_f$ for the frame number $n_f$ may be defined as in Equation 4.

TABLE 6

| q | $b_q(0) \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 1 -1 1 1 -1 -1 1 1 1 -1 -1 -1 1 1 -1 1 1 -1 1 1 -1 -1 1 -1 1 1 1 -1 -1 1 1 1 -1 1 1 -1 -1 -1 1 -1 -1 1 1 1 -1 1 1 -1 -1 1 -1 -1 1 1 1 -1 1 1 -1 -1 1 1 1 -1 -1 1 1 -1 1 -1 -1 1 1 -1 -1 1 1 1 -1 -1 1 1 1 -1 -1 -1 1 1 1 -1 -1 -1 1 1 1 -1 1 -1 -1 1 1 1 -1 -1 1 1 -1 -1 1 1 1 -1 1 -1 -1 1 1 -1 1 1 -1] |
| 2 | [1 -1 -1 1 1 -1 1 1 1 -1 -1 1 1 1 -1 -1 -1 1 1 -1 -1 1 1 -1 -1 -1 1 1 1 -1 1 1 -1 -1 1 1 -1 1 -1 -1 1 -1 1 1 -1 -1 1 1 1 -1 1 -1 -1 1 -1 -1 1 -1 -1 1 1 1 -1 -1 -1 1 1 -1 -1 1 1 1 -1 1 -1 -1 1 -1 -1 1 -1 -1 1 1 1 -1 -1 1 1 -1 1 1 -1 -1 1 -1 1 1 -1 -1 1 1 1 -1 -1 -1 1 -1 1 1 1 -1 -1 -1 1 1 1 -1 1 -1 -1 1 1 -1 1 -1 1 1] |
| 3 | [1 -1 -1 1 -1 1 1 1 -1 -1 1 1 1 -1 -1 1 -1 -1 -1 1 -1 1 1 1 -1 -1 -1 1 1 -1 1 -1 -1 1 -1 -1 1 1 1 -1 1 -1 -1 1 1 1 -1 -1 -1 1 -1 1 1 1 -1 -1 1 -1 -1 1 1 -1 -1 -1 1 -1 1 1 -1 -1 1 1 1 -1 -1 -1 1 1 -1 1 -1 -1 1 1 1 -1 -1 -1 1 -1 1 -1 -1 1 1 -1 1 1 1 -1 -1 -1 1 1 1 -1 -1 -1 1 -1 1 1 -1 -1 -1 1 1 1 -1 1 -1 -1 1 1 1 -1 -1 1] |

$$\theta_f = \frac{33}{132}(n_f/2) \bmod 4 \quad \text{[Equation 4]}$$

Here, nf represents a radio frame number. mod represents a modulo function.

A downlink physical channel/signal includes NPSS, NSSS, NPBCH, NRS, NPDCCH, and NPDSCH.

FIG. 27 illustrates transmission of an NB-IoT downlink physical channel/signal in an FDD LTE system. The downlink physical channel/signal is transmitted through one PRB and supports 15 kHz subcarrier spacing/multi-tone transmission.

Referring to FIG. 27, the NPSS is transmitted in a 6th subframe of every frame and the NSSS is transmitted in a last (e.g., 10th) subframe of every even frame. The UE may obtain frequency, symbol, and frame synchronization using the synchronization signals (NPSS and NSSS) and search 504 physical cell IDs (PCIDs) (i.e., base station IDs). The NPBCH is transmitted in a first subframe of every frame and transports the NB-MIB. The NRS is provided as a reference signal for downlink physical channel demodulation and is generated in the same scheme as the LTE. However, Physical Cell ID (NB-PCID) (or NCell ID or NB-IoT base station ID) is used as an initialization value for NRS sequence generation. The NRS is transmitted through one or two antenna ports. The NPDCCH and the NPDSCH may be transmitted in the remaining subframes except for the NPSS/NSSS/NPBCH. The NPDCCH and the NPDSCH may be transmitted together in the same subframe. The NPDCCH transports the DCI and the DCI supports three types of DCI formats. DCI format N0 includes Narrowband Physical Uplink Shared Channel (NPUSCH) scheduling information and DCI formats N1 and N2 include NPDSCH scheduling information. The NPDCCH may be repeatedly transmitted 2048 times in total for coverage enhancement. The NPDSCH is used for transmitting data (e.g., TB) of transmission channels such as a Downlink-Shared Channel (DL-SCH) and a Paging Channel (PCH). The maximum TBS is 680 bits and may be repeatedly transmitted 2048 times in total for coverage enhancement.

The uplink physical channel includes a Narrowband Physical Random Access Channel (NPRACH) and the NPUSCH and supports single-tone transmission and multi-tone transmission. The single-tone transmission is supported for the subcarrier spacings of 3.5 kHz and 15 kHz and the multi-tone transmission is supported only for the subcarrier spacing of 15 kHz.

FIG. 28 illustrates an NPUSCH format.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports the single-/multi-tone transmission, and NPUSCH format 2 supports only the single-tone transmission. In the case of the single-tone transmission, pi/2-Binary Phase Shift Keying (BPSK) and pi/4-Quadrature Phase Shift Keying (QPSK) are used to reduce Peat-to-Average Power Ratio (PAPR). In the NPUSCH, the number of slots occupied by one resource unit (RU) may vary according to resource allocation. The RU represents the smallest resource unit to which the TB is mapped, and is constituted by NULsymb*NULslots consecutive SC-FDMA symbols in the time domain and NRUsc consecutive subcarriers in the frequency domain. Here, NULsymb represents the number of SC-FDMA symbols in the slot, NULslots represents the number of slots, and NRUsc represents the number of subcarriers constituting the RU.

Table 7 shows the configuration of the RU according to the NPUSCH format and subcarrier spacing. In the case of TDD, the supported NPUSCH format and SCS vary according to the uplink-downlink configuration. Table 2 may be referred to for the uplink-downlink configuration.

TABLE 7

| NPUSCH format | Subcarrier spacing | Supported uplink-downlink configurations | $N^{RU}_{sc}$ | $N^{UL}_{slots}$ | $UL_{symb}$ |
|---|---|---|---|---|---|
| 1 | 3.75 kHz | 1, 4 | 1 | | 16 |
| | 15 kHz | 1, 2, 3, 4, 5 | 1 | | 16 |
| | | | 3 | | 8 |
| | | | 6 | | 4 |
| | | | 12 | | 2 |
| 2 | 3.75 kHz | 1, 4 | 1 | | 4 |
| | 15 kHz | 1, 2, 3, 4, 5 | 1 | | 4 |

Scheduling information for transmission of UL-SCH data (e.g., UL-SCH TB) is included in DCI format NO, and the DCI format NO is transmitted through the NPDCCH. The DCI format NO includes information on the start time of the NPUSCH, the number of repetitions, the number of RUs used for TB transmission, the number of subcarriers, resource locations in the frequency domain, and MCS.

Referring to FIG. 28, DMRSs are transmitted in one or three SC-FDMA symbols per slot according to the NPUSCH format. The DMRS is multiplexed with data (e.g., TB, UCI), and is transmitted only in the RU including data transmission.

FIG. 29 illustrates an operation when multi-carriers are configured in FDD NB-IoT.

In FDD NB-IoT, a DL/UL anchor-carrier may be basically configured, and a DL (and UL) non-anchor carrier may be additionally configured. Information on the non-anchor carrier may be included in RRCConnectionReconfiguration. When the DL non-anchor carrier is configured (DL add carrier), the UE receives data only in the DL non-anchor carrier. On the other hand, synchronization signals (N PSS and NSSS), broadcast signals (MIB and SIB), and paging signals are provided only in the anchor-carrier. When the DL non-anchor carrier is configured, the UE listens only to the DL non-anchor carrier while in the RRC_CONNECTED state. Similarly, when the UL non-anchor carrier is configured (UL add carrier), the UE transmits data only in the UL non-anchor carrier, and simultaneous transmission on the UL non-anchor carrier and the UL anchor-carrier is not allowed. When the UE is transitioned to the RRC_IDLE state, the UE returns to the anchor-carrier.

FIG. 29 illustrates a case where only the anchor-carrier is configured for UE1, the DL/UL non-anchor carrier is additionally configured for UE2, and the DL non-anchor carrier is additionally configured for UE3. As a result, carriers in which data is transmitted/received in each UE are as follows.

UE1: Data reception (DL anchor-carrier) and data transmission (UL anchor-carrier)

UE2: Data reception (DL non-anchor-carrier) and data transmission (UL non-anchor-carrier)

UE3: Data reception (DL non-anchor-carrier) and data transmission (UL anchor-carrier)

The NB-IoT UE may not transmit and receive at the same time, and the transmission/reception operations are limited to one band each. Therefore, even if the multi-carrier is configured, the UE requires only one transmission/reception chain of the 180 kHz band.

The present disclosure relates to an uplink transmission method through a preconfigured uplink resource (PUR), and an apparatus therefor.

In the present disclosure, the 'PUR' may be construed as including an operation and a procedure in which a user equipment (UE) in a radio resource control (RRC) connected state is allocated with an uplink (UL) transmission resource in advance and performs UL transmission from the allocated UL resource. The 'PUR' may be construed as including a case where a UE in an IDLE state performs the UL transmission when a timing advance (TA) is valid. The timing advance may mean a parameter related to the uplink transmission timing of the UE. Further, hereinafter, the PUR may include a plurality of resources used for PUR transmission of the UE, and each of the plurality of resources may be expressed as a 'PUR resource' or a 'resource'.

The uplink transmission through the preconfigured uplink resource may have an advantage in terms of UL transmission efficiency and power consumption through simplification of the procedure as compared with the method for performing the UL transmission through the process of transitioning to the RRC connected state.

The present disclosure proposes a method for supporting the UL transmission through the PUR, a TA update method for supporting the same, a method and a procedure for validating the TA, and an operation and a procedure of HARQ after the UL transmission through the PUR.

Hereinafter, for convenience of the description, in the present disclosure, a serving-cell may mean a cell configuring the PUR and/or a cell receiving the PUR. Further, hereinafter, the PUR may mean all dedicated/shared PURs or mean only one of a dedicated PUR or a shared PUR. The shared PUR may mean a PUR which is configured equally to multiple UEs and shared between multiple UEs, and the dedicated PUR may mean a PUR which is configured only to a specific UE without a contention between the UEs.

During the PUR transmission of the UE, it may be necessary to update a PUR configuration parameter(s) according to an environment of the UE or a need of the base station/the network. In this case, updating the parameter(s) is possible by using Layer 1 (L1) signaling or through medium access control (MAC) control element (CE) or RRC signaling. Here, the L1 signaling may be downlink control information (DCI). Hereinafter, for convenience of the description, in the present disclosure, a method for updating the PUR configuration parameter(s) through the L1 signaling will be referred to as L1 PUR configuration update.

Hereinafter, the method for supporting the uplink transmission through the PUR and procedures therefor will be described in detail. In addition, the plurality of resources or each of the plurality of resources may be expressed as a 'specific resource'.

TA Update Mechanism

In order for a UE in an RRC_IDLE state to perform the uplink (UL) transmission, the timing advance (TA) related to the uplink transmission timing may be valid. In order to hold the TA in a valid state, the TA should be able to be periodically updated, and in this method, a method for supporting the TA update is proposed. Hereinafter, updating the TA may mean changing a TA value configured to the UE to a new value.

TA Update Procedure

A procedure (hereinafter, referred to as a TA update procedure) of updating the TA of the UE may be performed by an interaction of the UE and the base station. More specifically, the base station may obtain information on the TA of the user, update the TA value to an appropriate value based on the TA information of the UE, and then feed back the updated TA to the UE.

In order for the base station to obtain the information (hereinafter, referred to as TA information) on the TA of the user equipment (UE), it may be necessary to receive a UL signal transmitted by the UE. In order to support the reception, the UE may transmit the UL signal used for obtaining the TA information of the base station through a PUR interval (Proposal 1) or transmit the UL signal through the PUR interval (Proposal 2). Hereinafter, the proposals will be described in more detail.

(Proposal 1) UL Transmission Through PUR Interval

The proposal relates to a method for obtaining, by the base station, the TA information based on the UL transmission of the UE transmitted through the PUR interval.

Even in a UE in which UL skipping in PUR is supported, the UE may be configured to perform the UL transmission in all PURs regardless of whether there is UL transmission data for periodic obtaining of the TA information of the base station. Here, the UL skipping in the PUR may mean not performing even any operation related to PUR operations such as the uplink transmission, a downlink response reception, for the uplink transmission, etc. in a specific PUR among PUR resources configured by the UE.

Alternatively, even when the UL skipping in a specific PUR is performed in order to receive an instruction of releasing the PUR resource from the base station, the UE may be configured to attempt to receive and detect a response channel promised to be monitored after transmitting the specific PUR. Here, the instruction of releasing the PUR resource may be indirectly indicated by a specific state or value of a TA feedback value.

In the present disclosure, a meaning of the UL skipping in the PUR or skipping of a specific resource of the PUR may be construed to be the same as a meaning dropping the UL transmission in the PUR or the specific resource of the PUR.

Here, dropping may mean that the UL transmission is not performed or mean puncturing or rate-matching the PUR or the specific resource of the PUR.

In the case of the UE in which the UL skipping in the PUR is supported, the UE may perform the UL skipping in the specific PUR and the base station may not use the specific PUR for obtaining the TA information. In this case, counter values of a TA alignment timer for TA validation may be determined not to be valid for the specific PUR and may be held. Alternatively, a counter value may also be increased by concentrating on that valid TA information is not secured. In the present disclosure, the hold may mean that the value is not changed.

In addition, in the present disclosure an expression of the TA validation may mean a procedure of determining whether the TA is valid and if another expression is construed to be the same as the corresponding mean, another expression may be used instead of the TA validation.

Apart From the TA alignment timer, there may be a parameter indicating how many times or for how many intervals the UE may use a configured PUR in the PUR configured to the UE. Here, PUR resources which exist after an interval indicated by the parameter among the PURs configured to the UE may be no longer valid for the corresponding UE and the PUR configured to the UE may be released. The parameter may be irrelevant to whether the specific PUR resource is skipped.

FIG. 30 is a diagram illustrating an example of a method for transmitting, by a UE, uplink data through a preconfigured uplink resource proposed in the present disclosure.

More specifically, FIG. 30 illustrates an example in which the TA update procedure between the UE and the base station is performed through the PUR interval (Proposal 1).

The UE determines whether a TA configured to a current UE is valid before transmitting uplink data through a preconfigured resource (3010).

According to a determination result, when it is determined that the TA is valid, the UE may perform PUR transmission for transmitting the uplink data through a first PUR resource (3020).

Next, the UE may additionally perform PUR transmission for providing TA information to a base station in at least one PUR resource 3031 (3030). An interval in which the UE performs the PUR transmission in order to provide the TA information to the base station may be referred to as a TA update performing interval. In this case, the UE may perform the PUR transmission for providing the TA information to the base station regardless of whether there is uplink data. In FIG. 30, it is illustrated that the PUR transmission is performed twice, but it is apparent that PUR transmission of a smaller number of times or a larger number of times for TA update may be additionally performed. The PUR transmission performed in the first PUR resource and the PUR transmission performed in the at least one PUR resource by the UE may be used for updating the TA.

The base station may update the TA based on the TA information obtained from the UE and the UE may receive, from the base station, information including information on the updated TA (S3040).

(Proposal 2) UL Transmission Through Interval Other than PUR Interval

The proposal relates to a method for obtaining, by the base station, the TA information based on the UL transmission of the UE transmitted through an interval other than the PUR interval. In this case, the UE transmission of the UE for obtaining the TA information of the base station may be UL transmission by a base station's request (e.g., eNB request). The base station may include eNB, gNB, etc. An example of the UL transmission by the base station's request may include a random access channel (RACH) procedure, etc.

The base station's request may be delivered to the UE through a PUR response channel. If a requested transmission resource is the PUR, the UE may perform the UL transmission through the PUR. On the contrary, if the requested transmission resource is a resource other than the PUR, the UE may perform the UL transmission through a resource interval other than the PUR.

Alternatively, the UE may perform the UL transmission through a resource designed in advance or configured through the higher layer from the base station. For example, when a period and a duration are configured, the UL transmission of the UE for obtaining the TA information of the base station may be periodic transmission.

Method for Feeding Back TA Information to UE by Base Station

When the base station updates the TA information and feeds back the updated TA information to the UE, the base station may transmit i) the TA information (or command) or (ii) only the TA information (or command) through the MAC CE. Alternatively, the base station may configure a medium access control control element (MAC CE) including only the TA information (or command) and transmit, to the UE, the MAC CE to the UE.

The TA information may be transmitted to the UE through a narrow band physical downlink control channel (NPDCCH)/MTC physical downlink control channel (MPDCCH)/physical downlink control channel (PDCCH) or transmitted to the UE through (N)PDSCH scheduled from the NPDCCH/MPDCCH/PDCCH. Here, a TA value included in the TA information may be delta information (for a purpose of adjusting a transmission time of the UE forward/backward) which is limited only to a value having a specific sign or has a value of +/−. When the TA value is limited only to the value having the specific sign, the TA value may be limited similarly in an initial access process. Further, when the UE transmits a channel used for the base station to obtain (detect) the TA information, the TA value or the delta information may be determined according to (i) whether the UE transmits the channel based on downlink or (ii) a time of applying a TA value previously obtained.

Here, the time of applying the TA value means a time of reflecting the TA information previously obtained by the UE to the transmission time of the channel. For example, (i) when an initial TA is received after transmitting the (N)PRACH before receiving the TA and (ii) when the (N)PRACH transmission is performed based on a downlink synchronization time, the TA value may be construed only as a value having a specific sign. In this case, the specific sign may be construed as pulling up a transmission time forward in terms of the UE, i.e., a (−) sign.

(Proposal 2-1) TA Update Mechanism—Method Using Modified or Shortened RACH

When a UE in an RRC_IDLE state determines that the TA is invalid, the UE may perform the TA update by a similar method as a legacy RACH procedure by using a UE-specific radio network temporary identifier (RNTI) and/or UE ID and/or a 1-bit flag to be used or held in the RRC idle state, but perform only up to a contention resolution confirmation step, and then stop an RRC connection setup process without continuously performing the RRC connection setup process. That is, in the TA update procedure, the state of the UE may not be transitioned to the RRC connected state, but terminated. The UE is requested with performing the TA update procedure from the base station, and as a result, the TA update procedure may be performed between the UE and the base station.

The similar method as the legacy PRACH procedure may mean a TA command included in an MAC random access response. Further, the contention resolution confirmation step may include a step in which the base station confirms the UE-specific RNTI and/or UE ID in a step of transmitting message 4 (contention resolution message) which the base station transmits to the UE, or a step in which the base station transmits ACK to the UE after the confirmation.

Further, when there is uplink transmission data for PUR transmission, the UE may additionally perform the following operations. As an example, the UE completes performing of the TA update procedure by using the modified or shortened RACH, and then perform the PUR transmission in an earliest PUR which starts after X subframes (or slots or ms). That is, the earliest PUR may be a most advanced resource among PUR resources which are present after X subframes, X slots, or X ms from the termination time of the TA update procedure.

The earliest PUR which starts after the X subframes (or slots) may be construed as the same meaning as an initial PUR available after the X subframes.

The time when performing the TA update procedure is completed may be a last subframe (or slot) configuring a PDSCH in which message 4 is transmitted or a last subframe configuring a PUCCH or PUSCH in which the ACK of the UE for message 4 is transmitted.

The X subframes (or a value of X) may be a preconfigured fixed value or a value configured through the higher layer. Further, X subframes may be a time required for the UE in order to prepare the PUR transmission or may be used for monitoring additional feedback from the eNB after transmitting the ACK for the contention resolution confirmation. In this case, when performing the modified or shortened RACH procedure in the state in which there is the data for the PUR transmission, the UE may assume that the TA is valid and perform the PUR transmission without performing additional TA validation.

The UE ID described above may be an International Mobile Subscriber Identity (IMSI) which is a unique number of the UE and a 1-bit flag may be a flag having a meaning of "TA update only" or "no RRC connection setup". In this case, the UE ID is used for contention resolution. Further, the 1-bit flag may be a flag indicating that the UE does not monitor an additional PDCCH search space (SS) in order to enter the RRC connected state after a message 4 step or transmitting the UE for message 4. The UE ID and the 1-bit flag may be transmitted to the eNB in a message 3 step. That is, the UE may transmit message 3 including the UE ID and/or the 1-bit flag to the eNB. The 1-bit flag may be referred to as 'indication information'.

The UE-specific RNTI used or held in the RRC idle state may be a PUR-RNTI which the eNB configures to be used for PUR transmission/reception and PUR SS monitoring in the RRC idle state. When the PUR-RNTI is the UE-specific RNTI, the UE performing the RACH procedure transmits the PUR-RNTI to the eNB in the message 3 step and confirms the PUR-RNTI thereof in the message 3 step to confirm that the PUR-RNTI is delivered to the eNB. Further, it may be indicated that only the TA update procedure is performed.

In the message 4 step, in order to deliver the PUR-RNTI to the UE, (i) the eNB may CRC-scramble a PDCCH for scheduling message 4 by using the PUR-RNTI, (ii) deliver the PUR-RNTI through a message transmitted to message 4 PDSCH, or (iii) scramble a codeword(s) of the message 4 PDSCH by using the PUR-RNTI.

Therefore, (i) the UE detects the PUR-RNTI used for CRC scrambling for the PDCCH for scheduling the message 4 PDSCH, (ii) confirms the PUR-RNTI transmitted through a message to the message 4 PDSCH, or (iii) detect the PUR-RNTI used for scrambling for a codeword(s) of the message 4 PDSCH to confirm that the contention is resolved and indicate that only the TA update is performed. That is, in the method using the PUR-RNTI, instead of transmitting the UE ID (e.g., 40 bits) and/or the 1-bit flag through message 3, only the PUR-RNTI (e.g., 16 bits) is transmitted through message 3, and as a result, there is an effect of performing the same operation as in the method using message 3. That is, the method using the PUR-RNTI may have the same effect as the method for transmitting the UE ID and/or the 1-bit flag through message 3 by using a smaller number of bits.

In the present disclosure, the message 4 PDSCH means a downlink channel to which message 4 is downlink channel.

FIG. 31 is a diagram illustrating an example of a method for transmitting, by a UE, uplink data through a preconfigured uplink resource proposed in the present disclosure.

More specifically, FIG. 31 illustrates an example in which the TA update procedure between the UE and the base station is performed through an interval other than the PUR interval (Proposal 2-1).

The UE determines whether a TA configured to a current UE is valid before transmitting uplink data through a preconfigured resource (3110).

According to a determination result, when it is determined that the TA is invalid, the UE may not perform the PUR transmission, but skip a first PUR resource (3120).

Next, the UE may be requested to perform the TA update procedure from the base station (3130).

After being requested to perform the TA update procedure, the UE may perform the TA update procedure by performing a modified or shortened RACH procedure with the base station (S3140).

In the TA update procedure through the modified or shortened RACH procedure, i) the UE may transmit a random access preamble to the base station, ii) receive, from the base station, a random access response message including a TA command which is information related to the TA which is updated, iii) transmit, to the base station, an uplink message including indication information indicating that only the TA update procedure is performed, and iv) receive, from the base station, a contention resolution message. In this case, in the TA update procedure, the state of the UE may not be transitioned to the RRC connected state, but terminated based on the indication information.

After the TA update procedure is completed, the UE may transmit, to the base station, uplink data through a second PUR resource (3150).

(Proposal 2-2) TA Update Mechanism—Method Using PDCCH Order Based Contention-Free Random Access The eNB may indicate, to the UE, a TA update through a contention-free random access through a PDCCH order for the TA update. In this case, in spite of being in the RRC_IDLE state, in order to perform PUSCH/PDSCH scheduling through a random access response (RAR) (message 2, msg 2), the base station may use a UE specifically configured RNTI for PDCCH monitoring and/or uplink transmission in an RRC valid state instead of C-RNTI. Here, the UE specifically configured RNTI may be, for example, a PUR-RNTI which the UE is configured with, for PUR uplink transmission and downlink PDCCH monitoring.

When the base station indicates, to the UE which is monitoring the PDCCH in the RRC_IDLE state, the contention-free random access through a PDCCH command, the UE may use the UE specifically configured RNTI (e.g., PUR-RNTI configured for PUR uplink transmission and downlink PDCCH monitoring) for PDCCH monitoring and/or uplink transmission in the RRC_IDLE state, for PDCCH monitoring for receiving the PDCCH command and PUSCH/PDSCH scheduling after the RAR (msg2).

The base station checks a PUR-RNTI applied to scrambling a PUSCH codeword(s) after the RAR (msg2) to confirm that a PUR UE normally receives message 2 (RAR MAC CE) and additionally confirm whether a TA adjustment is normally applied. The TA adjustment may be used as the same meaning as the TA update.

FIG. 32 is a diagram illustrating an example of a method for transmitting, by a UE, uplink data through a preconfigured uplink resource proposed in the present disclosure.

More specifically, FIG. 32 illustrates an example in which the TA update procedure between the UE and the base station is performed through an interval other than the PUR interval (Proposal 2-2).

The UE determines whether a TA configured to a current UE is valid before transmitting uplink data through a pre-configured resource (3210).

According to a determination result, when it is determined that the TA is valid, the UE may perform PUR transmission for transmitting the uplink data in a first PUR resource (3220).

In this case, the UE determines that the TA is valid to perform PUR transmission, but the base station may determine that the TA is invalid based on the PUR transmission, and in this case, the UE may be requested to perform a PDCCH order based TA update procedure from the base station (3230). A request of the base station which requests performing the TA update procedure may be received through a PDCCH.

After being requested to perform the TA update procedure, the UE may perform the TA update procedure by performing a contention free based RACH procedure with the base station (S3240).

In the contention free based TA update procedure, the UE may i) transmit a random access preamble to the base station, ii) receive, from the base station, a random access response message including a PUR-RNTI preconfigured to the UE and a TA command which is information related to an updated TA, and iii) transmit, to the base station, an uplink message through a physical uplink shared channel (PUSCH) in which a codeword is scrambled by using the PUR-RNTI.

An "operation for the TA update (or TA update procedure)" may include all TA update operations including a modified or shortened RACH based method and a PDCCH ordered contention-free random access based method.

Since some or all PUR resources included in an interval of performing the TA update procedure may be a case where the TA is invalid, all or some PUR resources included in the interval of performing the TA update procedure may be skipped. The PUR resource skipped for the TA update may not be counted as a sipping event for a PUR release regardless of whether there is data.

That is, in this case, a PUR skipping counter value for the PUR release may be held. As an example, if the PUR release is performed when the PUR skipping counter is configured to a specific initial value, and then the skipping counter value becomes 0 while the skipping event is counted down, a counter value may be held according to a counter initial value (e.g., initial value=1) or only if the PUR skipping counter value is a specific value or less (e.g., counter value=1).

As described above, the reason for holding the skipping counter value for the PUR release is that when the TA update operation (procedure) is performed, the TA becomes valid, and as a result, when an operation of releasing and being reconfigured with the PUR is performed in a situation in which the updated TA value may be immediately used, it is disadvantageous in terms of power consumption which is a primary motivation of the PUR.

As another example, if the PUR skipping itself is not permitted, dropping or skipping the PUR transmission may be permitted in the PUR resource exceptionally while performing a procedure for the TA update, and it may be assumed that the PUR is available after the TA update procedure and the PUR transmission through the corresponding PUR may be permitted.

FIG. 33 is a diagram illustrating an example of a method for transmitting, by a UE, uplink data through a preconfigured uplink resource proposed in the present disclosure.

More specifically, FIG. 33 illustrates an example in which the TA update procedure between the UE and the base station is performed through an interval other than the PUR interval.

The UE determines whether a TA configured to a current UE is valid before transmitting uplink data through a pre-configured resource (3310).

According to a determination result, when it is determined that the TA is invalid, the UE may not perform the PUR transmission, but skip the first PUR resource (3320).

Next, the UE may be requested to perform the TA update procedure from the base station (3330).

After being requested to perform the TA update procedure, the UE may perform the TA update procedure with the base station (S3340). In this case, all or some of one or more PUR resources may be included in the interval in which the TA update procedure is performed. In this case, the one or more PUR resources included in the interval in which the TA update procedure is performed may be skipped, and a counter value for a PUR release may be held regardless of that the one or more PUR resources are skipped.

After the TA update procedure is completed, the UE may transmit, to the base station, uplink data through a second PUR resource (3350).

Initial PRACH power used for the operation for the TA update may be configured to an initial PRACH transmission power correction value by referring to an updated uplink transmission power correction value in relation to the last PUR transmission of the UE based on a current time.

Alternatively, after the UE obtains a new PUR TA from the TA update operation, the UE may configure a subsequent PUR transmission power correction value based on the last used uplink transmission power correction value in the process of the operation for the TA update.

TA Related Parameter Bit Size Optimization for TA Update

This method proposes a method for optimizing a bit size of a TA related parameter for the TA update. Here, the TA related parameter may include a TA command MAC CE range or bit size, an RSRP change threshold, etc.

A TA information bit size downlink transmitted to a TA MAC CE may be designed to include a TA range supported by an extended-cycle prefix (E-CP), and this may be applied regardless of a CP mode (normal-cyclicprefix (N-CP) and E-CP). Unlike this, when the base station transmits TA information to the UE through a (Physical downlink shared channel (PDSCH) or a physical downlink control channel (PDCCH) for the TA update (in particular, when transmitted as a downlink control information (DCI) element), a supported TA range may be limited to a TA range supported by N-CP and a TA information bit size may be configured based on the N-CP in order to prevent a DC size from being increased or increase a transmission success probability for the same resource element (RE).

More specifically, if TA command MAC CE range +/−512T is configured based on the E-CP, 6 bits are required for supporting +/−512 Ts=+/−32*16 Ts. On the contrary, in the N-CP, 5 bits are required for supporting +/−160 Ts=+/−10*16 Ts.

Alternatively, according to a CP mode (N-CP vs. E-CP), a bit size of the TA related parameter may be differently configured.

Similar to the above method, based on that a cell size supported by the N-CP is smaller than the cell size supported by the E-CP, a range of an RSRP change threshold for TA validation may be differently applied in the case of the N-CP. For example, the range of the RSRP change threshold for the TA validation of the N-CP may be configured to be smaller than the range of the RSRP change threshold in an E-CP mode. Further, for a similar reason, a range of an RSRP value of the TA validation may vary depending on a CP mode, and ranges of values of TA related parameters or bit sizes which may vary depending on the CP mode may be defined by radio resource control (RRC) according to the CP mode and applied differently according to the CP mode. Alternatively, according to the CP mode, values actually meant by fields of corresponding respective TA related parameters may be construed differently according to the CP mode. The parameters may include an RSRP (change) value range(s) and/or threshold(s).

The methods may be applied to transmitting the TA related parameter for the TA update by downlink or configuring/transmitting a parameter value for the TA validation, at the time of transmitting the PUR.

TA Validation Mechanism

The UE should be able to continuously determine whether the TA is valid for UL transmission through the PUR, and an operation and a procedure of performing the continuous determination may be referred to as the TA validation. For the TA validation, a serving-cell change amount of reference signal received power (RSRP) may be used (Method 1) or a TA alignment timer (Method 2) may be used.

(Method 1) Method for Measuring/Determining Serving-Cell RSRP Change for TA Validation This method proposes a method for measuring/determining an RSRP change of a serving-cell for the TA validation. More specifically, the UE in the RRC connected state may be located at a specific location d1 (in this case, the TA is referred to as TA1), and the UE may move to a specific location d2 at a specific time for uplink transmission through the PUR in the idle state. If a difference (d2−d1) between the locations increases, when the UE performs the uplink transmission by applying TA1, there may be a problem in transmission/reception capability due to overlapping with adjacent downlink or uplink subframe/slot in term of the base station. Accordingly, in order to solve such a problem, the UE should measure the difference (d2−d1) between the locations. This method as a method for measuring the difference between the locations proposes a method for measuring/determining the serving-cell RSRP change by the UE.

That is, the UE may compare a difference between a value of RSRP2 measured at d2 and a value of RSRP1 measured at d1. When the UE is distant from the base station, the measured RSRP2 value decreases, and as a result, (RSRP2 value−RSRP1 value) increases. When the UE detects that the difference (RSRP2 value−RSRP1 value) increases, the UE may determine that the difference significantly deviates from the location d1 at which the RSRP1 value is measured.

As an example, the serving-cell RSRP change may be determined as a difference between RSRP values measured at point A and point B, respectively. The point A may mean a reference point and the point B may mean a test point. A serving-cell RSRP value measured at point A may be a reference RSRP value and a serving-cell RSRP value measured at point B may be a test RSRP value. Hereinafter, a method for determining point A (Proposal 1) and a method for determining point B (Proposal 2) will be described.

(Proposal 1) Point A Determining Method

Point A may be a point at which the UE measures serving-cell RSRP last (or recently) based on a time of being configured with the PUR. Alternatively, the RSRP may be measured a specific time after configuring the PUR and indicated to be configured as point A.

The reference RSRP value may be fixed to a value measured at the time (i.e., the time at which the RSRP is measured last based on the time of being configured with the PUR) or updated at a specific time. When the update of the reference RSRP value is not supported, the RSRP value may be fixed as described above.

FIG. 34 is a diagram illustrating an example of a method for transmitting, by a UE, uplink data through a preconfigured uplink resource proposed in the present disclosure.

More specifically, FIG. 34 illustrates an example of the method for determining point A for the TA validation (Proposal 1).

Referring to FIG. 34(a), the UE may measure the RSRP at a predetermined interval (3411 to 3431). Further, the UE may receive configuration information related to a PUR configuration at a specific time from the base station (3441). In this case, the time at which the UE measures the RSRP last based on the time of receiving the configuration information related to the PUR configuration from the base station (3431) may be determined as point A.

Alternatively, referring to FIG. 34(b), the UE may receive the configuration information related to the PUR configuration at a specific time from the base station (3412). In this case, the time at which the UE measures the RSRP after a specific time from the time of receiving the configuration information related to the PUR configuration from the base station (3422) may be determined as point A.

When the update of the reference RSRP value is supported, the reference RSRP value may be as follows.

i) When the TA update is supported, the reference RSRP value may be a serving-cell RSRP value which the UE measures last (or recently) based on the TA update time.

ii) Alternatively, when it is supported that the base station changes point A at a specific time with a specific control signal (dynamically), the reference RSRP value may be a serving-cell RSRP value which the UE measures last (or recently) based on the time when the point A is changed.

The control signal which the base station may use for changing the point A (dynamically) may be a specific signal designed or designated for a corresponding usage, a 1-bit update flag in DCI delivered in a channel/signal monitored after the PUR transmission, or may be transmitted in one state form of a specific field.

FIG. 35 is a diagram illustrating an example of a method for transmitting, by a UE, uplink data through a preconfigured uplink resource proposed in the present disclosure.

More specifically, FIG. 35 illustrates an example of a method for determining the RSRP value at point A for the TA validation.

Referring to FIG. 35(a), the UE may measure the RSRP at a predetermined interval (3511 to 3531). Further, the UE may perform a TA update with the base station, and the TA update may be completed at a specific time (3541). In this case, an RSRP value which is measured last based on the time when the TA is updated (3541) may be determined as the reference RSRP value.

Alternatively, referring to FIG. 35(b), the UE may measure the RSRP at a predetermined interval (3512 to 3532). Further, the UE may receive a specific control signal to indicate a change of point A from the base station (3552). At a time when the UE receives the specific control signal from the base station, point A may be changed. The UE may perform the TA update with the base station, and the TA update may be completed at a specific time (3542). In this case, an RSRP value 3522 which is measured last from on the time when the point A is changed (3552) may be determined as the reference RSRP value.

(Proposal 2) Point B Determining Method

Point B may be a point at which the UE measures serving-cell RSRP last (or recently) based on a time of transmitting a PUR configured by the UE (or PUR resource). More specifically, the UE may receive, from the base station, configuration information related to PUR transmission, and the configuration information may include resource information for a plurality of PUR transmission resources. The UE may perform the PUR transmission on the plurality of PUR transmission resources, and the PUR transmission resource may be a PUR transmission time. The UE may perform the PUR transmission at a specific PUR transmission time which first exists after a current time based on the current time, and in this case, the UE may measure the serving-cell RSRP at one or more times before the specific PUR transmission time. A time when the serving-cell RSRP is measured last based on the specific PUR transmission time among the one or more times may become point B.

As another example, the UE may be configured to measure the serving-cell RSRP value before a specific time from each PUR transmission time. On the contrary, the UE may not measure an additional serving-cell RSRP value for the PUR transmission.

When the UE is configured to measure the serving-cell RSRP value before the specific time from each PUR transmission time at the configured PUR transmission time, the serving-cell RSRP value at point B may be a serving-cell RSRP value which the UE measures before the configured specific time based on the corresponding PUR transmission time.

FIG. 36 is a diagram illustrating an example of a method for transmitting, by a UE, uplink data through a preconfigured uplink resource proposed in the present disclosure.

More specifically, FIG. 36 illustrates an example of a method for determining point B for the TA validation (Proposal 2).

Referring to FIG. 36(a), the UE may measure the RSRP at a predetermined interval (3611 to 3631). Further, the UE may be configured to perform the PUR transmission at a specific time (3641) from the base station. In this case, a time (3621) at which the UE measures the RSRP last based on the time (3641) when the UE is configured to perform the PUR transmission may be determined as point B.

Alternatively, referring to FIG. 36(b), the UE may be configured to perform the PUR transmission at a specific time (3622) from the base station. In this case, a time (3612) at which the UE measures the RSRP before a specific time based on the time when the UE is configured to perform the PUR transmission (3622) may be determined as point B.

If UL skipping in PUR is supported, the serving-cell RSRP value may not be measured before a specific time from UL-skipped PUR in order to reduce unnecessary power consumption. In this case, a reference value may be a serving-cell RSRP value measured before a specific time from a PUR which the UE transmits (without UL skipping) last (or recently). Alternatively, the reference value may be a serving-cell RSRP value which the UE measures last (or recently).

In this case, the reference value may be determined as a more recently measured value (i.e., a serving-cell RSRP measurement time temporally closer from a current time based on the current time) between a serving-cell RSRP value which the UE measures before a specific time of the PUR which the UE transmits (without UL skipping) most recently and a serving-cell RSRP value which the UE measures (in order to satisfy a conventional radio resource management (RRM) requirement) last (or recently).

As another example, in order to prevent a TA validation capability from being deteriorated due to aperiodic measurement by UL skipping in the PUR, even when the UL skipping in the PUR is supported, the UE may be configured to measure the serving-cell RSRP value before a specific time from a transmission time of the UL skipped PUR. In this case, the reference value may be a serving-cell RSRP value which the UE measures before a specific time based on the UL skipped PUR transmission time.

When the UE does not measure the additional serving-cell RSRP value for the PUR transmission, the serving-cell RSRP value at point B may be a serving-cell RSRP value which the UE measures (in order to satisfy the conventional RRM requirement) last (or recently) based on the PUR transmission time.

In the case of a UE that performs only RSRP measurement at a level to satisfy the conventional RRM requirement, a value of a serving-cell RSRP change may be configured to be smaller than a value in a UE which does not perform the RSRP measurement.

The reference point, i.e., point A as a reference point of measuring the reference RSRP may be determined as followed when the TA is updated through an L1 PUR configuration update.

(Proposal 1-1) Method for Updating L1 PUR Configuration Update Time to Reference Point (i.e., Point A)

(Proposal 1-1) is the method for updating the L1 PUR configuration update time to the reference point, and a time when the reference point is updated may be defined as follows.

Reference point when the reference RSRP value is measured (Point A) is updated when TA is updated either via higher layer signaling or via L1 PUR configuration update.

In the case of (Proposal 1-1), when the UE fails to receive DCI (L1 signaling), there may be ambiguity in TA update time between the UE and the eNB.

That is, the eNB indicates the TA adjustment through the DCI, but when the UE fails to receive the DCI, the eNB may update the reference point based on the corresponding DCI transmission time, and the UE may still refer to a previous TA update time.

The eNB may check whether the L1 PUR configuration update is successful through hypothesis test or blind detection through subsequent PUR transmission, and hold or modify a last reference point according to a check result. That is, an operation of updating a reference point assuming a success in L1 PUR configuration update may be held or cancelled.

As another example, when the UE falsely detects the DCI, and performs an unintended L1 PUR configuration update and updates the reference point, the eNB and the UE may have different reference point values. In this case, in order to solve a problem in that the eNB and the UE have different reference point values, only when the eNB may confirm that the L1 PUR configuration update is successful, the reference points of the eNB and the UE may be performed. Here, a case where the eNB may confirm that the L1 PUR configuration update is successful may be a case where the eNB may confirm that the L1 PUR configuration update is successful through the hypothesis test or blind detection through subsequent PUR transmission of the UE.

Since the UE may not know whether the eNB confirms the L1 PUR configuration update, the eNB may transmit, to the UE, L1 PUR configuration update confirmation information through the DCI. As an example, the L1 PUR configuration update confirmation information may be replaced with ACK information, etc.

(Proposal 1-2) Method for not Updating L1 PUR Configuration Update Time to Reference Point, i.e., Point a That is, in the case of (Proposal 1-2), a last (or recent) TA update time may be defined as follows.

Reference point when the reference RSRP value is measured (Point A) is updated when TA is updated only via higher layer signaling, not via L1 PUR configuration update.

In this case, TA alignment timer based TA validation is limited only to the case where the TA is configured or updated through the higher layer, and the L1 PUR configuration update may not be used for checking the TA validation, but may be used for performing only an operation of updating TA and UE Tx power adjustment and a PUSCH repetition number for effective PUR transmission within an interval in which the TA is valid.

The reason for not applying the L1 PUR configuration update to the TA validation is that when the UE falsely detects the DCI, and performs the unintended L1 PUR configuration update and updates the reference point (point A), the eNB and the UE have reference point (point A) values in which the RSRP value is measured, respectively, and as a result, the eNB determines that the TA is invalid and at a time when the UE expects to perform a fallback operation, the UE may assume that the TA is still valid and may perform the PUR transmission. In this case, the eNB may use a PUR resource in which the DCI is not transmitted for another usage, and in order to avoid such an unintended resource collision, the L1 PUR configuration update may not be used for the TA validation.

(Method 2) Method for Operating TA Alignment Timer for TA Validation

A TA alignment timer may be operated in an idle mode for TA validation. Unless particularly mentioned in the present disclosure, the TA alignment timer means a TA alignment timer which operates in a connected mode, but a timer which operates for the TA validation in an idle mode.

The TA alignment timer may be a counter which is basically reset at the time of the TA update, and then sequentially increases according to a time domain unit (or is reset to a specific value, and then sequentially decreases).

When the TA alignment timer value which is reset to the specific value sequentially increases according to the time domain unit, if the TA alignment timer value is equal to or more than a specific value, the UE and/or the base station may determine that the TA is invalid or use the TA alignment timer as one condition for the determination. Alternatively, when the TA alignment timer value which is reset to the specific value sequentially decreases according to the time domain unit, the UE and/or the base station may determine that the TA is invalid or use the TA alignment timer as one condition for the determination. As an example, the specific value A may be 0.

(Proposal 1) Reset of TA Alignment Timer

The reset of the TA alignment timer may operate as follows.

First, the TA alignment timer is reset based on a time when a PUR is configured. Here, a reset value may be 0 or a value of a TA timer for a connected mode, which operates in the connected mode may be inherited (succeeded) and reset.

The TA alignment timer may be updated at a specific time. When the TA update is supported, the TA alignment timer may be reset based on the TA update time, or the base station may reset the TA alignment timer at a specific time (dynamically) with a specific control signal. The control signal which the base station may use for resetting the TA alignment timer dynamically at the specific time may be a specific signal designed or designated for a corresponding usage, a 1-bit update flag in DCI delivered in a channel/signal which the UE monitors after the PUR transmission, or may be transmitted in one state form of a specific field.

The TA alignment timer may measure a time difference between a current time and a recent TA update time, and when the time difference between both times is a specific value or more, the TA alignment timer may be used for a usage of regarding that the TA is invalid.

(Proposal 1-1) When the L1 PUR configuration update is not supported, a PUR TA alignment timer may operate as follows.

The UE considers the TA as invalid if the (current time−time at last TA update)>the PUR Time Alignment Timer.

The Time at last TA update is updated when TA is updated via higher layer signaling.

(Proposal 1-2) On the contrary, when the L1 PUR configuration update is supported, the PUR TA alignment timer may operate as follows.

(Proposal 1-2-A) Method for Applying L1 PUR Configuration Update to PUR TA Validation Mechanism That is, TA validation criteria using the PUR TA alignment timer among TA attributes may be as follows.

The UE considers the TA as invalid if the (current time−time at last TA update)>the PUR Time Alignment Timer.

In this case, in the case of (Proposal 1-2-A), a recent (last) TA update time may be defined as follows.

The Time at last TA update is updated when TA is updated either via higher layer signaling or via L1 PUR configuration update.

In the case of (Proposal 1-2-A), when the UE fails to receive DCI (L1 signaling), there may be ambiguity in TA update time between the UE and the eNB.

That is, the eNB indicates the TA adjustment through the DCI, but when the UE fails to receive the DCI, the eNB may update the time at last TA update based on the corresponding DCI transmission time, and the UE may still refer to a previous TA update time.

The eNB may check whether the L1 PUR configuration update is successful through hypothesis test or blind detection through subsequent PUR transmission, and hold or modify the time at last TA update according to a check result. That is, an operation of updating a time at last TA update assuming a success in L1 PUR configuration update may be held or cancelled.

As another example, when the UE falsely detects the DCI, and performs an unintended L1 PUR configuration update and updates the time at last TA update, the eNB and the UE may have different times at last TA update. In this case, in order to solve a problem in that the eNB and the UE have different times at last TA update, only when the eNB may confirm that the L1 PUR configuration update is successful, the times at last TA update of the eNB and the UE may be performed. Here, a case where the eNB may confirm that the L1 PUR configuration update is successful may be a case where the eNB may confirm that the L1 PUR configuration update is successful through the hypothesis test or blind detection through subsequent PUR transmission of the UE.

Since the UE may not know whether the eNB confirms the L1 PUR configuration update, the eNB may transmit, to the UE, L1 PUR configuration update confirmation information through the DCI. As an example, the L1 PUR configuration update confirmation information may be replaced with ACK information, etc.

(Proposal 1-2-B) Method for not Applying L1 PUR Configuration Update to PUR TA Validation Mechanism That is, in the case of (Proposal 1-2-B), a last (recent) TA update time may be defined as follows.

The Time at last TA update is updated when TA is updated only via higher layer signaling, not via L1 PUR configuration update.

In this case, TA alignment timer based TA validation is limited only to the case where the TA is configured or updated through the higher layer, and the L1 PUR configuration update may not be used for checking the TA validation, but may be used for performing only an operation of updating TA and UE Tx power adjustment and a PUSCH repetition number for effective PUR transmission within an interval in which the TA is valid.

The reason for not applying the L1 PUR configuration update to the TA validation is that when the UE falsely detects the DCI, and performs the unintended L1 PUR configuration update and updates the time at last TA update, the eNB and the UE have different time values at last TA update in which the RSRP value is measured, respectively, and as a result, the eNB determines that the TA is invalid and at a time when the UE expects to perform a fallback operation, the UE may assume that the TA is still valid and may perform the PUR transmission. In this case, the eNB may use a PUR resource in which the DCI is not transmitted for another usage, and in order to avoid such an unintended resource collision, the L1 PUR configuration update may not be used for the TA validation.

PUR Configuration Method

Configuration parameters preconfigured to the UE for UL transmission through the PUR of the UE may include the followings. Time domain resources including periodicity(s)

Frequency domain resources

Transport block size: TBS(s))

Modulation and coding scheme (MCS(s))

Search space for feedback monitoring in response to UL transmission in PUR

The parameters may be included in configuration information which the UE receives from the base station, and delivered to the UE. Specifically, the UE may receive the configuration information in an RRC_connected state. Additionally, after receiving the configuration information, the UE changes a state of the UE to an RRC_idle state. The UE in the idle state may perform the UL transmission through a PUR resource based on the configuration information.

In addition to the configuration parameters, the configuration information may additionally include information (or channel information) related to a channel for transmitting Ack/Nack (A/N) information for downlink (DL) feedback to the uplink. The channel may be a physical uplink control channel (PUCCH) or narrowband physical uplink shared channel (NPUSCH) format 2 resource or PUSCH or NPUSCH format 1.

The information related to the channel may include a repetition number, etc., and when the information is not an implicit PUCCH resource, the information may include a PUCCH time/frequency resource, etc. For example, the information may be a PUCCH resource index, etc.

PUR Configuration Update Method

Among the parameters described in the above PUR configuration method, in order for all or some parameter(s) to adapt to changed UE environment and network environment, the parameters may be updated or adapted by the following method after the PUR transmission or in the process of (re)transmission.

The operations may be performed in the following order in terms of the UE.

(1) PUR transmission, in this case, the PUR may be transmitted on a physical uplink shared channel (PUSCH).

(2) Downlink (DL) assignment reception, in this case, the downlink assignment may receive an MTC physical downlink control channel (MPDCCH).

(3) PUR parameter reception, in this case, the PUR parameter may be transmitted on a physical downlink shared channel (PDSCH).

(4) ACK transmission, in this case, the ACK may be transmitted on a physical uplink control channel (PUCCH).

(5) Thereafter, MPDCCH monitoring is performed for a predetermined interval. Here, the MPDCCH may be an MPDCCH for PDSCH retransmission by an ACK reception failure of the base station.

In this case, the operation (5) may be, for example, not expecting receiving the MPDCCH after k subframes or k slots or not monitoring the MPDCCH.

Further, in the process of the operation (2), the UE may expect four following cases.

(i) ACK, (ii) DL assignment, (iii) NACK, and (iv) No ACK. Here, UE construing and operation for each of cases (i) to (iv) may be as follows.

(i) ACK: The UE may construe that the PUR transmission is successful and there is no PUR parameter update.

(ii) DL assignment: The UE may expect that the PUR transmission is successful, and PDSCH scheduling for PUR parameter update and/or PUR release.

(iii) NACK: The UE may expect that the PUR transmission is unsuccessful, and PUR retransmission indication or PUR release. In addition, the UE may expect uplink transmission through legacy EDT or random access channel (RACH).

(iv) No ACK: The UE may expect that the PUR transmission is unsuccessful, and PUR retransmission indication. Here, the PUR retransmission may be performed in the same PUR interval or a subsequent PUR interval through UE autonomous power ramp-up, repetition increase, etc.

Method of Power Control for PUR Transmission

One of two following methods may be applied to initial PUR transmission for UL TX power control.

(Proposal 1) A transmission power control (TPC) accumulation mechanism is applied between the initial PUR transmissions, that is, uplink TX power is determined based on a power value(s) of previous PUR transmission(s).

(Proposal 2) The TPC accumulation mechanism is reset every initial PUR transmission, that is, the uplink TX power is determined regardless of the power value(s) of the previous PUR transmission(s).

In this case, one scheme of (Proposal 1) and (Proposal 2) above may be configured to be (autonomously) selected by considering PUR transmission characteristics.

For example, when a specific threshold X of a PUR transmission period is configured and the PUR transmission period is larger than X (or equal to or larger than X), (Proposal 2) may be applied and in an opposite case (when the transmission period is smaller than X), (Proposal 1) may be applied.

A reason for applying Proposal (2) when the PUR transmission period is large is that when the PUR transmission period is large, changes including a channel environment, path loss, etc., are large during the PUR transmission, and as a result, a power value applied during the previous PUR transmission may not be referred to during current PUR transmission.

The threshold X may be a subframe, frame, or hyperframe unit, and may be a value configured by the base station/network. For the base station/network configuration, the threshold X may be included in a PUR configuration parameter.

Further, the base station/network may configure the uplink transmission power control method (e.g., (Proposal 1), (Proposal), etc.) to be applied when the UE initially transmits the PUR, and even in this case, a parameter related to the configuration of the uplink transmission power control method may be included in the PUR configuration parameter.

In the case of the PUR retransmission, when there is a TPC field in UL grant DCI for retransmission for retransmission like long term evolution machine type communication coverage enhancement (LTE MTC CE) mode A UE, the uplink transmission power may be controlled by using the corresponding field, but when there is no TPC field in the UL grant downlink control information for retransmission like CE mode B, two following methods may be considered.

(Proposal A) The uplink transmission power adopts configured (max) uplink transmission power.

(Proposal B) The uplink transmission power increases by a ramping step value configured every retransmission.

(Proposal A) above as a method which may be applied in CE mode B UE has a simple advantage, but adjacent UEs retransmit the power with the maximum uplink transmission power, and as a result, an interference problem may occur between the UE and the cell.

Since (Proposal B) may gradually increase the uplink transmission power and adjust an increase width by the configurable ramping step, (Proposal B) has an advantage relatively in terms of interference as compared with (Proposal A). Configuration information in the ramping-step and/or (Proposal A)/(Proposal B) may be added to the PUR configuration parameter and configured by the base station/network. The PUR configuration parameters may be included in the configuration information which the UE is delivered with from the base station/network for the PUR transmission.

Contention-Free Shared PUR Supporting Method

In order to support contention-free PUR transmission between multiple UEs while sharing the PUR time/frequency resource, a multi user-multiple input multiple output (MU-MIMO) technique may be used. For MU-MIMO demodulation using an orthogonal dedicated demodulation reference signal (DMRS), a cyclic shift (CS) value and/or an orthogonal cover code (OCC) or a combination of the CS and the OCC may be configured to be UE-specific or UE group-specific in the PUR configuration.

A method for configuring the (i) CS and/or OCC or (ii) the combination of the CS and the OCC may be a UE-specific RRC configuration or a configuration using DCI for a UL grant for PUR (re-)activation DCI((re-)activation, or PUR ((re-) transmission).

The base station configures different CS and/or OCC values to UEs sharing the PUR time/frequency resources, respectively to support the content-free PUR transmission.

DL/UL Grant and Explicit ACK/NACK Method in PUR SS

Both UL grant and DL assignment may be expected in PUR downlink feedback, and a specific state of the UL grant may be defined as explicit and/or explicit NACK and a specific state of the DL grant may be defined as explicit ACK. The explicit NACK may be used for the usage of the PUR or (dedicated PUR) release, and in this case, NDI may be continuously reserved as 0 or 1, and may be used for a usage such as virtual CRS or integrity check by using a combination which is invalid in a field such as UL resource (or RB) assignment/allocation and/or MCS. Here, the NDI may be configured to assume that the initial PUR transmission is continuously configured as NDI=0 or 1. In the case of the explicit ACK, only ACK information for the PUR transmission may be singly delivered (in this case, may be transmitted as UL grant or DL grant) or the explicit ACK may be transmitted through DL assignment DCI together with DL assignment information scheduling the (N)PDSCH. Here, whether the (N)PDSCH is actually scheduled together with the ACK information may be discriminated according to whether a valid combination is indicated in a field such as DL resource (or RB) assignment/allocation and/or MCS.

PUR Transmission and PUR Search Space (SS) Monitoring Method

In this method, the PUR transmission and PUR SS monitoring method of the UE will be described. SS may mean a time/frequency resource interval which the UE monitors in order to perform the PUR transmission and receive a feedback of the base station for the PUR. More specifically, a monitoring method in a PUR SS which exists at a time before the PUR transmission of the UE (Proposal 1) and a monitoring method in a PUR SS which exists at a time after the PUR transmission of the UE (Proposal 2) will be described.

(Proposal 1) PUR SS Monitoring Method of UE in PUR SS Before PUR Transmission

In this proposal, the PUR SS before the PUR transmission may be a PUR SS which exists for a region which may be irrespective of a feedback of the base station/network for the PUR transmission performed earlier than the PUR transmission which the UE intends to currently transmit.

When desiring to turn off a PUR resource reserved as a scheduling issue of the base station or skip the PUR transmission of the UE, the UE may be configured to monitor a PUR SS which exists in a specific interval (e.g., between X ms and Y ms) before the PUR transmission. That is, the UE monitors the specific interval to receive a specific control channel including control information indicating turning off the PUR resource or skipping the PUR transmission. Due to such a reason, the skipped PUR may not be regarded as the PUR skipping event for the PUR release. That is, when the UE receives the control information in the specific interval and the PUR resource is turned off or the PUR transmission is skipped based on the control information, the PUR may not be regarded as the PUR skipping event for the PUR release.

Next, the PUR SS monitoring method in the PUR SS which exists after the PUR transmission will be described.

(Proposal 2) PUR SS Monitoring Method of UE in PUR SS after PUR Transmission

In this proposal, the UE may operate differently according to the case of skipping the PUR transmission (Proposal 2-1) and the case of performing the PUR transmission (Proposal 2-2).

(Proposal 2-1) Case of Skipping PUR Transmission

By considering the case where the UE may schedule a physical downlink shared channel (PDSCH) in the PUR SS, the UE may be configured to monitor the PUR SS during a specific interval regardless of whether to skip the PUR.

Further, the base station may indicate the UE to perform a timing advance (TA) update operation through a PDCCH order through the PUR SS configured to be monitored. When explicit NACK and uplink grant, and explicit ACK are detected in the interval in which the UE is indicated to monitor the PUR SS (i.e., since the PUR transmission is skipped, the UE may not expect reception of ACK, NACK, etc.), the UE may ignore this or promise the PUR SS to be used for a usage other than an original usage with the base station, and this may be construed differently from the original usage.

When the PUR transmission is skipped due to a reason that there is no UL data to be transmitted at the PUR transmission time, the UE may be permitted to perform a UL skipping operation for power saving. Even in this case, PUR SS monitoring may be required in two following aspects.

i) PUR configuration update using L1 signaling or RRC signaling ii) DL transmission using PUR transmission window In the case of i) above, the PUR configuration update is performed even when there is no PUR transmission data to prevent a TA validation fail, thereby preventing entrance into the legacy EDT or legacy RACH procedure for TA reacquisition.

When the PUR transmission is skipped, whether to monitor PUR SS may be determined based on a situation of the base station/network or a UE type, and indicated to the UE through higher layer signaling of 1-bit flag form. Information related to whether to monitor the PUR SS may be included in the PUR configuration. In such a case, since the UE skips the PUR transmission, the PUR skipping may be counted as a PUR skip event.

On the contrary, the PUR transmission is skipped, but the UE may receive the indication such as the TA update, etc., or may be indicated with other operations from the base station/network through downlink reception, etc., in the corresponding PUR, and as a result, the PUR skipping may not be counted as the PUR skip event. A case where the PUR skipping is not counted as the PUR skip event even though the PUR is skipped may be applied only to a case where the MPDCCH is successfully received through the PUR SS.

(Proposal 2-2) Case of Performing PUR Transmission

When not receiving explicit ACK through UL grant DCI, but receiving only explicit ACK without actual DL allocation with DL assignment DCI after PUR transmission of the UE, the UE may be configured to permit PUR SS monitoring for PDCCH detection to be stopped (i) up to a subsequent PUR or (ii) up to an interval to monitor a PUR SS before the subsequent PUR for another usage in a state of configuring the PUR SS to be monitored after the PUR transmission. Alternatively, the UE may not be required to monitor the PUR.

Alternatively, when the UE receives explicit NACK through the UL grant DCI, the explicit NACK may be used for a usage of PUR or dedicated PUR release. States of the UL grant DCI and/or DL assignment DCI which the UE may expect to receive after performing the PUR transmission may be summarized as follows.

(UL Grant DCI)
Explicit ACK-→PUR transmission success (and no PUR parameter update)
Explicit NACK-→PUR transmission fail and/or PUR or (dedicated PUR) release
Retransmission-→PUR transmission fail and PUR retransmission (DL Assignment DCI)
Explicit ACK for DL-grant-→PUR SS monitoring stop indication (see the above description)
PDCCH-order based PRACH transmission-→PRACH transmission indication for TA update through PDCCH order Additionally, there may be a case where the UE may receive no response from the base station/network after performing the PUR transmission to a current PUR resource (e.g., resource #n). In this case, the UE may perform the following operations.

(Method 1) The UE may recognize the NACK and perform retransmission in a subsequent PUR resource (e.g., resource #n+1). Retransmission of the subsequent PUR resource (e.g., resource #n+1) may be applied only to a case where there is no new data to be transmitted to the subsequent PUR resource (e.g., #n+1). When there is new data to be transmitted to the subsequent PUR resource (e.g., #n+1), the UE may transmit the new data to the subsequent PUR resource (e.g., #n+1) and the UE may no longer expect retransmission of previous data.

(Method 2) The UE may recognize the NACK and then may not expect retransmission in the subsequent PUR resource. This method may be applied regardless of whether there is new data to be transmitted to the subsequent PUR resource (e.g., resource #n+1). In this case, the UE may perform an additional operation such as buffer flush, etc., for the data transmitted in the current PUR resource (e.g., resource #n).

(Method 3) The UE may recognize and perform the additional operation such as the buffer flush, etc., for the data transmitted in the current PUR resource (e.g., resource #n).

In the present disclosure, for convenience, the eNB is expressed, but the eNB may be expanded to a term such as gNB, the base station, the network, etc.

FIG. 37 is a diagram illustrating an example of an operation implemented in a UE for performing a method for transmitting uplink data through a preconfigured uplink resource (PUR) in a wireless communication system proposed in the present disclosure.

Specifically, in a method, by a user equipment (UE), for transmitting uplink data through a preconfigured uplink resource (PUR) in a wireless communication system, the UE receives, from a base station, PUR configuration information for uplink data transmission based on the PUR in a radio resource control (RRC) connected state (S3710).

next, the UE transitions from the RRC connected state to an RRC idle state (S3720).

And then, the UE performing a timing advance (TA) update procedure based on whether a TA related to uplink transmission timing is valid (S3730).

wherein the TA update procedure is performed based on that the TA is not valid.

In addition, based on that the TA is not valid, the UE drops the transmission for the uplink data on a second resource of the PUR which is allocated before the first resource.

In addition, the performing the TA update procedure may further comprise, the UE receives, from the base station, a request message requesting to perform the TA update procedure, transmits, to the base station, a random access preamble, receives, from the base station, a TA command including the updated TA, transmits, to the base station, an uplink message including indication information representing that only the TA update procedure is performed, and receives, from the base station, a contention resolution message.

Wherein the TA update procedure may be terminated before a state of the UE is transitioned to the RRC connected state, based on the indication information.

Also, wherein the indication information may be a first radio network temporary identifier (PUR-RNTI) which is preconfigured to the UE, and the UE may determine whether the first PUR-RNTI has been delivered to the base station based on the contention resolution message.

Wherein based on that the second PUR-RNTI is included in the contention resolution message, whether the first PUR-RNTI has been delivered to the base station is determined based on whether the first PUR-RNTI and the second PUR-RNTI match, and wherein, based on that the second PUR-RNTI is not included in the contention resolution message, whether the first PUR-RNTI has been delivered to the base station is determined based on at least one of (i) whether a third PUR-RNTI used for scrambling a physical downlink control channel (PDCCH) for scheduling a physical downlink shared channel (PDSCH) through which the contention resolution message is transmitted and the first PUR-RNTI match or (ii) whether a fourth PUR-RNTI used for scrambling a codeword of the PDSCH and the first PUR-RNTI match.

Wherein, the uplink message may further include a unique identifier of the UE, and the indication information may (i) consist of a flag of 1 bit and (ii) represents either 'only TA update procedure is performed' or 'RRC connection establishment is not performed'.

wherein the first resource may be an earliest resource starting after a specific number of subframes or a specific number of slots from an end of the TA update procedure.

After then, the UE transmits, to the base station, the uplink data on a first resource of the PUR. Wherein based on that a specific resource included in the PUR is included in a TA update performing interval, a transmission for the uplink data on the specific resource is dropped, and a value of a counter for release of the PUR is held regardless of dropping of the uplink data on the specific resource.

Also, wherein the uplink data may be transmitted on the first resource without additional validity determination for the TA Additionally, based on that (i) the TA is valid and (ii) the TA needs to be updated, the UE may receives, from the base station, downlink control information (DCI) for requesting an additional update for the TA on a downlink control channel (PDCCH).

Also, wherein the additional update for the TA may further comprises, receiving, from the base station, a random access response message including a TA command that is information related to the updated TA; and transmitting, to the base station, an uplink message on a physical uplink shared channel (PUSCH) based on a codeword scrambled by using the first PUR-RNTI which is preconfigured to the UE.

Additionally, based on that the TA is valid, the UE may transmit, to the base station, at least one uplink message for providing the base station with information for updating the TA on at least one resource of the PUR, and receive, from the base station, information on the TA updated based on the at least uplink message, wherein the at least one uplink message is transmitted to the base station regardless of the presence or absence of the uplink data.

FIG. 38 is a diagram illustrating an example of an operation implemented in a base station for performing a method for transmitting uplink data through a preconfigured uplink resource in a wireless communication system proposed in the present disclosure.

Specifically, in A method, by a base station, for receiving uplink data through a preconfigured uplink resource (PUR) in a wireless communication system, the method, the base station transmits, to a user equipment (UE) in a radio resource control (RRC) connected state, PUR configuration information for uplink data transmission based on the PUR (S3810).

After then, the base station performs a timing advance (TA) update procedure based on whether a TA related to uplink transmission timing is valid (S3820).

Next, the base station receives, from the UE, the uplink data on a first resource of the PUR. wherein, based on that a specific resource included in the PUR is included in a TA update performing interval, a transmission for the uplink data on the specific resource is dropped, and a value of a counter for release of the PUR is held regardless of dropping of the uplink data on the specific resource.

Additionally, the methods proposed in the present disclosure may be performed by an apparatus comprising one or more memories and one or more processors operatively coupled to the one or more memories.

Specifically, in the apparatus comprising one or more memories and one or more processors operatively coupled to the one or more memories, The one or more processors controls the apparatus to receive, from a base station, PUR configuration information for uplink data transmission based on the PUR in a radio resource control (RRC) connected state.

Next, the one or more processors controls the apparatus to transition from the RRC connected state to an RRC idle state.

Next, the one or more processors controls the apparatus to perform a timing advance (TA) update procedure based on whether a TA related to uplink transmission timing is valid.

And then, the one or more processors controls the apparatus to transmit, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Additionally, the methods proposed in the present disclosure may be performed by one or more instruction which is stored in a non-transitory computer readable medium (CRM) storing the one or more instructions.

Specifically, in the non-transitory computer readable medium (CRM) storing one or more instructions, one or more instructions executable by the one or more processors control a user equipment (UE) to receive, from a base station, PUR configuration information for uplink data transmission based on the PUR in a radio resource control (RRC) connected state.

Next, the one or more instructions control the UE to transition from the RRC connected state to an RRC idle state.

Next, the one or more instructions control the UE to perform a timing advance (TA) update procedure based on whether a TA related to uplink transmission timing is valid.

And then, the one or more instructions control the UE to transmit, to the base station, the uplink data on a first resource of the PUR, wherein, based on that a specific resource included in the PUR is included in a TA update performing interval, a transmission for the uplink data on the specific resource is dropped, and a value of a counter for release of the PUR is held regardless of dropping of the uplink data on the specific resource.

Random Access Procedure

Method proposed in the present disclosure, which are described above, may be performed by being combined with the random access procedure. Hereinafter, a random access procedure will be described.

The random access procedure of the UE may be summarized as shown in Table 8 and FIG. 39.

TABLE 8

| Type of signal | | Acquired operation/information |
| --- | --- | --- |
| First phase | PRACH Preamble in UL | Initial beam acquisition<br>Random selection of RA-preamble ID |
| Second phase | Random access response on DL-SCH | Timing alignment information<br>RA-preamble ID<br>Initial UL grant or temporary C-RNTI |

TABLE 8-continued

| Type of signal | | Acquired operation/information |
| --- | --- | --- |
| Third phase | UL transmission on UL-SCH | RRC connection request<br>UE identifier |
| Fourth phase | Contention resolution on DL | Temporary C-RNTI on PDCCH for initial access<br>C-RNTI on PDCCH for UE in RRC_CONNECTED |

FIG. 39 illustrates an example of a random access procedure.

First, the UE may transmit a PRACH preamble as Msg1 of a random access procedure in UL.

Random access preamble sequences having two different lengths are supported. Long sequence length 839 is applied as subcarrier spacing of 1.25 and 5 kHz, and short sequence length 139 is applied as subcarrier spacing of 15, 30, 60 and 120 kHz. Long sequences support both unrestricted sets and restricted sets of type A and type B, while short sequences support only the unrestricted sets.

Multiple RACH preamble formats are defined with one or more RACH OFDM symbols, different cyclic prefixes, and guard time. A PRACH preamble configuration for use is provided to the UE in the system information.

If there is no response to Msg1, the UE may retransmit the PRACH preamble within a predetermined number of times by power ramping. The UE calculates PRACH transmission power for retransmission of the preamble based on the most recent pathloss and power ramping counter. When the UE performs beam switching, the counter of power ramping remains unchanged.

The system information informs the UE of an association between the SS block and the RACH resource.

FIG. 40 illustrates a concept of a threshold for an SS block for RACH resource association.

A threshold value of the SS block for RACH resource association is based on RSRP and a configurable network. Transmission or retransmission of the RACH preamble is made based on SS blocks that meet the threshold.

When the UE receives a random access response on the DL-SCH, the DL-SCH may provide timing alignment information, RA-preamble ID, initial UL grant, and temporary C-RNTI.

Based on the information, the UE may perform the UL transmission by transmitting the Msg 3 of the random access procedure on the UL-SCH. The Msg3 may include the RRC connection request and the UE identifier.

In response thereto, the network may transmit Msg4 and the Msg4 may be handled as a contention resolution message on DL. By receiving the Msg4, the UE may enter the RRC connected state.

Detailed descriptions of respective phases are as follows.

Before initiating a physical random access procedure, Layer-1 should receive a set of SS/PBCH block indexes from a higher layer and should provide, to the higher layer, a set of RSRP measurements corresponding thereto.

Before initiating the physical random access procedure, Layer-1 should receive the following information from the higher layer:

Configuration of physical random access channel (PRACH) transmission parameters (PRACH preamble format, time resource, and frequency resource for PRACH transmission).

Root sequences in a PRACH preamble sequence set (an index to a logical root sequence table, cyclic shift ($N_{CS}$), and a type of set (unrestricted set, restricted set A, or restricted set B)) and parameters for determining the cyclic shifts thereof.

From the viewpoint of the physical layer, the L1 random access procedure includes transmission of a random access preamble (Msg1) in a PRACH, a random access response (RAR) message (Msg2) with PDCCH/PDSCH, and transmission of Msg3 PUSCH and PDSCH for contention resolution, if applicable.

When the random access procedure is initiated by a "PDCCH order" to the UE, the random access preamble transmission is performed with the same subcarrier spacing as the random access preamble transmission initiated by the higher layer.

When the UE is constituted by two UL carriers for one service cell and the UE detects the "PDCCH order", the UE uses a UL/SUL (supplement UL) indicator field value from the detected "PDCCH order" and determines a UL carrier for the corresponding random access preamble transmission.

In relation to a random access preamble transmission phase, the physical random access procedure is triggered by a request for PRACH transmission by the higher layer or PDCCH order. A configuration by the higher layer for the PRACH transmission includes:

Configuration for PRACH transmission.

Preamble index, spacing between preamble subcarriers, $P_{PRACH,target}$, corresponding RA-RNTI, and PRACH resource.

The preamble is transmitted as transmission power $P_{PRACH,b,f,c}(i)$ by using a PRACH format selected on the indicated PRACH resource.

Multiple SS/PBCH blocks associated with one PRACH occasion are provided to the UE by a value of higher layer parameter SSB-perRACH-Occasion. When the value of SSB-perRACH-Occasion is less than 1, one SS/PBCH block is mapped to 1/SSB-per-rach-occasion consecutive PRACH occasions. The UE is provided with a number of preambles per SS/PBCH block by the value of the higher layer parameter cb-preamblePerSSB, and the UE determines the total number of preambles per SSB per PRACH as the multiples of the value of SSB-perRACH-Occasion and the value of cb-preamblePerSSB.

The SS/PBCH block index is mapped to the PRACH occasions in the following order.

First, mapping the SS/PBCH block index in an increasing order of preamble indexes in a single PRACH occasion Second, mapping the SS/PBCH block index in an increasing order of frequency resource indexes for frequency multiplex PRACH occasions Third, mapping the SS/PBCH block index in an increasing order of time resource indexes for time multiplex PRACH occasions in a PRACH slot Fourth, mapping the SS/PBCH block index in an increasing order of indexes for the PRACH slot.

A periodicity for mapping to the PRACH occasions for the SS/PBCH block starts from frame 0 and is the smallest value among {1, 2, 4} configuration periodicities equal to or larger than $\lceil N_{Tx}^{SSB}/N_{PRACH\,period}^{SSB} \rceil$, and in this case, the UE acquires $N_{Tx}^{SSB}$ from higher layer parameter SSB-transmitted-SIB1, and $N_{PRACH\,period}^{SSB}$ represents the number of SS/PBCH blocks which may be mapped to one PRACH configuration periodicity.

When the random access procedure is initiated by the PDCCH order, if the higher layer makes a request, the UE will transmit the PRACH at a first available PRACH occasion, and in this case, in the case of the PDCCH, a time between a last symbol of reception and a first symbol of PRACH transmission is equal to or more than $N_{T,2}$+ $\Delta_{BWPSwitching}+\Delta_{Delay}$ seconds, and where, $N_{T,2}$ represents a duration of $N_2$ symbols corresponding a PUSCH preparation time for a PUSCH processing capacity and $\Delta_{BWPSwitching}$ is defined in advance, and is $\Delta_{Delay}>0$.

In response to the PRACH transmission, the UE attempts to detect the PDCCH having the corresponding RA-RNTI during a window controlled by the higher layer. The window starts at the first symbol of the earliest control resource set in which the UE is configured for the Type1-PDCCH general search space, that is, at least after a symbol after the last symbol of preamble sequence transmission. The length of the window as the number of slots is provided by higher layer parameter rar-WindowLength based on an inter-subcarrier spacing for the Type0-PDCCH general search space.

When the UE detects the PDCCH having the RAN-RANTI and the corresponding PDSCH including a DL-SCH transport block in the corresponding window, the UE transfers the transport block to the higher layer. The higher layer parses a transport block for random access preamble identification (RAPID) associated with the PRACH transmission. When the higher layer identifies the RAPID in a RAR message(s) of the DL-SCH transport block, the higher layer instructs to allow the physical layer to perform the uplink. This is referred to as a random access response (RAR) UL grant in the physical layer. When the higher layer does not identify the RAPID associated with the PRACH transmission, the higher layer may instruct to transmit the physical layer to transmit the PRACH. A minimum time between the last symbol of the PDSCH reception and the first symbol of the PRACH transmission is equal to $N_{T,1}+\Delta_{new}+0.5$, and where, $N_{T,1}$ represents an elapsed time of $N_1$ symbols corresponding a PDSCH reception time for PDSCH processing capacity 1 when an additional PDSCH DM-RS is configured and $\Delta_{new}\geq 0$.

The UE will receive the PDCCH having the corresponding RA-RNTI and a corresponding PDSCH including a detected SS/PBCH block or a DL-SCH transport block having the same DM-RS antenna port quasi co-location (QCL) attribute as the received CSI-RS. When the UE attempts to detect the PDCCH having the corresponding RA-RNTI in response to the PRACH transmission initiated by the PDCCH order, the UE assumes that the PDCCH and the PDCCH order have the same DM-RS antenna port QCL attribute.

RAR UL grant schedules PUSCH transmission from the UE (Msg3 PUSCH). Contents of RAR UL grant start at MSB and end at LSB, and are given in Table 9. Table 9 shows a random access response grant content field size.

TABLE 9

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The Msg3 PUSCH frequency resource allocation is for uplink resource allocation type 1. In the case of the frequency hopping, one or two first bits of the Msg3 PUSCH frequency resource allocation field, i.e., $N_{UL,hop}$ bits are used as hopping information bits, based on the indication of the frequency hopping flag field.

The MCS is determined from first 16 indexes of an MCS index table applicable to the PUSCH.

TPC command $\delta_{msg2,b,f,c}$ is used for configuring a power of the Msg3 PUSCH, and interpreted according to Table 10. Table 10 shows TPC command for the Msg3 PUSCH.

TABLE 10

| TPC command | Value ( in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, it is construed that the CSI request field determines whether an aperiodic CSI report is included in the corresponding PUSCH transmission. In a contention based random access procedure, the CSI request field is reserved.

When the spacing between the subcarriers is not configured in the UE, the UE receives a subsequent PDSCH by using the same spacing between subcarriers as a case of PDSCH reception providing the RAR message.

When the UE does not detect PDCCH having the corresponding RAN-RNTI and the corresponding DL-SCH transport block in the window, the UE performs a procedure for failure to receive the random access response.

For example, the UE may perform power ramping for retransmission of the random access preamble based on a power ramping counter. However, when the UE performs beam switching in PRACH retransmission as illustrated in FIG. 41 below, the power ramping counter is maintained unchanged.

In FIG. 41, the UE may increase the power ramping counter by 1 when retransmitting the random access preamble for the same beam. However, when the beam is changed, the power ramping counter is maintained unchanged.

With regard to Msg3 PUSCH transmission, the higher layer parameter msg3-tp indicates whether the UE should apply transform precoding for Msg3 PUSCH transmission to the UE. When the UE applies transmission transform precoding to Msg3 PUSCH having the frequency hopping, a frequency offset for a second hop is given in Table 11. Table 11 shows a frequency offset for a second hop for transmission of Msg3 PUSCH having the frequency hopping.

TABLE 11

| Number of PRBs in initial active UL BWP | Value of $N_{UL, hop}$ hopping bit | Frequency offset for $2^{nd}$ hop |
|---|---|---|
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | reserved |

The spacing between subcarriers for the Msg3 PUSCH transmission is provided by higher layer parameter msg3-scs. The UE will transmit PRACH and Msg3 PUSCH on the same uplink carrier of the same service providing cell. A UL BWP for the Msg3 PUSCH transmission is indicated by SystemInformationBlock1.

When the PDSCH and the PUSCH have the same spacing between subcarriers, a minimum time between a last signal of PDSCH transmission for transmitting the RAR and a first signal of the corresponding Msg3 PUSCH transmission scheduled by the RAR in the PDSCH for the UE is equal to $N_{T,1}+N_{T,2}+N_{T4,max}+0.5$. $N_{T,1}$ represents an elapsed time of $N_1$ symbols corresponding to the PDSCH reception time for PDSCH processing capacity 1 when the additional PDSCH DM-RS is configured, $N_{T,2}$ represents an elapsed time of $N_2$ symbols corresponding to the PUSCH preparation time for PUSCH processing capacity 1, and represents a maximum timing adjustment value which may be provided by a TA command field in the RAR.

When C-RNTI is not provided to the UE in response to Msg3 PUSCH transmission, the UE attempts to detect a PDCCH having a corresponding TC-RNTI scheduling a PDSCH that includes identification of UE contention resolution. In response to the reception of the PDSCH having the identification of the UE contention resolution, the UE transmits HARQ-ACK information into the PUCCH. A minimum time between the last symbol of the PDSCH reception and the first symbol of HARQ-ACK transmission corresponding thereto is equal to $N_{T,1}+0.5$. $N_{T,1}$ represents an elapsed time of $N_1$ symbols corresponding to the PDSCH reception time for PDSCH processing capacity 1 when the additional PDSCH DM-RS is configured.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The method for transmitting the uplink data with high reliability n the wireless communication system of the present disclosure is described based on an example in which the method is applied to the 3GPP NR system, but may be applied to various wireless communication systems in addition to the 3GPP NR system.

The invention claimed is:

1. A method performed by a user equipment (UE) in a wireless communication system, the method comprising:
   receiving, from a base station, configuration information related to a preconfigured uplink resource (PUR);
   transmitting, to the base station, uplink data using the PUR;
   receiving, from the base station, downlink control information (DCI) scheduling a retransmission of the uplink data using the PUR; and
   retransmitting, to the base station, the uplink data using the PUR,
   wherein, based on the UE being a coverage enhancement (CE) UE configured with a CE mode B, a transmission power for the retransmission is determined based on a configured maximum uplink transmission power.

2. The method of claim 1, wherein, based on the UE being a CE UE configured with a CE mode A:
   the DCI comprises a field for a Transmission Power Control (TPC) command, and
   the transmission power for the retransmission is determined based on the TPC command.

3. The method of claim 2,
   wherein an accumulation of the TPC command related to uplink transmission power is reset based on the retransmission of the uplink data using the PUR.

4. The method of claim 1, wherein the configuration information related to the PUR further includes (i) information on time domain resources including periodicity, (ii) information on frequency domain resources, (iii) information on modulation and coding scheme and (iv) information on a search space for monitoring a feedback on the transmission of the uplink data using the PUR.

5. The method of claim 1, wherein configuration information related to the PUR is received in a radio resource control (RRC) connected state, and
   further comprising:
   transitioning from the RRC connected state to an RRC idle state,
   wherein the transmission of the uplink data using the PUR is performed in the RRC idle state.

6. A user equipment (UE) configured to operate in a wireless communication system, the UE comprising:
   a transmitter for transmitting a radio signal;
   a receiver for receiving a radio signal; and
   a processor operatively coupled to the transmitter and the receiver,
   wherein the processor is configured to:
   receive, from a base station, configuration information related to a preconfigured uplink resource (PUR);
   transmit, to the base station, uplink data using the PUR;
   receive, from the base station, downlink control information (DCI) scheduling a retransmission of the uplink data using the PUR; and
   retransmit, to the base station, the uplink data using the PUR,
   wherein, based on the UE being a coverage enhancement (CE) UE configured with a CE mode B, a transmission power for the retransmission is determined based on a configured maximum uplink transmission power.

7. An apparatus for a user equipment (UE), the apparatus comprising one or more memories and one or more processors operatively coupled to the one or more memories, the apparatus comprising:
   wherein the one or more processors controls the apparatus to:
   receive, from a base station, configuration information related to a preconfigured uplink resource (PUR);
   transmit, to the base station, uplink data using the PUR;
   receive, from the base station, downlink control information (DCI) scheduling a retransmission of the uplink data using the PUR; and
   retransmit, to the base station, the uplink data using the PUR,
   wherein, based on the UE being a coverage enhancement (CE) UE configured with a CE mode B, a transmission power for the retransmission is determined based on a configured maximum uplink transmission power.

* * * * *